(12) United States Patent
Mason et al.

(10) Patent No.: US 9,274,699 B2
(45) Date of Patent: Mar. 1, 2016

(54) USER INTERFACE FOR A LARGE SCALE MULTI-USER, MULTI-TOUCH SYSTEM

(75) Inventors: Steve Mason, San Francisco, CA (US);
Ammon Haggerty, Oakland, CA (US);
Michael Harville, Palo Alto, CA (US);
Niklas Lundback, San Francisco, CA (US); Nikolai Cornell, San Francisco, CA (US)

(73) Assignee: Obscura Digital, San Francisco, CA (US)

( * ) Notice: Subject to any disclaimer, the term of this patent is extended or adjusted under 35 U.S.C. 154(b) by 195 days.

(21) Appl. No.: 12/553,962

(22) Filed: Sep. 3, 2009

(65) Prior Publication Data
US 2011/0055729 A1    Mar. 3, 2011

(51) Int. Cl.
G06F 3/0484    (2013.01)
G06F 3/0488    (2013.01)
G06F 3/042     (2006.01)

(52) U.S. Cl.
CPC ............ G06F 3/0488 (2013.01); G06F 3/0425 (2013.01); *G06F 2203/04808* (2013.01)

(58) Field of Classification Search
CPC ....... G06F 3/011; G06F 3/0416; G06F 3/017; G06F 3/0488; H04H 60/33; H04N 7/15
USPC ......................................................... 715/753
See application file for complete search history.

(56) References Cited

U.S. PATENT DOCUMENTS

| | | | |
|---|---|---|---|
| 5,947,819 A * | 9/1999 | Ohshima .......................... | 463/2 |
| 6,256,046 B1 * | 7/2001 | Waters et al. ................. | 345/473 |
| 7,742,011 B2 | 6/2010 | Damera-Venkata et al. | |
| 2005/0081160 A1 * | 4/2005 | Wee et al. ..................... | 715/755 |
| 2005/0188316 A1 | 8/2005 | Ghanamgari et al. | |
| 2006/0170614 A1 | 8/2006 | Tzong et al. | |
| 2008/0007700 A1 | 1/2008 | vanBaar et al. | |
| 2009/0116742 A1 | 5/2009 | Nishihara | |
| 2010/0066667 A1 | 3/2010 | MacDougall | |
| 2010/0177931 A1 * | 7/2010 | Whytock et al. .............. | 382/103 |

OTHER PUBLICATIONS

International Search Report for the PCT Application PCT/US2010/047913.

(Continued)

*Primary Examiner* — Namitha Pillai
(74) *Attorney, Agent, or Firm* — Law Offices of John Stattler, PC

(57) ABSTRACT

A large scale multi-user, multi-touch system with a specialized zone-based user interface including methods for space management and spatial apportioning of audio cues. The system comprises a multi-touch display component fabricated in dimensions sufficient for at least a plurality of users and for displaying projected images and for receiving multi-touch input. The apparatus includes a plurality of image projectors, a plurality of cameras for sensing multi-touch input and the apparatus includes interface software for managing user space. The interface software implements techniques for managing multiple users using the same user interface component by allocating physical spaces within the multi-touch display component and coordinating movement of displayed objects between the physical spaces. Embodiments include a plurality of audio transducers and methods for performing audio spatialization using the plurality of audio transducers corresponding to the physical spaces, apportioning of volume levels to the audio transducers based on movement of a displayed object.

20 Claims, 43 Drawing Sheets

(56) References Cited

OTHER PUBLICATIONS

U.S. Appl. No. 12/553,966, filed Sep. 3, 2009, Lundback et al.
U.S. Appl. No. 12/553,961, filed Sep. 3, 2009, Harville et al.
U.S. Appl. No. 12/553,959, filed Sep. 3, 2009, Lundback et al.
U.S. Appl. No. 12/553,966, filed Sep. 3, 2009, Lundback.
U.S. Appl. No. 12/553,961, filed Sep. 3, 2009, Lundback.
Office Action issued by the USPOT on Dec. 23, 2011 for U.S. Appl. No. 12/553,959.
Office Action issued by the USPOT on Jul. 6, 2012 for U.S. Appl. No. 12/553,959.
Office Action issued on Aug. 24, 2012 by the USPTO for U.S. Appl. No. 12/553,966.

* cited by examiner

USER INTERFACE FOR A LARGE SCALE MULTI-USER, MULTI-TOUCH SYSTEM

FIELD OF THE INVENTION

The present invention is related to the field of multi-user human-computer interfaces and, more specifically, is directed to large scale multi-touch systems for concurrent use by multiple users.

BACKGROUND

For several decades, computer scientists have grappled with the problems associated with facilitating communication between humans and computers. Major advances over these decades have included the use of pointing devices (e.g. mice, trackball devices, joy sticks, etc) and so-called graphical user interfaces ("GUIs"). This period has also seen some advancement in computer-based speech recognition, as well as eye-tracking bio-informatics devices (e.g. eye movement and gaze point tracking) and neural bio-informatics devices, for example, brain-computer interface (BCI) devices, electro-encephalogram interface (EEGI) devices, neural human-computer interfaces (NHCI), and other such devices. In spite of such advancements in these nascent technologies, humans persist in preferring graphics-oriented interfaces, where displayed images are manipulated by pointing and/or pushing.

However, even when technologies involving displayed images are displayed or projected over multiple surfaces, the limitations of form factors and limitations of overall size of the display apparatus tend to hinder high quality human-to-human interaction while interfacing with a computer. Moreover, the totality of the user experience (including visuals, sound, proximity, etc) while interfacing with a large scale display is lacking. Thus, a system capable of coordinating multiple users working together on a large scale display—and also capable of coordinating a multi-user, multi-touch user interface with experience-enhancing audio—is needed.

Other automated features and advantages of the present invention will be apparent from the accompanying drawings and from the detailed description that follows below.

SUMMARY

Disclosed is a large scale multi-user, multi-touch system with a specialized zone-based user interface and methods for space management and spatial apportioning of audio cues. The system comprises a multi-touch display component fabricated in dimensions sufficient for at least a plurality of users and for displaying projected images and for receiving multi-touch input. The system includes a plurality of image projectors, a plurality of cameras for sensing multi-touch input; and user interface software for managing user space. The interface software implements techniques for managing multiple users using the same user interface component by allocating physical spaces within the multi-touch display component and coordinating movement of displayed objects within and between the physical spaces. Embodiments include a plurality of audio transducers (speakers) and methods for performing audio spatialization using the plurality of audio transducers corresponding to the physical spaces by dynamic apportioning of volume levels to the audio transducers based on movement of a displayed object.

More particularly, the user interface software dynamically provides independently managed user zones achieved by allocating a physical space within the physical boundary of the user interface component for use by a first user, then allocating a second physical space for use by a second user. The user interface software coordinates allocation, sizing, and positioning of zones, as well as population of objects into the zones, and coordination of user-directed movement of objects in and between zones.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order to not obscure the description of the invention with unnecessary detail.

Man-machine input/output (I/O) systems for computers have evolved over time. In the days of cathode ray tubes (CRTs), computer output was provided by a cathode ray tube; similar such tubes were used in early televisions. In that same era, computer input was provided by an alphanumeric keyboard, and later a mouse or other pointing device. As the availability of computing resources surged, more emphasis was placed on the utility of the man-machine interfaces, and ever more computing power became dedicated to aspects of the man-machine interface. During this surge, displays became larger and more able to render realistic images, coordination between pointing devices and displays became more user-friendly, and ubiquity of various features (e.g. windows, pull-down menus, scrolling regions, and other screen devices) of man-machine interfaces increased dramatically. The relative ease of use of windows and other screen devices gave rise to more and more people (i.e. not just computer scientists) becoming familiar and adept at using such man-machine interfaces. This popularity gave rise to more and more computer-based applications (e.g. cell phones with screens, smart phones with touch-screens, GPS navigation aids, etc) being accessible to the general public, and in day-to-day use by the populous.

The ubiquity of computing systems thus now intersects with everyday life. Modern social interactions often depend on computing systems, and day by day, the demand for high-function man-machine interfaces increases. Such a scenario motivates one to invent new ways to facilitate natural human social interactions with computers. Unfortunately, available methods and technologies exhibit shortcomings that hamper such natural human social interactions with computers; accordingly the disclosure herein addresses these and other shortcomings.

Configurations Using a Large Scale Multi-User, Multi-Touch User Interface Apparatus Some embodiments of the invention are practiced in an environment having an open space, suitably sized to accommodate multiple people (i.e. users). In some environments, a large scale multi-user, multi-touch system may appear to be embedded into a wall.

Figure 1:
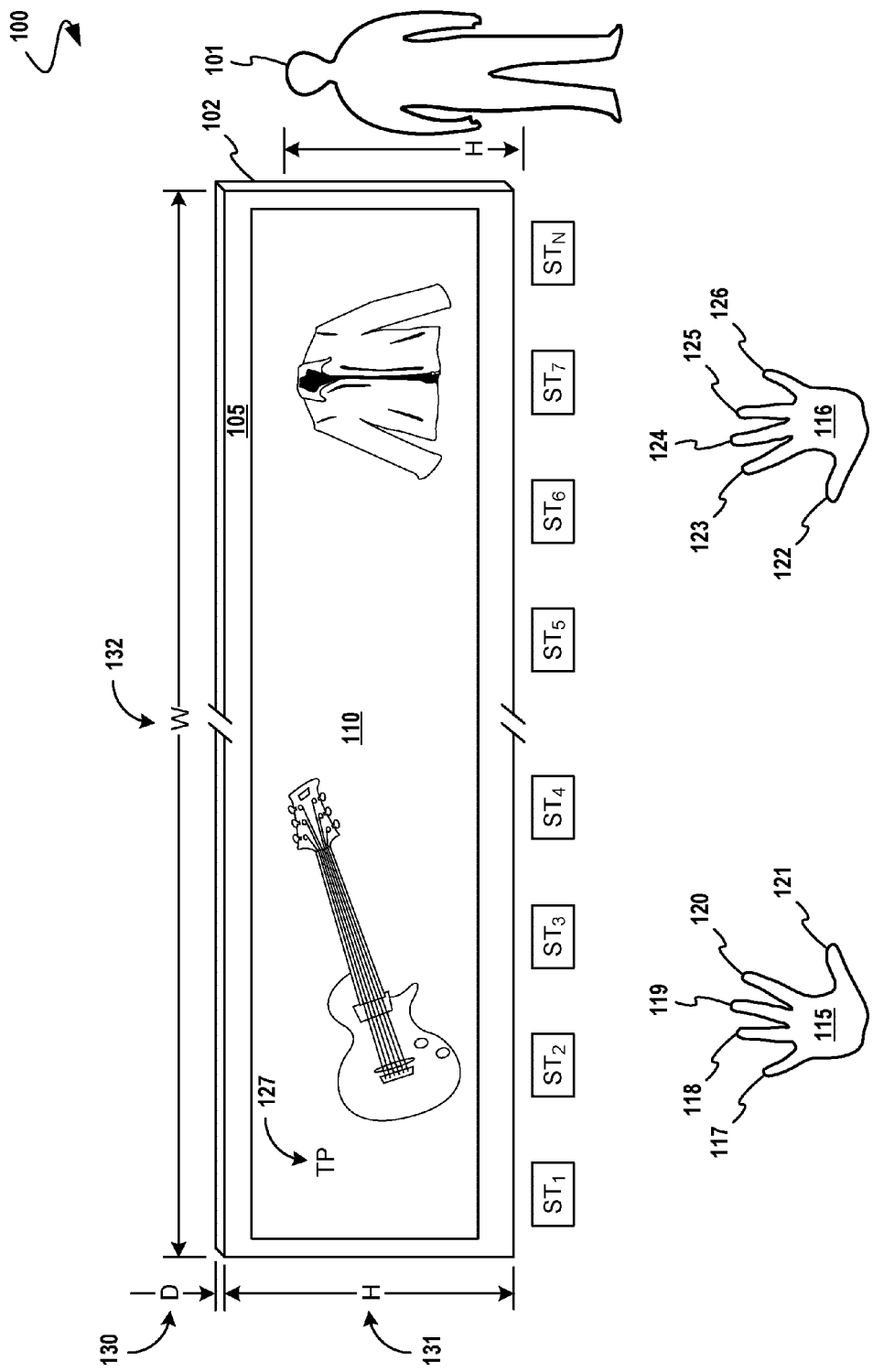
FIG. 1 illustrates a large scale multi-user, multi-touch user interface apparatus, according to one embodiment.

FIG. 1 illustrates a large scale multi-user, multi-touch user interface apparatus, according to one embodiment. The large scale multi-user, multi-touch user interface apparatus depicted in FIG. 1 addresses several problems: (1) support of multiple visual and aural workspaces on a multi-touch user interface for multiple users within close proximity of each other, (2) construction of a large scale seamless multi-touch interface from multiple smaller display and touch sensing components and (3) creation of spatial correspondence between objects appearing on the multi-touch surface and the sounds associated with them.

As previously indicated, the state of the art is deficient for providing the utility described in the foregoing. Embodiments of the invention described herein address technical problems with large scale display interfaces and more specifically, in the following areas: (1) large scale multi-user, multi-touch user interface apparatus formed by a mosaic of multiple smaller units (e.g. multiple image projectors, multiple cameras, etc), (2) limitation of multiple smaller unit implementations as for supporting large motor gestures and dragging, (3) space management for multiple users in close proximity, (4) sound management for multiple users in close proximity, (5) multi-touch human interface management when multi-touch is used within the context of a large scale multi-user, multi-touch user interface apparatus, and (6) a seamless presentation of a large-scale multi-user, multi-touch user interface.

As shown, FIG. 1 illustrates a large scale multi-user, multi-touch user interface apparatus 100 including a multi-touch display component 102, dimensioned with a height H 131 and a width W 132. Strictly for illustrative purposes, FIG. 1 depicts a user 101 in proximity to the large scale multi-user, multi-touch user interface apparatus 100. As shown, the height H 131 of the multi-touch display component 102 is similar in dimension to the head and torso of the user 101. The user can thus approach the large scale multi-user, multi-touch user interface apparatus 100 for viewing and touching at a comfortable standing or sitting position. More specifically, the user can thus approach the user interface area (e.g. the touch interaction region 110) for viewing and touching at a comfortable standing or sitting position. In embodiments, the user interface area may be bounded by a frame 105. A frame 105 may be used to provide mechanical support, and it may be used to provide a mechanical housing for touch illumination sources and calibration apparatus (also discussed infra). Frame 105 might serve as a housing apparatus for sound transducers $ST_1$-$ST_N$. Also shown in FIG. 1 is a depiction of a human left hand 115 and a human right hand 116. The left hand 115 includes a left thumb 121, left index finger 120, left middle finger 119, left ring finger 118, and a left little finger 117. The right hand 116 includes a right thumb 122, right index finger 123, right middle finger 124, right ring finger 125, and a right little finger 126. Hands and digits are used in multi-touch interface operations, for example, a left index finger 120 might be used to indicate a touch point at TP 127.

Figure 2:
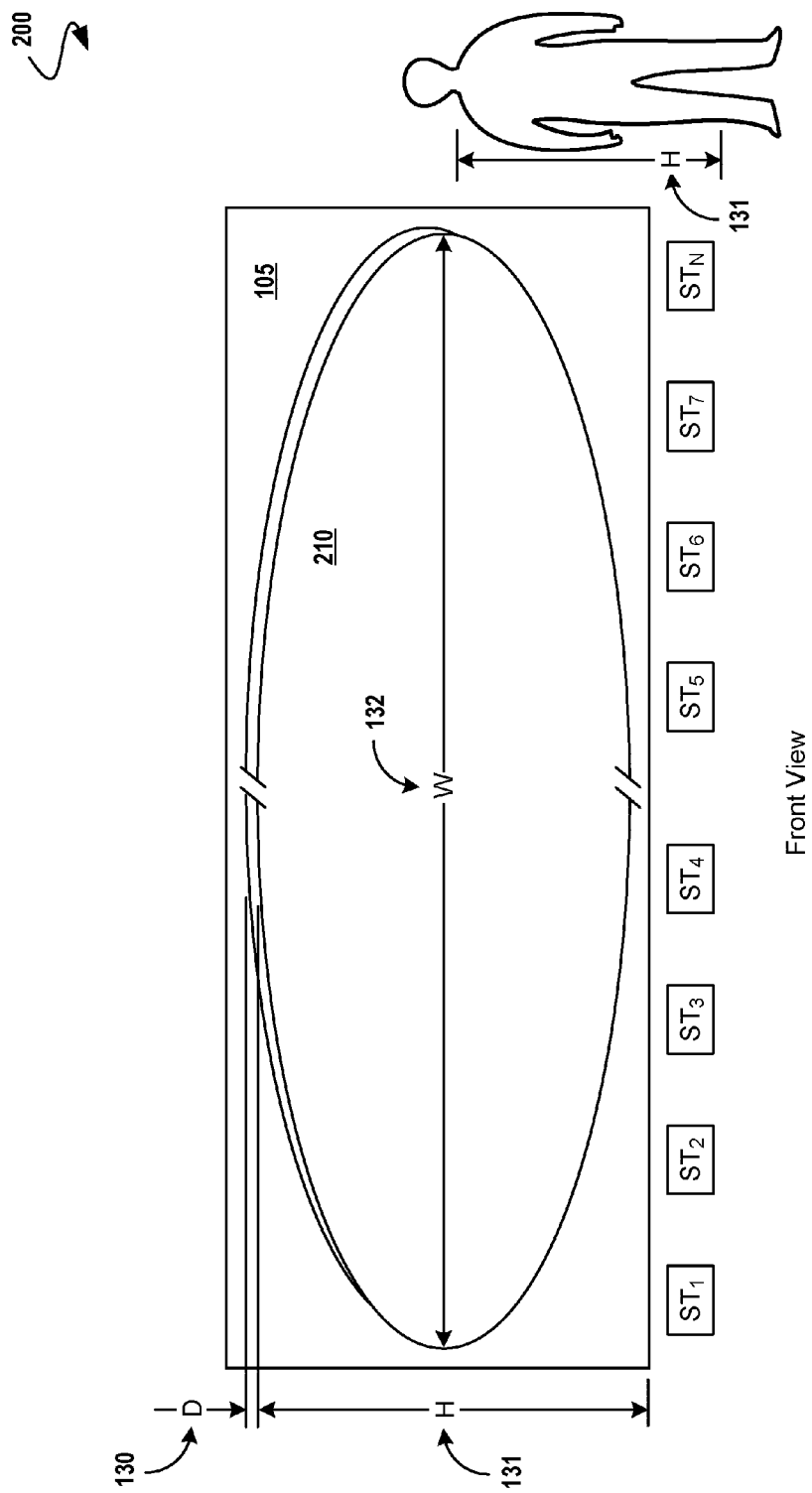
FIG. 2 illustrates an alternative form of a large scale multi-user, multi-touch user interface apparatus, according to one embodiment.

FIG. 2 illustrates an alternative form of a large scale multi-user, multi-touch user interface apparatus, according to one embodiment. As an option, the present large scale multi-user, multi-touch user interface apparatus alternate embodiment 200 may be implemented in the context of the architecture and functionality of FIG. 1. In particular, alternate embodiment 200 might be included in a large scale multi-user, multi-touch user interface apparatus 100. Of course, however, the alternate embodiment 200 or any characteristics therein may be present in any desired configuration. As shown, the interaction region shape 210 (corresponding to the aforementioned interaction region 110) may be a shape other than the rectangular shape as shown in FIG. 1. Of course, even if the interaction region shape 210 is non-rectangular, other elements of the multi-touch display component 102, the interaction region 110, frame 105, and the sound transducers $ST_1$-$ST_N$ might be organized depending on interaction region shape 210 and still function within embodiments of the invention as described herein.

As shown the frame 105 substantially surrounds the interaction region shape 210. In some embodiments the frame 105 serves as a device for visually bounding the interaction region shape 210, and in some such cases, the frame 105 might appear as a rectangle or other rectilinear shape, or it might appear as a curve-linear shape more similar to the interaction region shape 210. For the embodiments of FIGS. 1 and 2, as well as other embodiments of the invention, the frame 105 may function as a mechanical mount for a multi-touch display component 102. Indeed, in some embodiments, the multi-touch display component 102 is a thick piece of glass, possibly with special treatments for tempering, safety and opacity. In some of these embodiments, a thin film suitable for use as a projection screen is attached to one side of the glass sheet, or is embedded within it. In other embodiments, the multi-touch display component 102 is a very thin membrane, possibly with a thickness measured in thousandths of an inch. Of course, depending on the material, thickness, and other characteristics of the multi-touch display component 102, different materials and structures for the frame 105 might be appropriately selected. For example, if the multi-touch display component 102 comprises a thick slab of glass, the frame 105 might be a substantial structure (e.g. a mechanical component, a mounting bracket, a stand, etc) able to support the weight and other forces involved in positioning, and maintaining position, of the multi-touch display component 102.

In various embodiments, the multi-touch display component 102 may comprise a formed material (e.g. formed glass, formed acrylic, formed plastic, a formed composite material, a formed synthetic material, etc) that is substantially transparent. Other materials may be less transparent, and in still other cases, the materials used for the multi-touch display component 102 may be treated to achieve a desired degree (i.e. less than 100%) of opacity. A thin layer of projection screen material may be mounted to either side of the formed material, or embedded inside it as in the case of materials such as StarGlas 100. A multi-touch display component 102 can be further characterized as having a front side and a rear side.

FIG. 2 shows a front view that is showing a front side of a multi-touch display component 102. In the embodiments shown in the figures herein, there are apparatuses arranged substantially on the rear side of a multi-touch display component, and such arrangements are shown in figures depicting rear views and top views of the large scale multi-user, multi-touch user interface apparatus 100.

Figure 3:
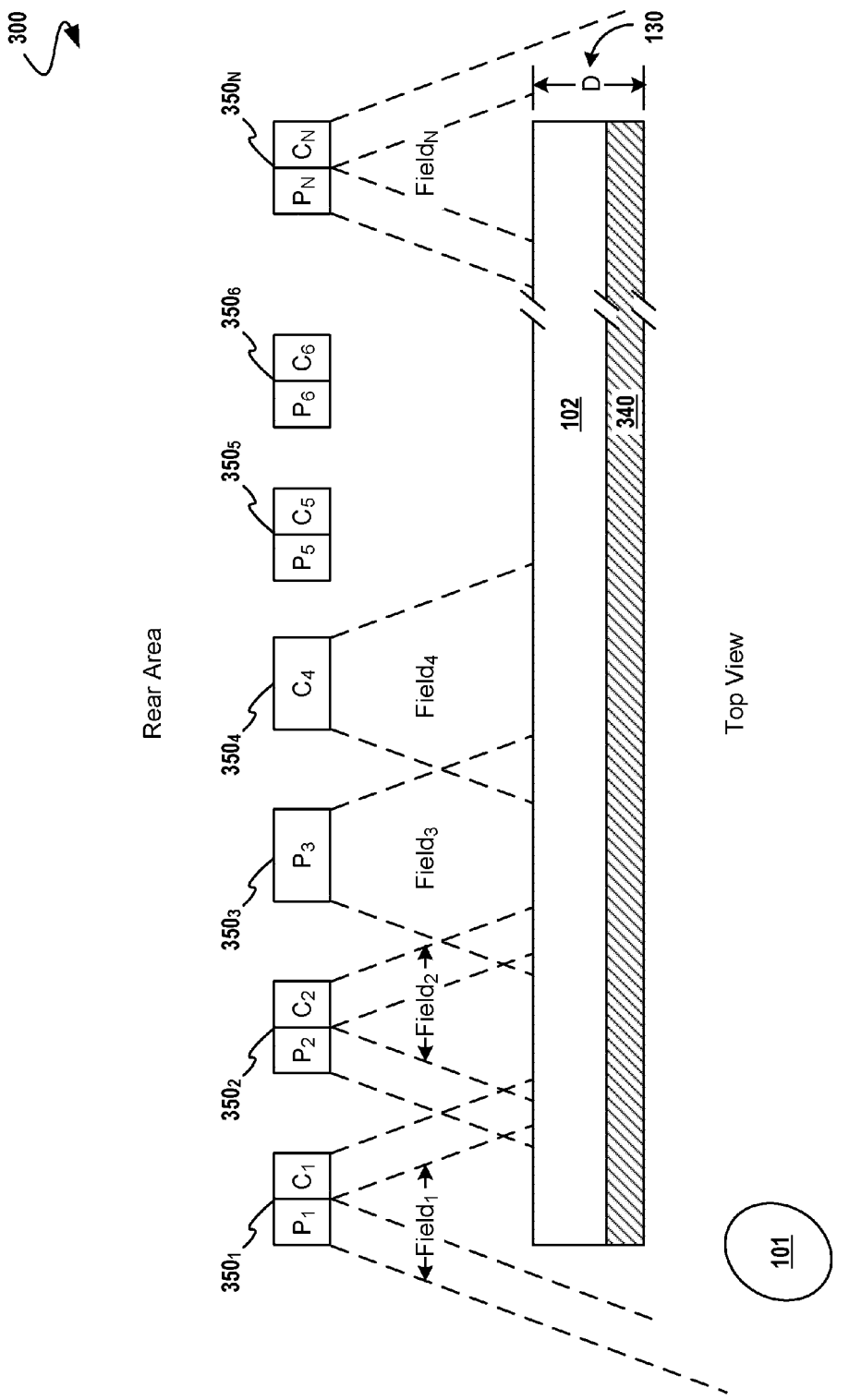
FIG. 3 illustrates a large scale multi-user, multi-touch user interface apparatus top view, according to one embodiment.

FIG. 3 illustrates a large scale multi-user, multi-touch user interface apparatus top view, according to one embodiment. As an option, the present large scale multi-user, multi-touch user interface apparatus top view and rear area 300 may be implemented in the context of the architecture and functionality of FIG. 1 and FIG. 2. In particular, elements shown in the large scale multi-user, multi-touch user interface apparatus top view and rear area 300 might be included in a large scale multi-user, multi-touch user interface apparatus 100. Of course, however, the large scale multi-user, multi-touch user interface apparatus top view and rear area 300 or any characteristics therein may be present in any desired configuration. As shown, image projectors $P_1$-$P_N$ are situated in the rear area. Similarly, cameras $C_1$-$C_N$ are also situated in the rear area. It should be emphasized that an image projector and a camera may be paired, as shown for pairs $P_1C_1$, $P_2C_2$, $P_5C_5$, $P_6C_6$ and $P_NC_N$, and such a pair may be mechanically affixed, or even housed, in the same housing as shown for housing $350_1$, housing $350_2$, housing $350_5$, housing $350_6$, and housing $350_N$. For illustrative purposes, the image projector-camera pairs are shown as being laterally situated; however, a projector-camera pair may be formed by placing a projector atop a camera, or by placing a camera atop a projector. Alternatively, an image projector $P_3$ may be positioned singularly, with or without a housing $350_3$. Similarly, a camera $C_4$ may be positioned singularly, with or without a housing $350_4$. The number of cameras and the number of projectors in embodiments of the invention need not be equal, nor does there need to be any correspondence between each projector and some camera, or between each camera and some projector.

Continuing the description of FIG. 3, an image projector has a field of projection (e.g. $Field_1$, $Field_3$), and each camera has a field or view (e.g. $Field_2$, $Field_4$). The fields can be overlapping to varying degrees. In fact, in exemplary embodiments, the projection fields overlap substantially, and adjustments (e.g. projection blending) to avoid artifacts in and near projector overlap regions are performed, using the techniques described below, to produce a seamless, unified display on multi-touch display component 102. Similarly, one camera field of view may overlap with another camera field of view, and field of view adjustments (e.g. mosaicking) are performed using the techniques described below to create a unified camera image viewing a multi-touch display component 102, with no double coverage or missing areas, as if a single camera were viewing the entire multi-touch display surface. It is not necessary for a correspondence to exist between projector fields of projection and camera fields of view.

The large scale multi-user, multi-touch user interface apparatus top view and rear area 300 includes a touch illumination region 340. As shown the touch illumination region 340 is a region in front of the multi-touch display component 102. This region is substantially planar, though in exemplary embodiments, the thickness of the touch illumination region 340 is non-zero and finite. In some embodiments, the illumination region is created through use of multiple lasers positioned inside frame 105 around the boundary of interaction region 110, each laser being fitted with a lens that broadens the laser beam into a plane, and each laser oriented such that the emitted plane of light is substantially parallel to and near interaction region 110. In other embodiments, light-emitting devices (e.g. LEDs) positioned inside frame 105 along the border of interaction region 110 are used to provide the illumination for non-visible touch illumination region 340, with light guides inside frame 105, between the LEDs and interaction region 110, being used to aim the emitted LED light in direction substantially parallel to and near interaction region 110. As is described more fully infra, the touch illumination region 340 is used for detecting multi-touch inputs from one or more users.

Now, using the elements of the foregoing FIG. 1, FIG. 2, and FIG. 3 it is reasonable to construct a large scale multi-user, multi-touch user interface apparatus 100 comprising a multi-touch display component 102 comprising dimensions sufficient for accommodating multiple users, and for displaying projected images and for receiving from multiple users a large number (e.g. dozens) of touch inputs. Such a large scale multi-user, multi-touch user interface apparatus 100 may comprise a plurality of image projectors $P_1$-$P_N$ for projecting a projected image onto a multi-touch display component and may comprise a plurality of cameras $C_1$-$C_N$ for sensing user multi-touch input on a multi-touch display component.

Figure 4:
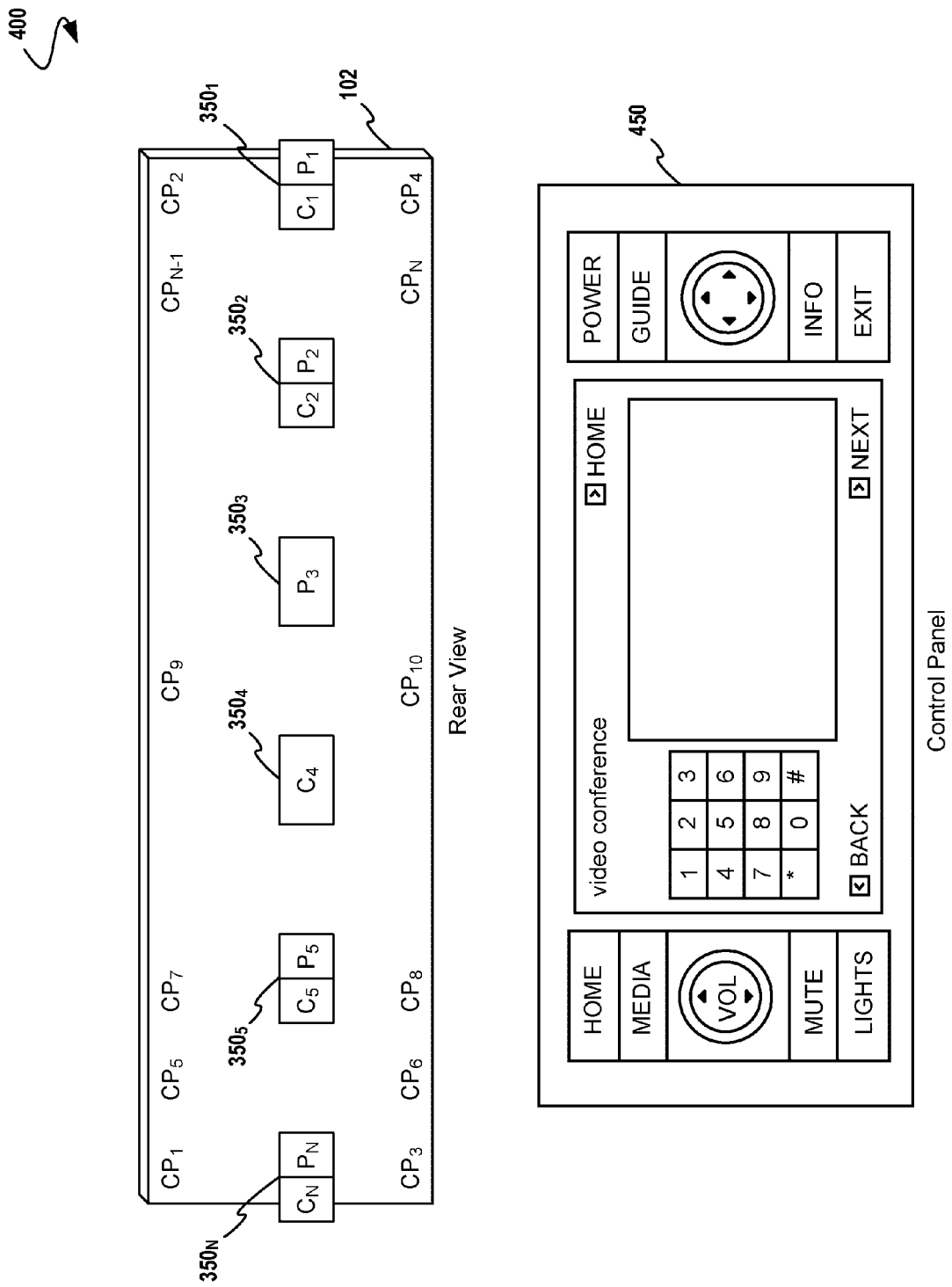
FIG. 4 illustrates a large scale multi-user, multi-touch user interface apparatus rear view, according to one embodiment.

FIG. 4 illustrates a large scale multi-user, multi-touch user interface apparatus rear view, according to one embodiment. As an option, the present large scale multi-user, multi-touch user interface apparatus rear view 400 may be implemented in the context of the architecture and functionality of FIG. 1 through FIG. 3. In particular, elements shown include a plurality of image projectors $P_1$-$P_N$ for projecting a projected image onto a multi-touch display component 102, a plurality of cameras $C_1$-$C_N$ for sensing user multi-touch input, calibration points $CP_1$-$CP_N$ at known locations on multi-touch display component 102, and a control panel 450. As earlier described, the image projectors $P_1$-$P_N$ may have overlapping fields of projection; thus the actual image projection area (i.e. an area fully within the field of projection) for each of the image projectors $P_1$-$P_N$ may be calibrated so as to avoid brightness and color artifacts in the areas of overlapping fields of projection. Various techniques to do so are disclosed below.

The control panel 450 serves for facilitating a human operator to control the setup and operation of the large scale multi-user, multi-touch user interface apparatus 100. In particular, a human operator may start or stop the apparatus or components thereof, may override any software controls to perform calibration and/or adjustments, and/or perform other maintenance.

Figure 5:
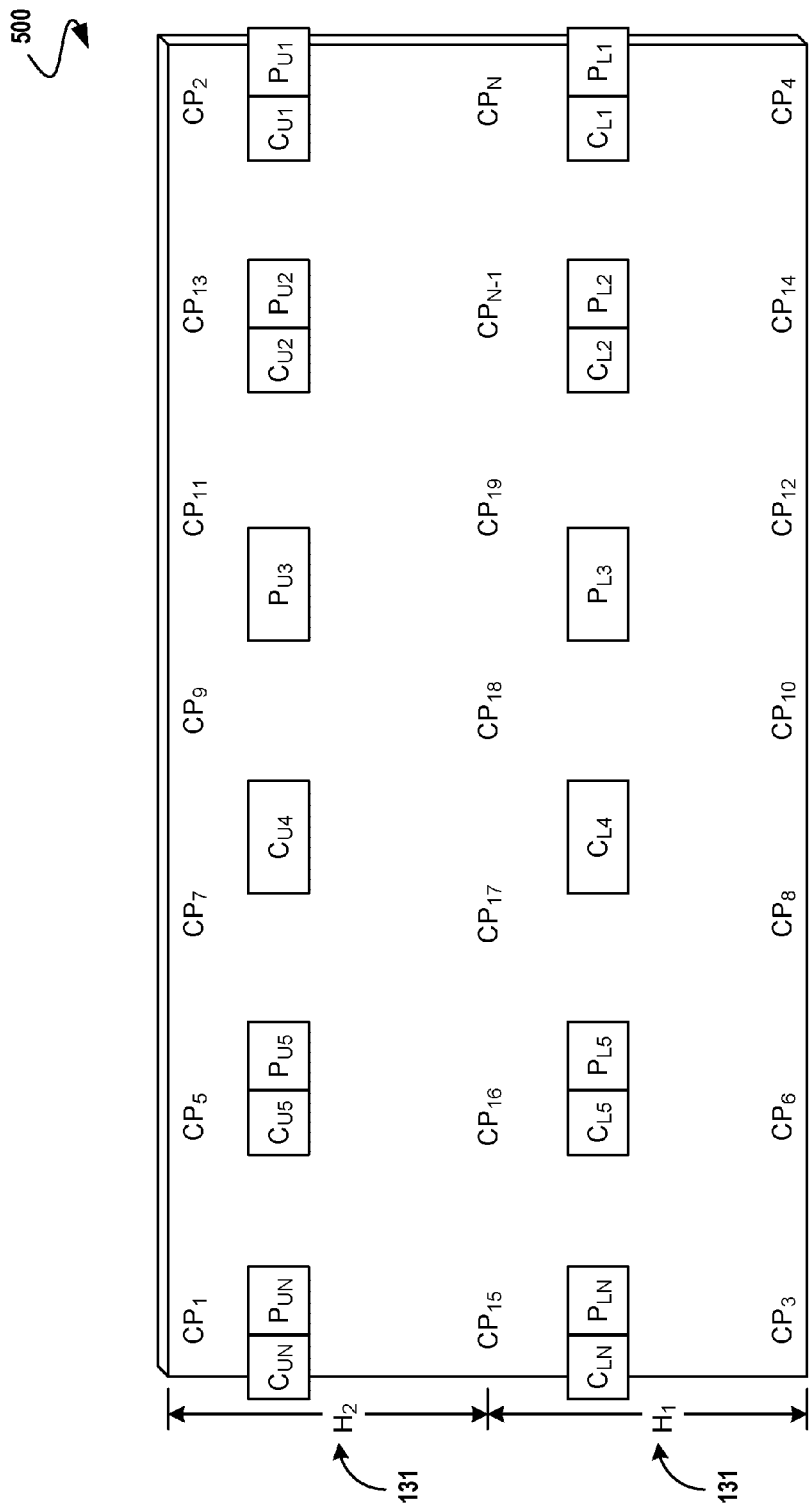
FIG. 5 illustrates a large scale multi-user, multi-touch user interface apparatus alternative rear view, according to one embodiment.

The juxtaposition of the plurality of image projectors $P_1$-$P_N$ for projecting a projected image onto a multi-touch display component 102, and the juxtaposition of the plurality of cameras $C_1$-$C_N$, is strictly exemplary and other orientations are possible and envisioned. In particular, FIG. 5 illustrates the embodiment of a large scale multi-user, multi-touch user interface apparatus alternative rear view 500, which embodiment includes two tiers of image projectors and cameras, namely an upper tier of $P_{U1}$-$P_{UN}$ for projecting images upon an upper portion of multi-touch display component 102, and an upper tier of cameras $C_{U1}$-$C_{UN}$ for viewing an upper portion of multi-touch display component 102; and a lower tier of projectors $P_{L1}$-$P_{LN}$ for projecting images upon a lower portion of multi-touch display component 102, and a lower tier of cameras $C_{L1}$-$C_{LN}$ for viewing a lower portion of multi-touch display component 102. Embodiments with two tiers might include an additional row of calibration points $CP_{15}$-$CP_N$. More generally, an embodiment with M tiers might have M rows of image projectors, M rows of cameras, and M+1 rows of calibration points. In other embodiments, a plurality of image projectors might be arranged as a linear array of 1 by M projectors, or a rectangular array of M by N projectors, or a square array of M by M projectors. In similar fashion, the cameras might be arranged such that the plurality of cameras might be arranged as a linear array of 1 by M cameras, a rectangular array of M by N cameras, or a square array of M by M cameras. As earlier described, image projectors, cameras and calibration points need not be oriented precisely in a linear or rectilinear array, or disposed in an equidistant fashion, although it might be convenient to so orient. Also, embodiments of the invention may have unequal numbers of projectors and cameras, with the arrangement of the cameras not corresponding to the arrangement of the projectors. In short, the number and arrangement of projectors is not constrained by the invention, except that the fields of projection, when taken together, should cover multi-touch interaction region 110. Similarly, the number and arrangement of cameras is not constrained by the invention, except that the camera fields of view, when combined, should cover multi-touch interaction region 110.

Figure 6:
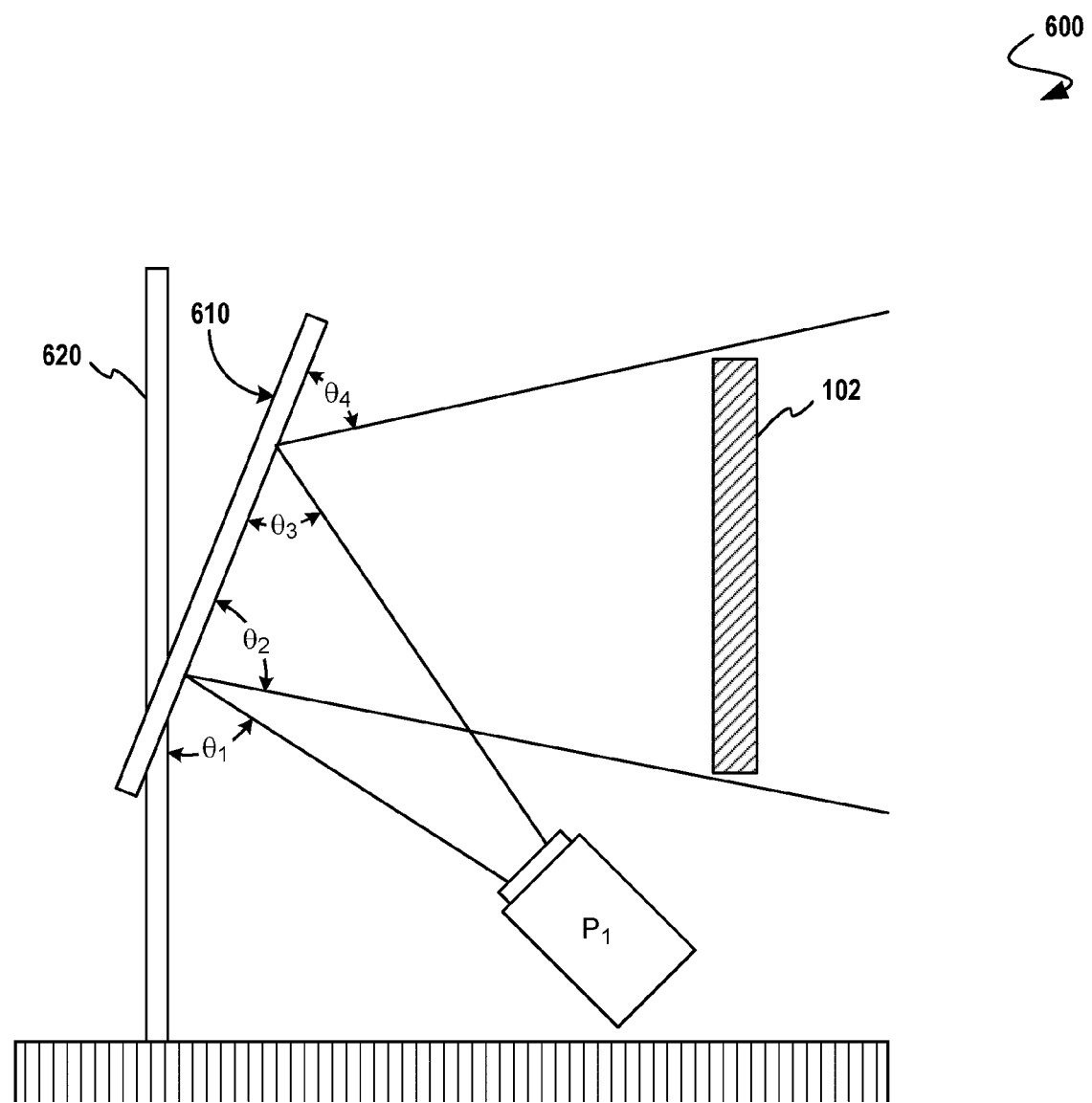
FIG. 6 illustrates a large scale multi-user, multi-touch user interface apparatus alternative left side view using a mirror, according to one embodiment.

FIG. 6 illustrates a large scale multi-user, multi-touch user interface apparatus alternative left side view using a mirror, according to one embodiment. As an option, the present large scale multi-user, multi-touch user interface apparatus alternative left side view 600 may be implemented in the context of the architecture and functionality of FIG. 1 through FIG. 5. As shown, the elements in FIG. 6 include an image projector $P_1$ juxtaposed so as to project onto a mirror 610, which mirror in turn reflects onto a multi-touch display component 102. In some embodiments, the mirror 610 is affixed to a support structure 620, which may facilitate adjustment of angles $\theta_1$, and $\theta_3$. In some embodiments, the shape and material comprising mirror 610 is substantially flat. In other embodiments, the mirror 610 is shaped to achieve a convex optic effect, or alternatively the mirror 610 is shaped to achieve a concave optic effect.

Figure 7:
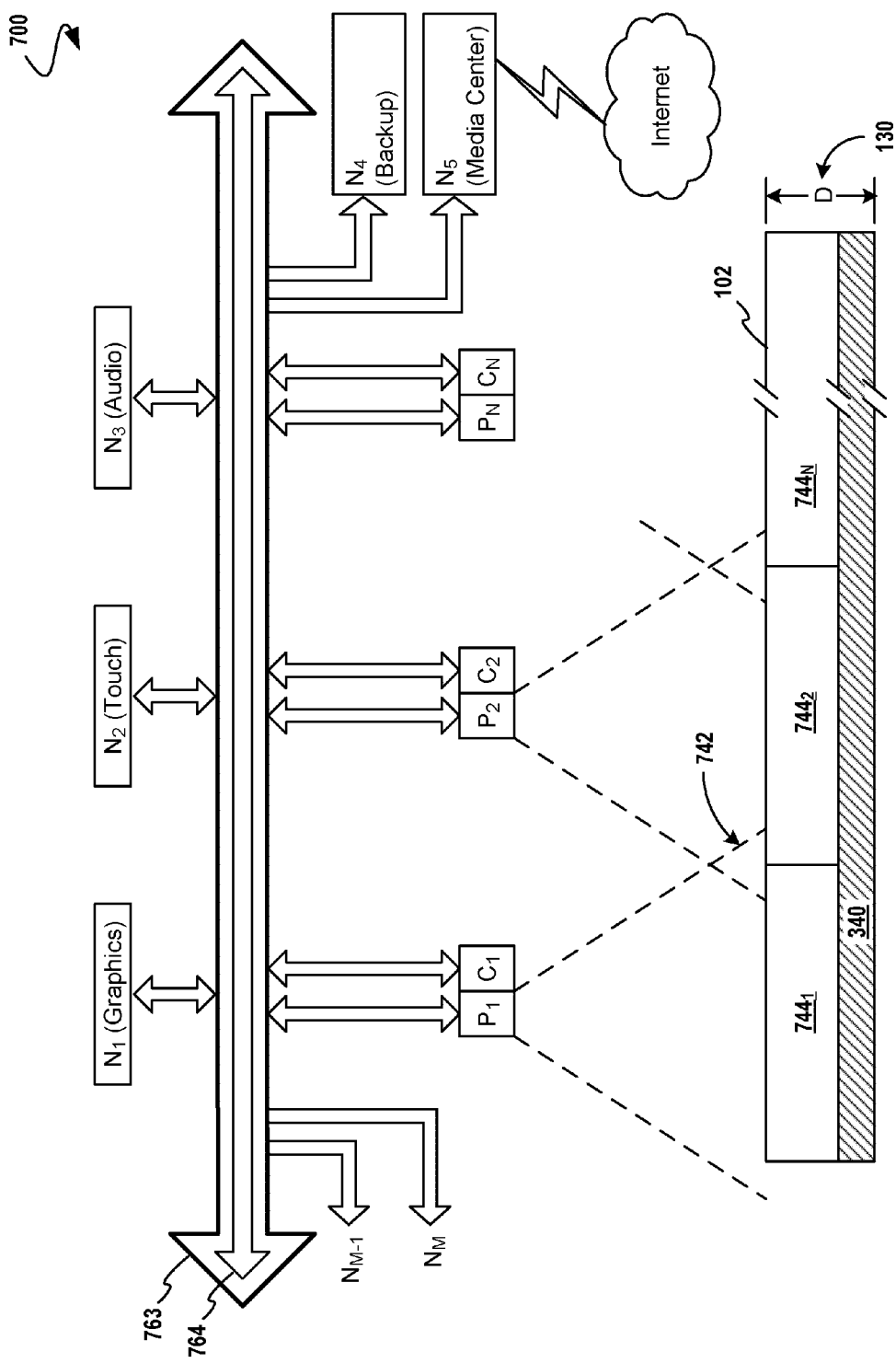
FIG. 7 is a system schematic for a large scale multi-user, multi-touch user interface apparatus top view, according to one embodiment.

FIG. 7 is a system schematic for a large scale multi-user, multi-touch user interface apparatus top view, according to one embodiment. As an option, the large scale multi-user, multi-touch user interface apparatus top view 700 may be implemented in the context of the architecture and functionality of FIG. 1 through FIG. 6. As shown, image projectors $P_1$-$P_N$ and cameras $C_1$-$C_N$ are connected via a communication link 763. The communication link 763 might comprise a physical connection (e.g. Ethernet, gigabit Ethernet, Fibre Channel, etc), or it might comprise a logical connection link 764 or protocol (e.g. TCP, FCP, HTTP, etc), or some combination of physical and logical connections. In fact and as shown, any of the projectors $P_1$-$P_N$ and any of the cameras $C_1$-$C_N$ may communicate with any processing node $N_1$-$N_M$. Moreover, any processing node from among $N_1$-$N_M$ may communicate with any other processing node $N_1$-$N_M$.

In some embodiments, particular functions may be implemented via processing within a particular node. As shown in the embodiment of FIG. 7, graphics functions are served by graphics processing node $N_1$, user multi-touch sensing is performed by touch processing node $N_2$, and audio functions are served by audio processing node $N_3$. Also shown are computers including a backup processing node $N_4$, a media center processing node $N_5$, and expansion nodes $N_{M-1}$ and $N_M$. In the embodiment of FIG. 7, the media center processing node $N_5$ is uplinked to the Internet. Of course any of the aforementioned connections are purely illustrative, and any of the aforementioned partitioning and/or mapping of functions to particular nodes is also purely illustrative, and many other connections, partitions, and mappings are possible and envisioned.

In some embodiments, image projectors $P_1$-$P_N$ are arranged such that their fields of projection produce some projection overlap 742 of image projection onto the rear surface of a multi-touch display component 102. As earlier mentioned, one or more techniques might be used to adjust projected imagery in order to create seamless display on multi-touch display component 102, and such techniques might use one or more graphics processing nodes $N_1$ to perform graphics processing, possibly including calibrations of multiple image projectors and transformations of images for projection onto the rear surface of a multi-touch display component 102. As shown image projector $P_1$ has a field of projection $744_1$, and similarly projectors $P_2$-$P_N$ have fields of projection $744_2$-$744_N$, respectively. As is further described, the seamless display on multi-touch display component 102 created from fields of projection $744_1$-$744_N$ may be divided in order to create more than one user physical spaces (e.g. zones, silos), each of which physical spaces may be dedicated to a particular user. In some cases a single silo may be contained within a single field of projection, in other cases a single silo may correspond to portions of two or more fields of projection, and in some cases a single field of projection may contain multiple silos and a fraction thereof. In more general terms, a first silo provides a first user interface for a first user by displaying images within a first silo. In other cases, user spaces (e.g. zones, silos), may be partially or fully overlapping; for example in a game-playing situation when multiple players share the same game scene. In still other cases, user spaces (e.g. zones, silos), may change shape and size over time. In still other cases, user spaces (e.g. silos, tiled zones), may be substantially non-overlapping; for example in a situation when multiple players interact using substantially adjacent spaces. User spaces (e.g. zones, silos), may change shape and size over time.

The cameras $C_1$-$C_N$ serve in conjunction with any one or more instances of a touch processing node $N_2$ for receiving touch input from a user. Thus the large scale multi-user, multi-touch user interface apparatus 100 is operable to process multi-touch inputs for a particular user (e.g. within a particular silo) and is further operable to do so independent of projections or multi-touch inputs from any other silo(s).

Now, using the elements of the foregoing FIG. 1 through FIG. 7, it is reasonable to construct a large scale multi-user, multi-touch user interface apparatus 100 comprising a multi-touch display component 102 having dimensions sufficient for accommodating multiple users, and which large scale multi-user, multi-touch user interface apparatus 100 includes user interface software for interfacing a plurality of users to a computing device by providing a plurality of silos, one for each user, wherein a first silo provides a first user interface for a first user by displaying images and receiving touch input from the first user independent of display of images and any multi-touch input corresponding to other silos.

Configurations Using Projector and Camera Calibration Apparatus

Figure 8:
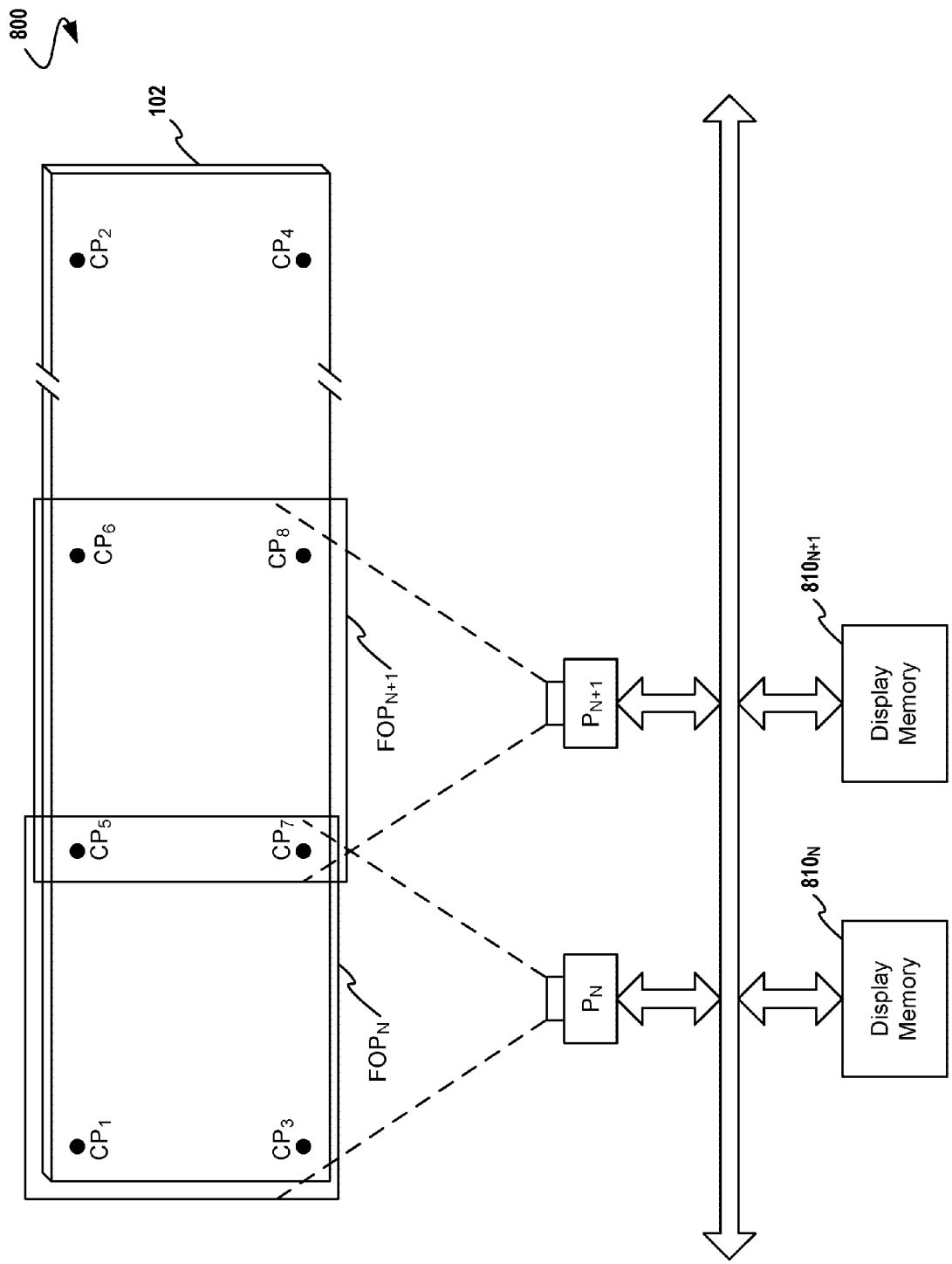
FIG. 8 is a depiction of a plurality of sensing calibration points within a large scale multi-user, multi-touch user interface apparatus, according to one embodiment.

FIG. 8 depicts a plurality of sensing calibration points within a multi-touch user interface apparatus, according to one embodiment. As an option, the multi-touch user interface apparatus 800 may be implemented in the context of the architecture and functionality of FIG. 1 through FIG. 7. As shown calibration points $CP_1$-$CP_8$ are distributed substantially evenly around the periphery of the multi-touch display component 102. Also shown are a plurality of projectors $P_N$ and $P_{N+1}$, each with corresponding fields of projection $FOP_N$ and $FOP_{N+1}$. Within each field of projection are at least four calibration points. For example, $FOP_N$ has within it the four calibration points $CP_1$ (top left of $FOP_N$), $CP_5$ (top right of $FOP_N$), $CP_3$ (bottom left of $FOP_N$) and $CP_7$ (bottom right of $FOP_N$). These calibration points may be calibration assemblies that include electronics capable of sensing the presence or absence of light (e.g. photocells or other photo-active elements capable of sensing the presence or absence of at least one wavelength of light). In other cases these calibration points may include markings (e.g. fiducial markings) capable of being sensed by a camera. As is described in paragraphs below, the light sensing from these calibration points are used in operation within a method for calibrating a user interface apparatus having a display comprised of a plurality of image projectors.

Given an embodiment including fiducial markings, and a plurality of cameras, the cameras may be calibrated by associating known locations of fiducial markings to memory locations within the cameras' image buffers. When the camera(s) are thus calibrated, one or more projectors may be used to project known image patterns onto the multi-touch display component 102, and the active/inactive (e.g. light dark) projection at the calibration points are compared to expected values. Some embodiments further measure differences between the actual projection values of the known image patterns measured at the location of fiducial marking points as compared to expected values and the measured differences are collated to produce the projection transformation (and inverse transformation), as discussed further infra.

At least one method for calibrating a user interface apparatus having a plurality of image projectors relies in part on characteristics of an image projector that uses a display memory. That is, the image projectors described herein, and for which methods of use and calibration are disclosed herein, are of a class of image projectors that display images as are represented in a digital memory array (e.g. RAM, DRAM, on or in a graphics card, or on or in an image frame buffer device). As shown each instance of projectors $P_N$ through $P_{N+1}$ is assigned a corresponding display memory $810_N$ through $810_{N+1}$. This is but one embodiment, and other embodiments are possible and envisioned, including shared display memories, ping-pong memories, or even a single memory combining the address space of all display memories $810_N$ through $810_{N+1}$.

Figure 9:
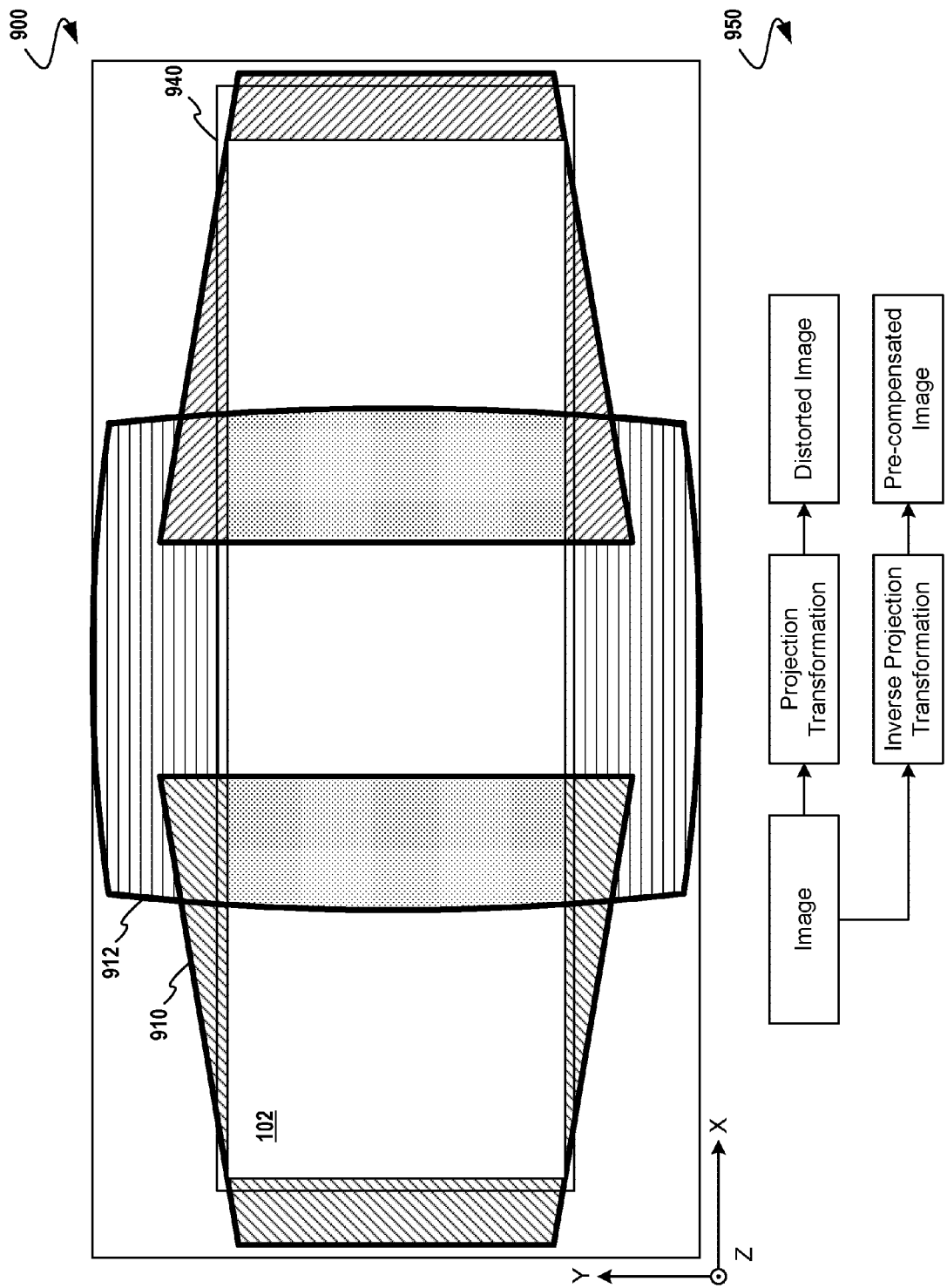
FIG. 9 shows distorted and overlapping projected images upon a contiguous multi-touch user interface apparatus 900, and a data flow for producing a corrected image projection, according to one embodiment.

FIG. 9 shows distorted and overlapping projected images upon the rear of a contiguous multi-touch user interface apparatus 900, and a data flow for producing a corrected, seamless image projection covering a multi-touch display component 102. As an option, data flow for producing a corrected image projection 950 may be implemented in the context of the architecture and functionality of FIG. 1 through FIG. 8, or it may be implemented in any environment. Embodiments of the invention may define a physical display coordinate system 940 (e.g. a physical display coordinate space), on the surface of multi-touch display component 102. For example, in FIG. 9, physical display coordinate system 940 may be regarded as two-dimensional and rectangular, with its origin at the lower-left of the rear of multi-touch display component 102, with positive x- and y-directions extending to and upward, respectively. Other embodiments of the invention may use non-planar or non-rectangular physical display coordinate systems, may orient coordinate axes differently, or may choose a coordinate origin at other locations on or near (e.g., just outside the border) to multi-touch display component 102.

The process of projecting an input image by a projector onto a display surface may introduce a variety of geometric distortions, as described below. As shown in FIG. 9, a first distorted projection field 910, a second distorted projection field 912 and a third distorted projection field 914 are representative of the image distortions introduced by any one or more elements or characteristics of a projection system. For example, image projector optics may not perform orthogonally, may include lens distortion, and/or may not perform as designed. Further, a mirror (if used) may introduce optical distortion. Even the physical placement of a projector and/or a mirror relative to the multi-touch display component 102 upon which the images are projected introduce image errors, commonly known as "keystoning", if the central axis of projection is not orthogonal to the plane of multi-touch display component 102. Also, for embodiments of the invention using a non-planar multi-touch display component 102, the non-planarity of the component will itself introduce projection distortion. The boundaries of the distorted projection fields are shown in the physical display coordinate space 940.

Accordingly, if a projected image (e.g. a square) is to be projected such that a human user would perceive it to be undistorted (e.g. a square) in the physical display coordinate space 940, then the image (e.g. a square) might be subjected to an image transformation to compensate for the geometric image distortions introduced by the projection process. Strictly as an example, if the projector corresponding to the first distorted projection field 910 were somewhat off-center from the precise trisect of the width dimension of the multi-touch display component 102, then a square image would be projected as a quadrilateral with the geometric distortions apparent from the first distorted projection field 910. As another example, if the mirror 610 employed by the projector corresponding to the second distorted projection field 912 were somewhat curved from being precisely flat, then a square image would appear as a shape with curved edges, with the geometric distortions apparent from the shape of the second distorted projection field 912.

When it is desired to use multiple projectors to produce seamless image projection 920 covering a multi-touch display component 102, correction techniques must be applied to align the projected imagery across different projectors within physical display coordinate system, and to produce smooth color and brightness gamut across the entirety of the surface. For example, in projector overlap regions, brightness doubling would occur if no correction is applied. Furthermore, because many projectors produce a "black offset" of non-zero light emitted when attempting to project a black input image, projector overlap regions show increased brightness even when black input is projected. Different projectors in a multi-projector display may also have different brightness and color transfer functions (relating digital image input to light output), such that the same input image projected by different projectors in isolation will have slightly different brightness and color characteristics. A seamless multi-projector display employing projectors with different brightness and color transfer functions must account for these differences in order to avoid producing noticeable color and brightness artifacts when a homogeneous image stretches across projector overlap regions.

To produce a seamless, unified image display across a multi-touch display component 102 using multiple projectors, corrections should be applied to the input imagery supplied to each projector to account for all of the geometrical, brightness, and color issues discussed above. In some embodiments, an input image will be subjected to one or more techniques for pre-compensating an input image for subsequent projection, such that the image as projected appears to a user to be an orthogonal projection of the input image, and such that the overall multi-projector display appears seamless. In such techniques, a representation of the input image undergoes a geometric and photometric (i.e., brightness and color) transformation that compensates for the projection process and for the overlap of multiple projectors. These transformations may also be used to account for non-uniformities in the color of multi-touch display component 102, and for ambient light in the environment that falls on multi-touch display component 102. A data flow for describing this concept is shown at 950.

Figure 10:
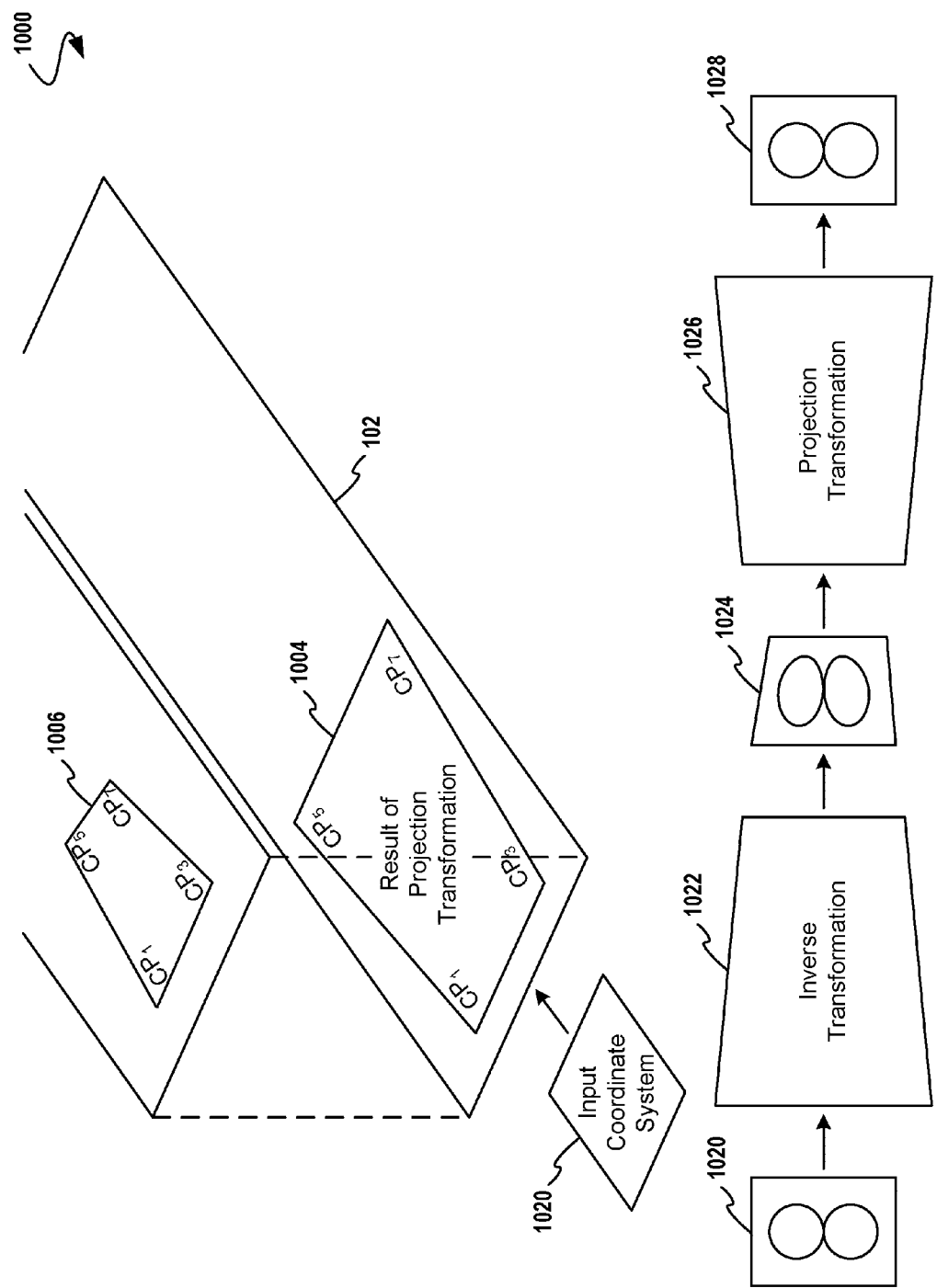
FIG. 10 is a graphical depiction of a distortion correction technique, according to one embodiment.

FIG. 10 is a graphical depiction of a geometric distortion correction technique, according to one embodiment. As an option, the geometric image compensation technique 1000 for producing a corrected image projection may be implemented in the context of the architecture and functionality of FIG. 1 through FIG. 9, or the geometric image compensation technique 1000 may be implemented in other environments. As shown, the technique compensates for projector distortion by mapping an object from an input coordinate system 1020 to an inverse distorted coordinate system 1004. Projection of the object from its inverse distorted representation in 1006 then results in the projection in a physical display coordinate system having proportions nearly identical, up to a scale factor, to the original input image.

In one embodiment, an object from an input coordinate system 1020 is viewed as being comprised of an image object in an input coordinate system 1020, which image is fully within the bounds of a quadrilateral. Generally, though not necessarily, the aforementioned quadrilateral is a rectangle. The image object in input coordinate system 1020 undergoes a transformation, specifically an inverse projection distortion transformation 1022 that is the inverse of projection transformation 1026, resulting in the image object being represented in an inverse distorted coordinate system 1024 to compensate for the projection distortion (e.g. projection transformation 1026). Thus the image object in input coordinate system 1020, when displayed by the distorting projector(s) appears in physical display coordinate system 940 with proportions nearly the same, up to a uniform scale factor in all dimensions, as in the input coordinate system 1020. The proportions of the projected object in physical display coordinate system 1028 may differ slightly from its actual input image proportions to the extent of the accuracy of image projector calibration, mathematical representation of the projection transformation 1026 (including limited precision numeric representation), and mathematical representation of the inverse transformation 1022 (including limited precision numeric representation and inverse transformation derivation techniques).

Projection transformation 1026 and inverse projection transformation 1022, which relate coordinates in input (projector) coordinate system 1020 and physical display coordinate space 940, may take a variety of different forms in embodiments of the invention. In some embodiments, both transformations may be represented as non-parametric, mesh-based distortions. In these embodiments, an input coordinate to the transformation is compared to a polygonal mesh of points covering a region of the input coordinate space, and a set of mesh points forming a polygon (e.g. a triangle, or quadrilateral) that contains the input coordinate is identified. The location of the input coordinate with respect to this polygon is computed, for example as barycentric coordinates with respect to a triangular polygon, or in terms of a homography defined by the four points of a quadrilateral. Each point in the mesh corresponds to a point in a second mesh in the output coordinate system, so that the polygon bounding the input coordinate corresponds to a polygon in the output coordinate space. The point in output space having the corresponding location to the output space polygon as the input coordinate has to the input space polygon is returned as the transformed output space location of the input coordinate. This mesh-based scheme may be more generally implemented as a two-dimensional lookup table, with interpolation being performed in each of the two dimensions to determine the output coordinate corresponding to an input coordinate for which no exact entry exists in the table. A two-dimensional lookup table may represent arbitrary coordinate space transformations, including those that are not based on polygonal meshes.

In other embodiments of the invention, the coordinate transformations may be represented as mathematical equations. For embodiments in which multi-touch display component 102 is planar, a homography is a reasonable choice for a mathematical representation of the projection transformation 1026. In common practice of projective geometry, a homography is typically expressed as a 3×3 matrix, applied to the homogeneous representation of two-dimensional coordinates. Each homogeneous coordinate is a vector three numbers, consisting of the original two-dimension coordinate and a scale factor. The inverse projection transformation 1022 may be obtained by inverting the matrix for the projection transformation homography, to obtain a new 3×3 matrix.

Figure 11:
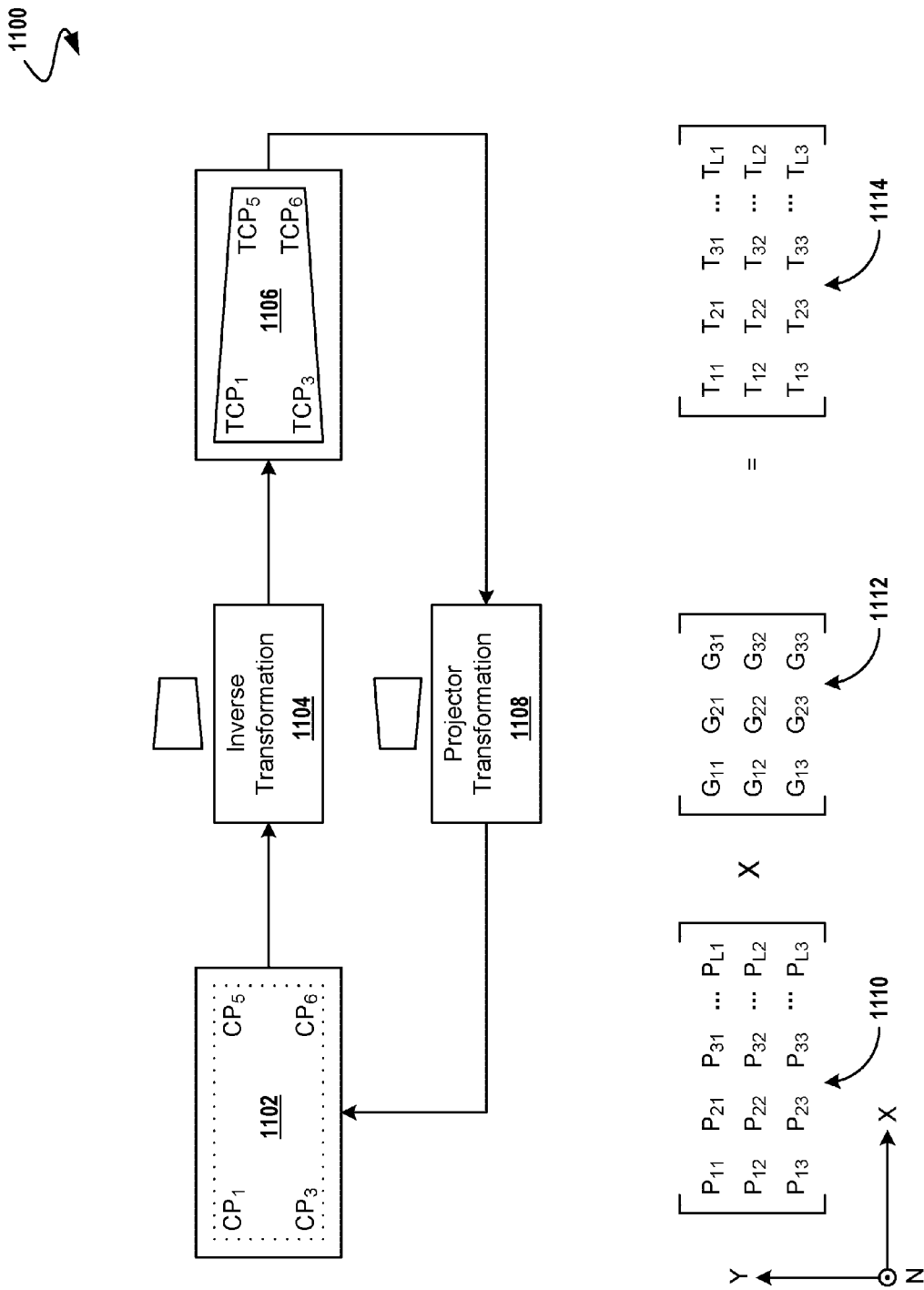
FIG. 11 is a depiction of a mathematical transformation as part of a distortion correction technique, according to one embodiment.

FIG. 11 is a depiction of a linear mathematical transformation as part of a distortion correction technique, according to one embodiment. As an option, the image compensation techniques 1100 for producing a corrected image projection may be implemented in the context of the architecture and functionality of FIG. 1 through FIG. 10, or the image compensation techniques 1100 may be implemented in other environments. Shown in FIG. 11 is a representation of an image in input coordinate system 1102. The image in input coordinate system 1102 (e.g. input image representation) is a rectangle with the expected four corners and with parallel opposing edges, and with 90-degree angles at the corners. Of course the true input image comprises not only the edges of the shape, but also every point (e.g. pixel) within the shape, that is, the columns of the matrix containing values $P_{11}$, $P_{12}$, $P_{13}$, $P_{21}$, through $P_{L3}$ as shown in matrix 1110. Given this matrix of points then, each point can be transformed by a matrix 1112 such that the resulting matrix of points in physical display space 940, shown as the columns of the matrix containing values $T_{11}$, $T_{12}$, $T_{13}$, $T_{21}$, through $T_{L3}$, is the result of the transformation of matrix 1114 using matrix values $G_{11}$, $G_{12}$, $G_{13}$, $G_{21}$, through $G_{33}$. Other forms of mathematical transformations between two-dimensional coordinate spaces, including non-linear transformations such as quadric transfer functions, may be used in embodiments of the invention to relate input coordinate system 1102 and a physical display coordinate system.

Of course the example shown in FIG. 11 is a depiction of a two-dimensional mathematical transformation as part of a two-dimensional distortion correction technique. In exemplary embodiments, the mathematical transformation may be carried out as a three-dimensional transformation. In such a case the dimension of depth is captured in the matrices, and the transformation performs a mathematical transformation in three dimensions of width, height, and depth, thus correcting an image from input coordinate system 1020 to a physical display coordinate system 940.

Returning to the depictions of FIG. 10, the geometric transformation 1022 can be used to shift, rotate, scale, and otherwise geometrically transform projected imagery on multi-touch display component 102. Hence, geometric transformation 1022 may be used not only to invert projection distortion, but also to align the imagery of one projector with the imagery projected by a second projector, such that the two projectors show identical image content in the region where they overlap. For embodiments in which multi-touch display component 102 is planar and the projection system introduces no non-linear distortions, a homography matrix is the most general transformation relating projection frame buffers to the display plane, and hence may be used to both undistort projected imagery and align imagery across projectors. In other embodiments, a non-parametric correction function based on mesh correspondences of lookup tables may be used, possibly in combination with homographies, to achieve proper geometric alignment and undistortion of projected imagery.

In the context of compensating for distortions of projected images upon a contiguous multi-touch user interface apparatus, if a projector transformation can be modeled as a matrix transformation, then the inverse transformation can also be modeled as a matrix and used in compensating for a projection system such that the projection of an input image (e.g. an input square) appears similar to the input image (e.g. a scaled-up square) when projected. In somewhat more formal terms, given an input image in an input coordinate system 1102, applying an inverse transformation 1104 to compensate for projector transformation 1108 causes the projected image in the resulting coordinate system 1106, when projected (using projector transformation 1108), to look like the input image. It remains then to describe methods for calibrating (measuring) the geometric transformation (distortions) of a projector such that an inverse transformation can be determined for use in geometric correction and projector alignment.

Many methods for automatically calibrating multi-projector displays using cameras are known in the art of computer vision. Since embodiments of the invention employ cameras observing the rear of multi-touch display component 102, many of these known methods are suitable for use in the invention. However, in some embodiments, it may be difficult to use these methods, because imagery projected onto the rear of multi-touch display component 102 may appear sharp to observers standing in front of it, but blurry to cameras observing from the rear. This occurs, for example, when projection screen material is mounted on the front of or inside a clear substrate (e.g. glass or acrylic) used to construct a multi-touch display component 102. A sheet of projection screen material may be placed on the rear of multi-touch display component 102 during calibration to circumvent this problem, but adding and removing this sheet may be difficult to automate. In other embodiments, methods known in the art of projection systems for manual calibration of multi-projector displays may be used to align and undistort the multiple projectors in order to form a seamless display on multi-touch display component 102. Obviously, however, such methods retain the disadvantage of not being automatic. Hence, it is desirable in some embodiments of the invention to employ a third class of calibration technique, in which light sensors permanently mounted in multi-touch user interface apparatus 100 are used to detect and correct distortion and alignment of the multiple projectors used, in order to form a seamless display on multi-touch display component 102. Such techniques may be used in combination with pre-calibration steps, performed only once in possibly non-automated fashion, to provide information that is unlikely to change over time, such as projector lens distortion characteristics.

Figure 12:
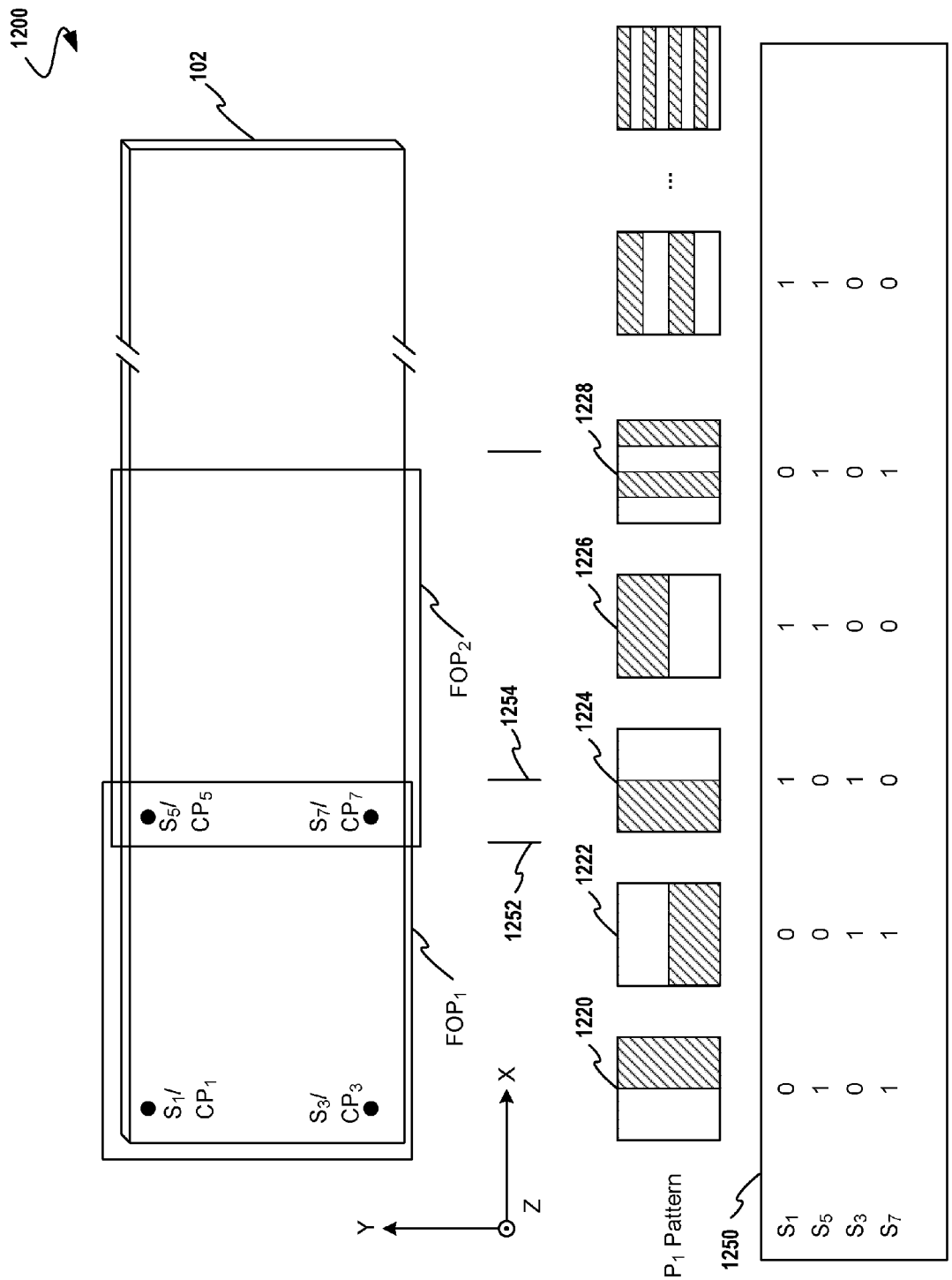
FIG. 12 is a depiction of a technique for image projector calibration using a series of projected pattern sequences, according to one embodiment.

In some embodiments of the invention, fully automatic multi-projector display calibration relies on permanently mounted light sensors located around the border of the rear of multi-touch display component 102. FIG. 12 is a depiction of a technique for multi-projector calibration using a series of projected pattern sequences, according to one embodiment. As an option, the technique for multi-projector calibration 1200 may be implemented in the context of the architecture and functionality of FIG. 1 through FIG. 11, or the technique for multi-projector calibration 1200 may be implemented in other desired configurations. As shown, FIG. 12 includes a rear view of a multi-touch display component 102, upon which are sensor points labeled $S_1$, $S_3$, $S_5$, and $S_7$. In this exemplary embodiment of the invention, the sensor points are substantially coincident with camera calibration points $CP_1$, $CP_3$, $CP_5$, and $CP_7$, respectively, but in other embodiments of the invention, the sensor points are located independently from the locations of the camera calibration points. The sensor points are affixed at known locations in a physical display coordinate system 940 of multi-touch display component 102. For example, in FIG. 12, physical display coordinate system 940 may be regarded as two-dimensional and rectangular, with its origin at the lower-left of the rear of multi-touch display component 102. In embodiments involving fully-automatic or computer-aided operations, the technique uses a processing node in communication with each projector in the system. Of course, and as shown in FIG. 7, any of the projectors $P_1$-$P_N$ may communicate with any processing node $N_1$-$N_M$. Calibration commences when, under computer control, projectors $P_1$-$P_N$ (i.e. all projectors in the system) are turned off except one (e.g. $P_1$ in this example). The first image of the projected pattern sequence is then displayed, the computer reads the values found at sensor points $S_1$, $S_3$, $S_5$, and $S_7$, and this process repeats until all patterns in the sequence have been projected and corresponding sensor readings have been obtained for each pattern. Finally, the computer compares the sequence of sensed (actual) values at each sensor to the known sequences of values projected at each projector pixel, in order to determine which projector pixel(s) correspond to each sensor point.

As shown in this example, a pattern sequence involving successively narrower bands (e.g. an alternating active/inactive, black/white pattern sequence) is prepared for display. It should be emphasized that the patterns in this sequence are patterns for which a deterministic model (e.g. a memory array of pixel locations) may be generated, and thus the complete series of projected values for each and every projector pixel may be generated deterministically from the model and stored. The model shown can be described as two sequences, one having vertical bands and one having horizontal bands, with each successive band pattern exhibiting bands of width one half the band width of the previous pattern in the corresponding vertical or horizontal sequence. The initial pattern in the horizontal sequence may have the top half of the projected image being black and the bottom white (or vice versa), while the initial pattern in the vertical sequence may have the left half of the projected image black and the right half white (or vice versa). Successive patterns in each sequence use bands of increasingly finer width (halving the width each time), until the last pattern consists of alternating rows or columns of black and white pixels. As a further optimization, a technique called Gray coding may be used to shift the location of the bands in each image, so that band boundaries line up less frequently across successive images. In the course of displaying these two image sequences, every projector pixel projects a unique sequence of black and white values, different from that of any other projector pixel. The projected pattern sequences are not limited to only those images shown in the depiction of the embodiment of FIG. 12. Rather many other sequences are possible and envisioned, and may correlate to the shape and dimensions of the multi-touch display component 102

Each value in the sequence of values sensed at each sensor point may be compared to a threshold to classify each sensed value as corresponding to a projected "black" or "white" pixel, with the threshold at each sensor being determined, for example, as the mid-point between readings obtained when all-black and all-white images are projected. The sequence of classified readings at each sensor is compared with the collection of stored black/white sequences projected at each of the projector pixels to determine which projector pixel illuminated the sensor during projection of the pattern sequence. This provides a correspondence between the location of the sensor in the physical display coordinate space 940 and the location of a projector pixel in a projector input coordinate space 1020.

Following this example, sequences of values at each of the sensor points $S_1$, $S_3$, $S_5$, and $S_7$ are shown in the rows of FIG. 12 for the example pattern sequence 1250. In these sequences, sensor readings judged to correspond to a black projected pixel are represented as "0", and sensor readings corresponding to a white projected pixel are represented as "1". The sequence of 0's and 1's at each sensor forms a bit string that may be compared with the bit strings stored for each pixel corresponding to the values projected by that pixel during display of the pattern sequence. A sensor receiving a given bit string of readings is identified as corresponding to the projector pixel having the same bit string of projected values. This creates a point correspondence between two coordinate spaces, specifically 1) the input image coordinate system 1020, which may also be considered the frame buffer of the projector, and 2) the physical display coordinate system 940 on the physical surface of multi-touch display component 102. In some embodiments, the projected pattern sequences do not extend all the way to images with bands having widths of one pixel, instead terminating with bands that are multiple pixels wide. In these embodiments, all pixels in a block of multiple projector pixels will project the same sequence of black and white values during the course of calibration, and the centroid coordinate of the block is used as the corresponding input image coordinate to the sensor receiving the same sequence of readings.

Embodiments of the invention use the correspondences, obtained as described above, between sensor locations in physical display coordinate space 940 (i.e., "screen space") and projector pixel locations in input image coordinate space 1020 (i.e. "projector space") in order to construct coordinate mappings between these spaces. As discussed above, these mappings must be sufficient to represent the geometric distortions imposed on input imagery by projection onto multi-touch display component 102. While some embodiments of the invention may use lookup tables or polygonal mesh correspondences to represent these mappings, other embodiments, particularly those using planar multi-touch display components 102, employ homographies to represent these coordinate mappings. A homography matrix between two planar coordinate systems may be computed, by well known methods in the art of projective geometry, from four or more point correspondences between the two planar spaces. Hence, embodiments of the invention that use homographies to represent the projector-screen mapping, and its inverse, need to determine at least four correspondences between known sensor locations and projector pixels. These correspondences may be determined via the method based on pattern sequence projection described above, or via other methods, including manual selection by a human operator via a graphical interface. Both the forward (projector-to-screen) and inverse (screen-to-projector) mapping may be obtained from the point correspondences. Referring to FIG. 10, the inverse projection transformation 1022 applied to projector input imagery 1020, in order to geometrically undistort it, is an example of a screen-to-projector mapping computed from the point correspondences.

In embodiments of the invention in which multiple projectors are used to produce seamless imagery on a multi-touch display component 102 that is substantially planar, homographies may be obtained to relate each of the projector input image coordinate systems 1020 to the same physical display coordinate space 940. By mapping all projectors into the same physical display coordinate space, geometric alignment of multiple projectors is achieved. More specifically, the location of the boundary of each projector's field of projection as it intersects planar multi-touch display component 102 is determined by methods well known in the art of projective geometry, and regions of overlap may then also be computed. The descriptions of the boundaries of fields of projection, as well as the overlap regions, may be in terms of coordinates of physical display space 940 or projector input coordinates 1020, since mappings between the two types of spaces are determined. For this geometric calibration of multiple projectors to operate properly, at least four sensors $S_1$-$S_N$ must be located within the field of projection of each projector. Different sets of at least four sensors may be present within the fields of projection of different projectors, as long as the locations of all sensors used are known in a single physical display coordinate space 940.

In some embodiments, in addition to the geometric alignment of multiple projectors a photometric correction might be applied to correct brightness and color artifacts that detract from the seamlessness of the display upon multi-touch display component 102. For example, in projector overlap regions where brightness doubling occurs, projector blend maps are computed such that the brightnesses of the two projectors "cross-fade" within the overlap region. The blend maps are images whose pixel values are used to pre-multiply corresponding locations in input imagery to be displayed by the projector, so that the brightness of the projector is attenuated closer to the edges of its field of projection. For example, a vertical band of overlap region may occur for two adjacent projectors (e.g. $P_1$ and $P_2$) arranged horizontally. In the example shown in FIG. 12, this band is shown as a region from left overlap x-boundary 1252 to right overlap x-boundary 1254, and extending vertically for the height of the physical display coordinate space 940. Projector blend maps can be used to gradually decrease the brightness of the left projector image from left-to-right across the overlap region (e.g. from left overlap x-boundary 1252 to right overlap x-boundary 1254), while a blend map applied to the right projector causes it brightness to gradually increase from left-to-right across the overlap region (e.g. from left overlap x-boundary 1252 to right overlap x-boundary 1254), with the total brightness of the two projectors varying smoothly (without discontinuities) in and around the overlap region. The general shape of the gradual increase or decrease may be linear in some embodiments, while in others it may take a nonlinear form such as co-sinusoidal. Many methods for computing blend maps for arbitrarily overlapping projectors are known in the art of image processing and projection display, and any are suitable for use in various embodiments.

Figure 13:
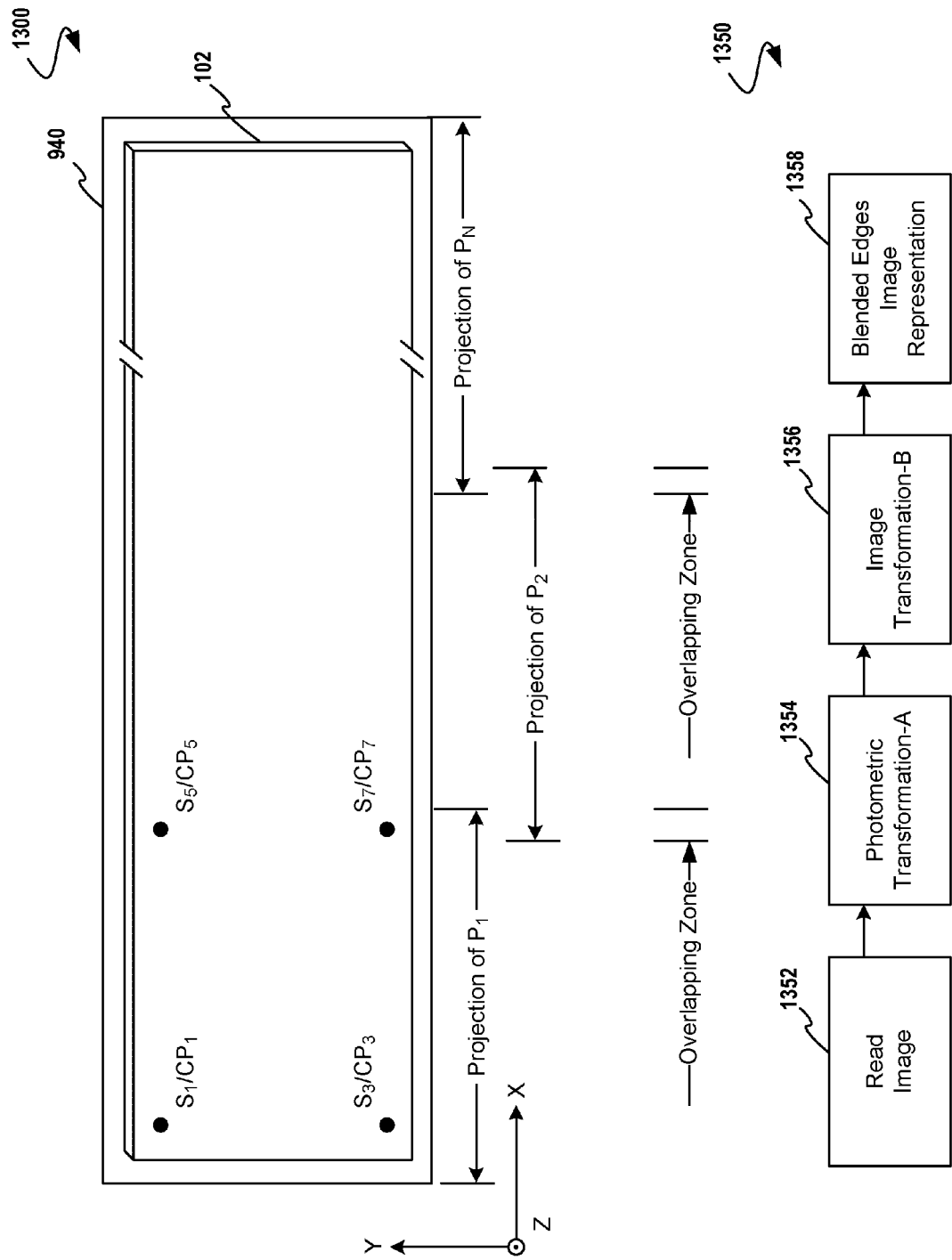
FIG. 13 depicts image projector calibration using a correction functions, according to one embodiment.

FIG. 13 depicts image projector calibration using a photometric correction functions, according to one embodiment. Differences in the color characteristics and other photometric characteristics of overlapping projectors (e.g. in the color transfer functions relating input color values to perceived brightness on a projection screen), may cause noticeable artifacts within and around projector overlap regions, and additional adjustments to may be applied to projected imagery, prior to projection, in order to minimize these artifacts. For example, the color transfer functions of each projector may be measured prior with a light meter or camera, and lookup tables may be computed so that application of these tables to each pixel of an input image compensates for any difference in color transfer functions across projectors.

In the method 1350, as shown in FIG. 13, an image for projection might be read (see operation 1352), and any number of photometric image transformations might be performed (e.g. photometric transformation-A 1354 (e.g. a color transformation, a brightness transformation) and/or image transformation-B 1356 (e.g. an edge transformation), resulting in a blended edges image representation 1358. Many other methods are possible and envisioned to well correct color differences in multi-projector displays, and these methods may be implemented in context of various embodiments of the invention.

In some embodiments of the invention, the fields of projection of one or more projectors may extend beyond the rear of multi-touch display component 102. As an option, it may be desirable to attenuate to black all "extraneous" projection regions that fall outside the area of a multi-touch display component 102. The projector input image coordinate space regions that correspond to these extraneous regions, and which could be attenuated to black, may be determined from the projector pixel locations corresponding to the calibration sensor locations, if the sensor locations are known with respect to a known shape of multi-touch display component 102. For example, if the sensors are known to be placed around the border, including at the peripheral vertices (e.g. corners), of a rectangular, planar multi-touch display component 102, then the corresponding borders in projector input image space may be determined by computing and extrapolating lines through the locations in projector input image space corresponding to the sensor locations. Regions between these lines and the edge of the field of projection may be set to black to avoid projecting into extraneous regions. Similar methods may be applied to embodiments of the invention using other shapes of multi-touch display component 102, and other placements of sensors relative to multi-touch display component 102, provided that both types of information are measured and known in advance of calibration.

Application of the aforementioned steps results in a virtual frame buffer within which the virtual display memory comprises the following characteristics: (1) the display memory corresponding to each image projector in the system abuts to the display memory of its neighbor image projector(s), (2) projector display memory overlaps are blended, and (3) the concatenation of all non-inactive display memory fills at least the x-y plane dimensions of the multi-touch display component 102.

Thus, it emerges from the foregoing that a method of calibrating a user interface apparatus may be described as: (1) projecting, using a memory array of pixel locations, a first projected pattern toward an array of at least four sensing calibration points for collecting a first sensed set of values; (2) projecting, using a memory array of pixel locations, a second projected pattern toward an array of at least four sensing calibration points for collecting a second sensed set of values; (3) comparing the second sensed set of sense values sensed at the said sensing calibration points to an expected set of values; and (4) calculating the pixel location within said memory array for the at least four sensing calibration points. Thus, given a sequentially finer-patterned sequence of projected patterns (e.g. the alternating pattern sequence of FIG. 12), namely a first projected pattern (e.g. pattern 1224) that matches an expected set of values, followed by a second projected pattern (e.g. 1228) that does not match a corresponding expected set of values, it can be known that the projector is calibrated only to the resolution of the last pattern that does match the corresponding expected set of values In an alternative embodiment a method of calibrating a user interface apparatus may be described as: (1) projecting a series of known patterns; (2) sensing light during each pattern projection at known screen locations; (3) determining correspondences between sequences of projected light values at a pixel and sequences of light readings at a sensor; (4) using these correspondences to compute coordinate space mappings between screen and projector; and (5) using the mappings to create a seamless multi-projector display.

Figure 14:
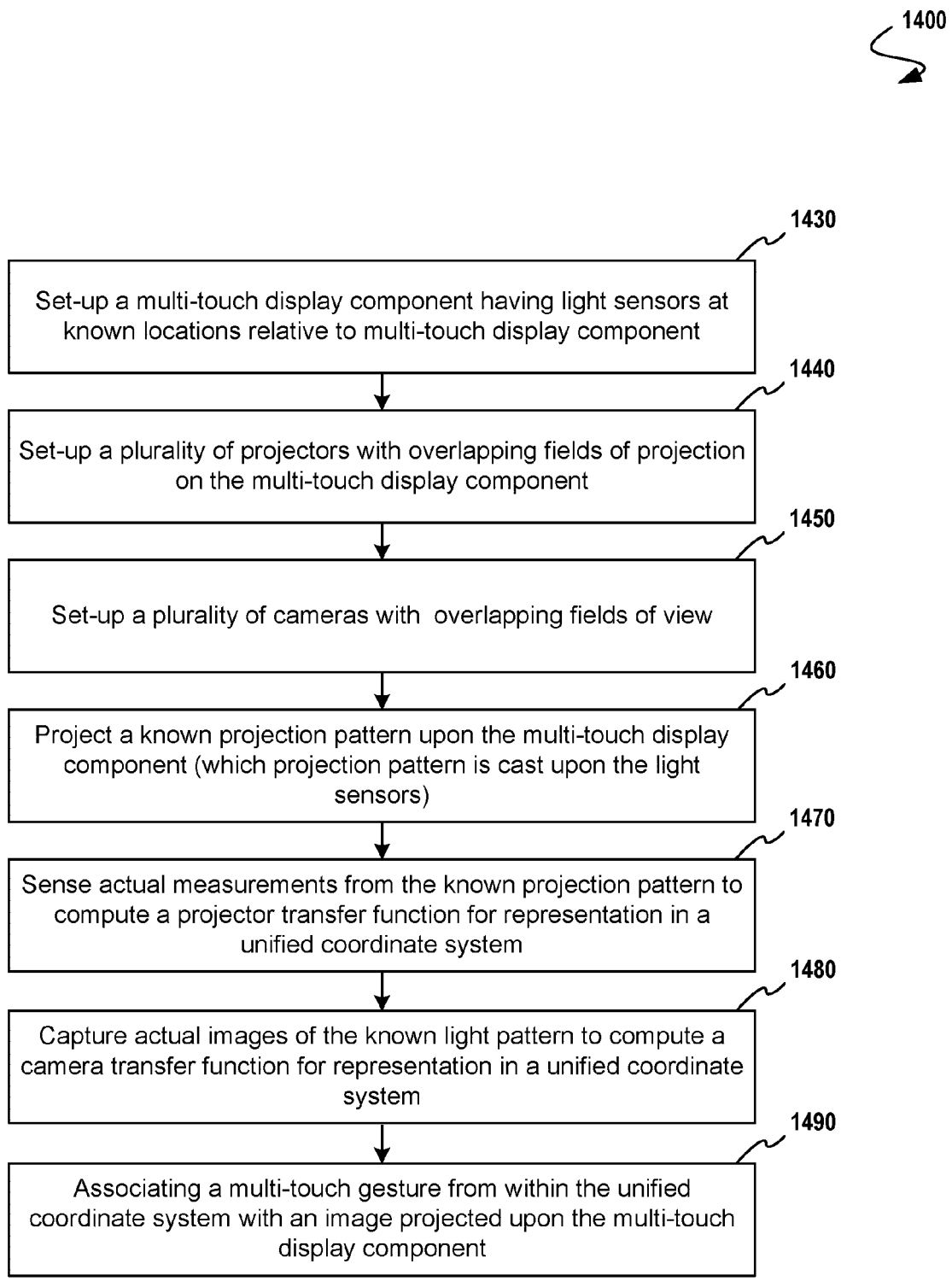
FIG. 14 is a flowchart for a method for image projector calibration using a series of projected pattern sequences, according to one embodiment.

FIG. 14 is a flowchart for a method for image projector calibration using a series of projected pattern sequences, according to one embodiment. The flowchart depicts a method of calibrating a multi-touch user interface apparatus including operations for provisioning a multi-touch display component for use within the multi-touch user interface apparatus (see operation 1430), provisioning a plurality of projectors with at least two overlapping fields of projection on the multi-touch display component, and each projector corresponding to a projector frame buffer (see operation 1440), and provisioning a plurality of cameras for use in touch sensing (see operation 1450). The calibration method 1400 for calibrating a multi-touch user interface apparatus continues by projecting a projection pattern (see operation 1460), then sensing the projection pattern to compute at least two projector transfer functions for combining at least two of the plurality of projector frame buffers into a unified coordinate system (see operation 1470). In similar fashion, the plurality of cameras capture images and the captured images are used to compute a camera transfer function for combining at least two of the plurality of cameras frame buffers into the aforementioned unified coordinate system (see operation 1480). Now, with both the projectors and the cameras calibrated to a common unified coordinate system, a multi-touch gesture sensed by one or more cameras may be associated with an image or object projected by one or more projectors (see operation 1490).

Figure 15A:
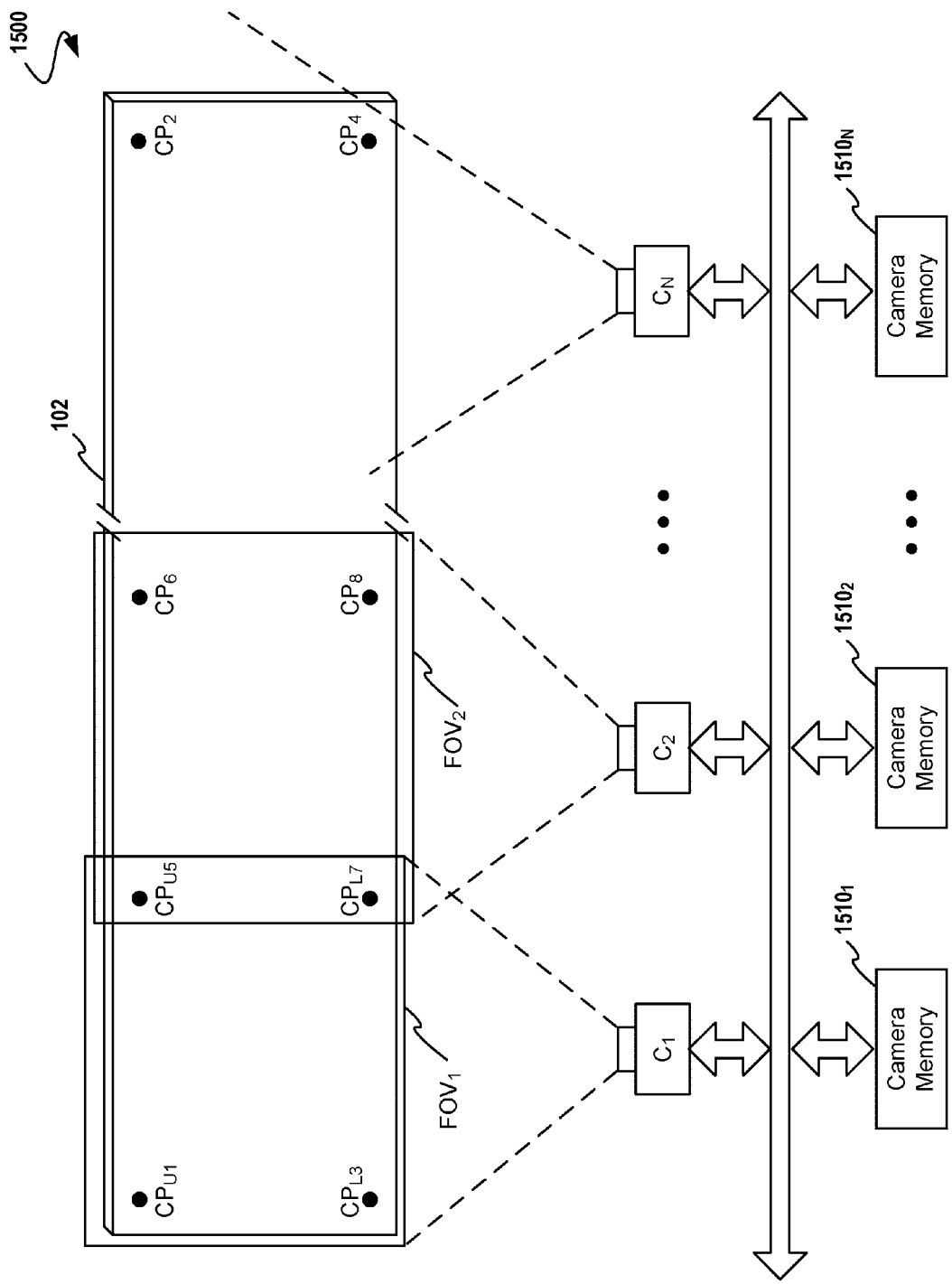
FIG. 15A is a depiction of an apparatus showing a configuration for camera calibration, according to one embodiment.

FIG. 15A is a depiction of an apparatus showing a configuration for camera calibration, according to one embodiment. As an option, the apparatus for camera calibration 1500 may be implemented in the context of the architecture and functionality of FIG. 1 through FIG. 14, or the apparatus for camera calibration 1500 may be implemented in other configurations. As shown, FIG. 15A includes a rear view of a multi-touch display component 102, upon which are light emitting devices (e.g. LEDs, light bulbs, fiber-optic carriers, etc) at camera calibration points $CP_{U1}$, $CP_{L3}$, $CP_{U5}$, and $CP_{L7}$, respectively. In some embodiments involving fully-automatic or computer-aided operations the technique uses a processing node in communication with each light emitting device at $CP_{U1}$, $CP_{L3}$, $CP_{U5}$, and $CP_{L7}$. Also, as shown, a plurality of cameras $C_1$-$C_N$ are directed toward the rear side of the multi-touch display component 102. In particular, the field of view (e.g. FOV) of a camera (e.g. $C_1$) is manually calibrated so as to sense at least four calibration points (e.g. $CP_{U1}$, $CP_{L3}$, $CP_{U5}$, and $CP_{L7}$). A memory-resident representation of the image as sensed by camera $C_1$ is stored in camera memory $1510_1$, and similarly, a memory-resident representation of the image as sensed by camera $C_N$ is stored in camera memory $1510_N$. Of course, the image as sensed by a camera may contain distortions.

Image distortions may be introduced by any of a number of elements or characteristics of a camera system. For example, camera optics may not perform orthogonally, or even as designed; also, a mirror (if used) may introduce optical distortion. Furthermore, the physical placement of a camera and/or a mirror relative to the multi-touch display component 102 may cause the camera image of a rectangle on multi-touch display component 102 to appear non-rectangular in a captured camera image. Also, a camera within embodiments of the invention employing a non-planar multi-touch display component 102 will not observe straight lines on the two-dimensional manifold of multi-touch display component 102 to be straight. In other words, these lines will not appear straight in the images captured by the camera.

One aspect of the camera calibration process is to determine a mapping between the coordinate space of a captured camera image and the coordinates of physical display space 940 as is projected on the rear of multi-touch display component 102. For embodiments of the invention using multiple cameras to observe a multi-touch display component 102, a mapping should be determined between each camera and the same physical display coordinate space 940. These mappings between camera image coordinates and physical display space coordinates may take any of the forms described above for mappings between projector input images and physical display space, including polygonal mesh-based mappings, lookup tables, and homography matrices.

Embodiments of the invention using multiple cameras allow the FOVs of the cameras to overlap on multi-touch display component 102. However, in such cases, without further correction, an object appearing in the FOV overlap region of two cameras would be observed twice simultaneously, which may lead to confusion in the tracking and observation of events (e.g., touches) occurring on multi-touch display component 102. Hence, a feature of the methods for calibration is to construct, from multiple cameras with overlapping FOVs, a single unified video stream capturing the entirety of multi-touch display component 102, without discontinuity in coverage and without areas of double coverage.

Figure 15B:
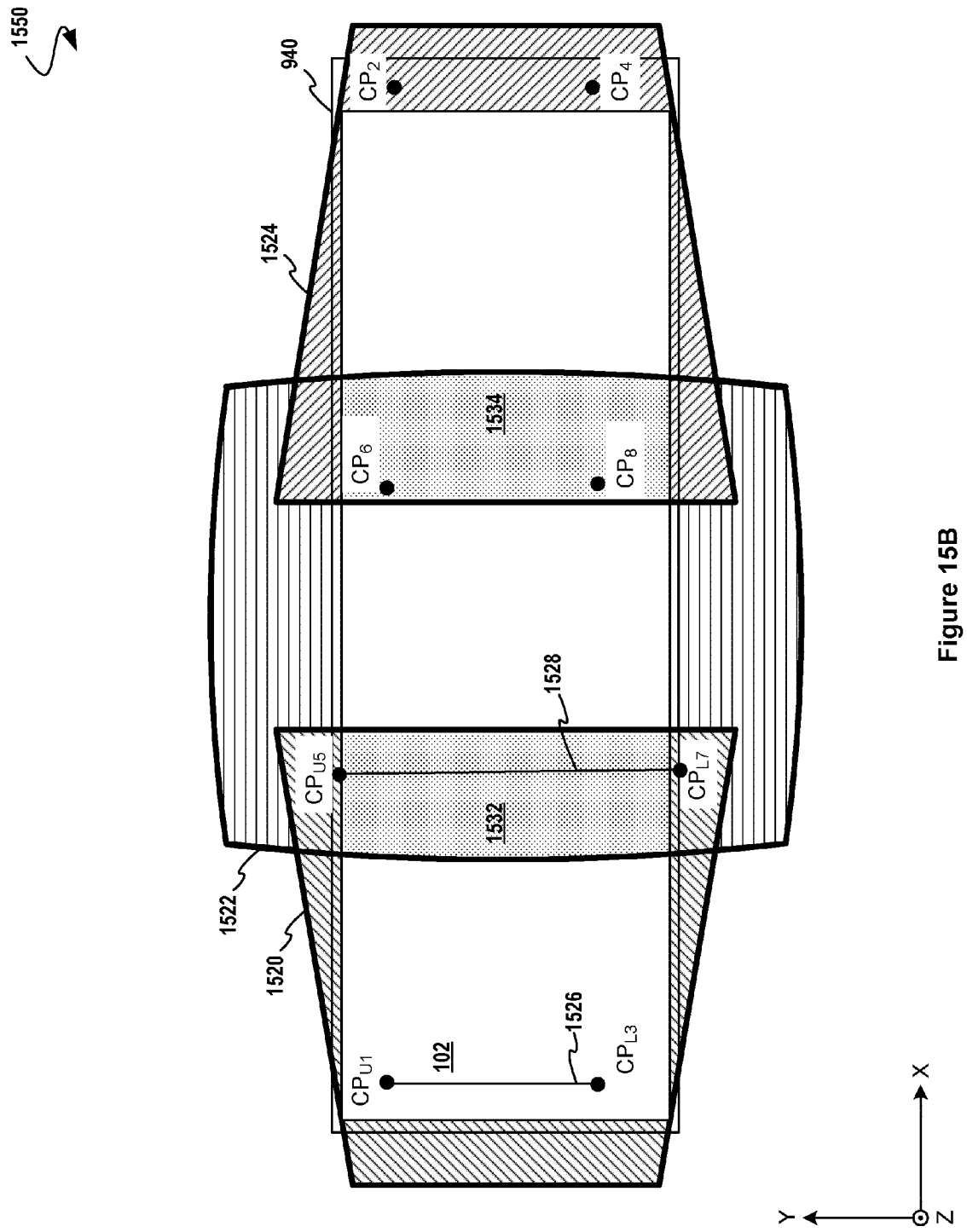
FIG. 15B is a depiction of a mosaicked, unified view of a single frame in a video stream after camera calibration, according to one embodiment.

FIG. 15B is a depiction of a mosaicked, unified view of a single frame in a video stream after camera calibration, according to one embodiment. As shown, the constructed, mosaicked, unified video stream 1550 appears as if it is captured by a single camera that is orthogonally viewing a multi-touch display component 102, The unified video stream may be referred to as a "mosaicked" video stream, since it appears to be contiguous view of space, composed of adjoining single camera video streams that have been stitched together to provide full coverage with no holes or overlap. The shape of each component video stream (e.g. the first component video stream 1520, the second component video stream 1522, the third component video stream 1524, etc) contributing to the mosaic is arbitrary, and depends on the calibration process that determines how the component video streams may be stitched together. Mapping of all camera coordinate spaces to a single reference space (e.g. physical display space 940) allows the multiple corresponding video streams to be aligned into a mosaicked view. In various embodiments, any methods for constructing a mosaicked view of a surface from multiple overlapping camera views may be applied.

Returning to discussion of FIG. 15A, a plurality of cameras $C_1$-$C_N$ are directed toward the rear side of a planar, rectangular multi-touch display component 102, and LEDs are placed at known locations (e.g. at $CP_{U1}$, $CP_{U5}$, $CP_{L3}$, -$CP_{L7}$, etc.) within physical display coordinate space 940, preferably around the border of the rear of multi-touch display component 102, and preferably at the peripheral vertices (e.g. corners). As shown, each camera is able to observe at least four LEDs, and each camera's FOV overlaps a region on multi-touch display component 102 contains at least two LEDs between which a line may be drawn to divide the camera FOV overlap region into two pieces. In one embodiment 6, the calibration process proceeds by activating one LED at a time, and for each LED, capturing an image with each camera to attempt to detect the LED with that camera. LED detection may be performed by subtracting an image captured while the LED is active from an image captured when all LEDs are inactive, and searching for regions of large difference (greater than some threshold) between the images. The camera image location of the LED may be reported as the centroid of the largest such region in the camera image. Not all cameras will observe all LEDs, and enforcement of a minimum region size may be used to detect camera images in which no LED is present. If an LED is detected in a camera image, a correspondence is thus identified between the known physical display space coordinate of the LED and the camera image space coordinate of its detected region. From four such correspondences detected by a single camera, a homography matrix may be computed to map between coordinates in physical display space 940 and the camera coordinate space, as described above for projector calibration. This mapping is used to warp the camera image into a mosaic space representing a mosaicked, unified video stream 1550 of multi-touch display component 102. The region of a given camera image warped into the mosaicked view is the region bounded by the edges of multi-touch display component 102, and any mosaic tile boundary lines (e.g. $C_1$ mosaic tile boundary 1526, $C_2$ mosaic tile boundary 1528) created by connecting LED pairs (e.g. $CP_{U1}$ paired to $CP_{L3}$, $CP_{U5}$ paired to $CP_{L7}$). In these embodiments, camera lens distortion is either negligible, due to an appropriate choices of camera lenses, or is quantified via techniques well known in the art of computer vision, either before installation of the camera or during an automated lens distortion calibration process that may employ patterns projected by the projectors of multi-touch user interface apparatus 100.

The above described method of calibrating multiple cameras into a single mosaicked view using LEDs at known physical display space locations may be adapted to other shapes of multi-touch display component 102 (e.g., elliptical, or cylindrical), and to other arrangements of LEDs with respect to multi-touch display component 102. For example, for a cylindrically shaped non-planar display, a larger number of LEDs along the border of multi-touch display component 102 may be used to divide its surface into approximately piece-wise planar sections, so that the same algorithm described above may be used to construct a mosaicked view of multi-touch display component 102 as if it were flattened.

In other embodiments of the invention, the LEDs at camera calibration points $CP_{U1}$-$CP_{UN}$ and $CP_{L1}$-$CP_{LN}$ are replaced with fiducials, which are small visual markers that may be easily detected in a camera image. Strictly as an example, a fiducial may consist of a pattern of two black and two white squares arranged in alternating fashion in a 2×2 grid, to appear as a small checkerboard. Many methods for detecting such patterns, and more specifically the central corner between all four squares, have been described in the art of computer vision. In general, fiducials do not actively emit light, though they do absorb and/or reflect light. The methods described above for constructing a mosaicked camera view from multiple overlapping camera views are easily adapted to use such fiducials rather than active light emitting elements, with a significant change being that the coordinates of the camera calibration points are identified via light pattern detection rather than detection of bright spots of light. Embodiments may use a set of visual distinct fiducials, such that no two appear the same, in order to aid in identifying the camera calibration point to which a fiducial corresponds when more than one fiducial is detected in the camera imagery. Other embodiments may employ other heuristics, such as examining the spatial relationships between detected fiducials, to determine which fiducials correspond to which known camera calibration points $CP_1$-$CP_N$.

Once the plurality of cameras have been calibrated such that a unified, mosaicked view of the rear of multi-touch display component 102 may be constructed, it is possible to use this mosaicked view to calibrate and correct the plurality of projectors so that they produce a seamless display on multi-touch display component 102. Any of the methods known in the art of projections systems for calibrating multi-projector systems using a single camera view may be applied, with the mosaicked camera view being used as the "single" camera view. For example, projection of the bar pattern sequence described above, such that all projector pixels emit a unit sequence of black and white values over the course of projection of the pattern sequence, allows establishment of a detailed mapping between each projector coordinate system and the coordinate system of the mosaicked camera view. These mappings can be used to compute warping functions, blending maps, and photometric correction within the coordinate space of the mosaicked camera view, such that the multi-projector display appears seamless. The accuracy of such methods may be limited, however, by the effective resolution of camera imaging of projector pixels on the rear of multi-touch display component 102. As noted above, for multi-touch display components for which projection material is attached to the front or embedded inside, the projected imagery may appear blurry on the rear of the multi-touch display component, thus reducing the effective resolution of the camera imaging of projector pixels, and thus decreasing the precision of the multi-projector calibration.

It should be noted that in some embodiments, at least some of the calibration points used for camera calibration and image distortion correction (e.g. calibration points $CP_{U1}$, $CP_{L3}$, $CP_{U5}$, and $CP_{L7}$) are the same calibration points as described (e.g. $CP_{U1}$, $CP_{L3}$, $CP_{U5}$, and $CP_{L7}$) for image projector calibration and image distortion correction; thus, once all projectors in a system and all cameras in a system are calibrated, both the projectors and the cameras may then share a common corrected coordinate system.

Configurations for Managing Spatial Interactivity Among Multiple Users

Figure 16:
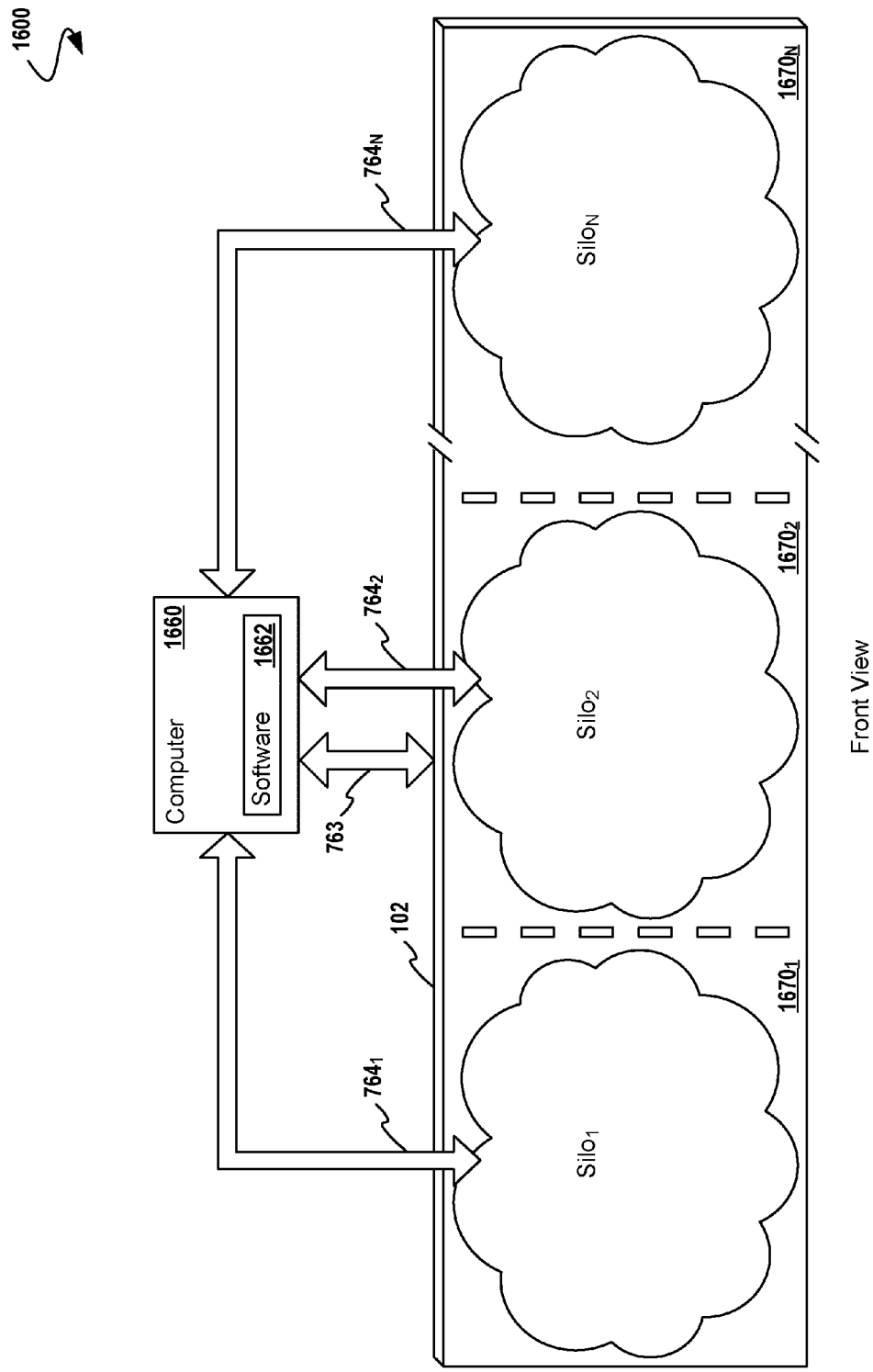
FIG. 16 is a depiction of an apparatus in a configuration for managing interactivity among multiple users, according to one embodiment.

FIG. 16 is a depiction of an apparatus in a configuration for managing interactivity among multiple users, according to one embodiment. As shown, a multi-touch display component 102 is divided into a plurality of regions (e.g. $Silo_1$, $Silo_2$, $Silo_N$), which regions substantially fill the width and height of the multi-touch display component 102, and which regions (e.g. zones, silos) may be assigned respectively to particular users 101. Also shown is a computer 1660, comprising software 1662. The computer 1660 may be a single computer, or it may be a network of computers (e.g. any one or more of processing nodes from among $N_1$-$N_M$). The software 1662 includes user interface software for interfacing a plurality of users 101 to a computing device (e.g. any one or more of processing nodes from among $N_1$-$N_M$). As shown and described herein, the software 1662 is operable for providing a plurality of silos (e.g. one for each user), wherein a silo provides a user interface for a first user by displaying images and receiving touch input from the first user independent of any display of images and/or multi-touch input corresponding to any other silos.

The software 1662 includes user interface software for interfacing a plurality of users 101, and as shown such interfacing is accommodated via communication link 763. The communication link 763 (i.e. between a multi-touch display component 102 and a computer 1660) might comprise a physical connection (e.g. Ethernet, Gigabit Ethernet, Fibre Channel, etc), or it might comprise a logical connection link 764 or protocol (e.g. TCP, FCP, HTTP, etc), or some combination of physical and logical connections. Further, a logical connection link 764 between a silo and computer 1660 (e.g. between $Silo_2$ and computer 1660) might be embodied as strictly a logical link, relying on the facility of a physical communication link 763. The multi-touch display component 102 accommodates multiple silos $1670_1$ through $1670_N$. Strictly as an option, the silos might be organized as rectangles covering some physical space. As shown, a first physical space $1670_1$ is a rectangle, and an adjacent, second physical space $1670_2$ is also a rectangle. The second physical space $1670_2$ does not overlap the first physical space $1670_1$.

Figure 17:
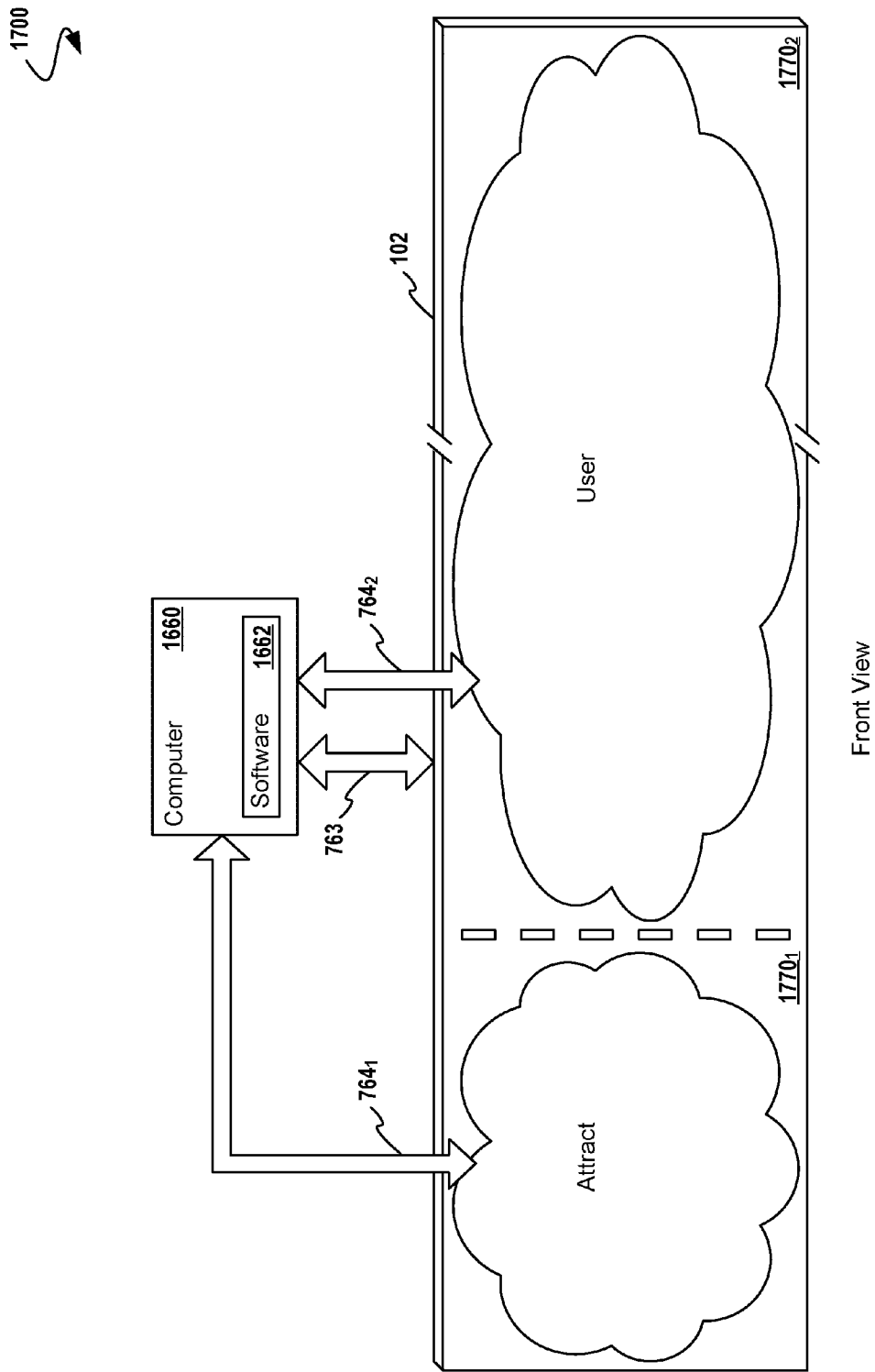
FIG. 17 is a depiction of an apparatus in a configuration with an attract mode for managing interactivity among multiple users, according to one embodiment.

FIG. 17 is a depiction of an apparatus in a configuration with an attract mode for managing interactivity among multiple users, according to one embodiment. As an option, the apparatus in a configuration with an attract mode 1700 may be implemented in the context of the architecture and functionality of FIG. 1 through FIG. 16, or the apparatus in a configuration with an attract mode 1700 may be implemented in other configurations. As shown, the apparatus in a configuration with an attract mode 1700 comprises a physical space $1770_1$ to serve in an attract mode capacity. For purposes of this disclosure, a physical space serving in an attract mode capacity is a physical space within the bounds of a multi-touch display component 102 and which is a physical space is not dedicated to a particular user. In some embodiments, such a physical space within the physical boundary of a multi-touch display component 102 consumes substantially all of the space of a multi-touch display component 102. In other embodiments, the physical boundary of a multi-touch display component 102 may comprise both a physical space dedicated to serve in the capacity of an attract mode $1770_1$ in addition to a physical space dedicated to a user $1770_2$, as shown.

In some embodiments, the apparatus in configuration with an attract mode 1700 indicates regions on multi-touch display component 102 not dedicated to any user by displaying them with a special appearance, such as a particular set of colors, style of rendering, or background image. In other embodiments, the apparatus in configuration with an attract mode 1700 indicates regions on multi-touch display component 102 not dedicated to any user by displaying an invitation, either explicit or implicit, to use some of the space not dedicated to any user. For example, a written message (e.g. "Welcome!", or "Touch Here to Start"), or a special symbol such as a blinking hand with finger outstretched, displayed in a reserved or non-dedicated region may invite the user to touch it or use it. In still other embodiments, the apparatus in configuration with an attract mode 1700 displays, in a region not dedicated to any user, content (e.g., animations, videos, or imagery) that is designed to entice a user to touch that region, For example, in the context of a multi-touch system for browsing photos, the apparatus in configuration with an attract mode 1700 may display an evolving selection of photos in the non-dedicated interface region, such that new users may be tempted to select one of the photos.

Functions of software 1662 include user interface software for interfacing a plurality of users 101. Functions of software 1662 include functions for the display of a plurality of, and/or multiple instances of displayed objects (i.e. display of such objects using image projectors $P_1$-$P_N$), and functions for sensing user touch input.

In some embodiments, allocating a physical space dedicated to a user $1770_2$ may commence when a user touches at least one object from within the physical space serving in the capacity of an attract mode $1770_1$.

Figure 18:
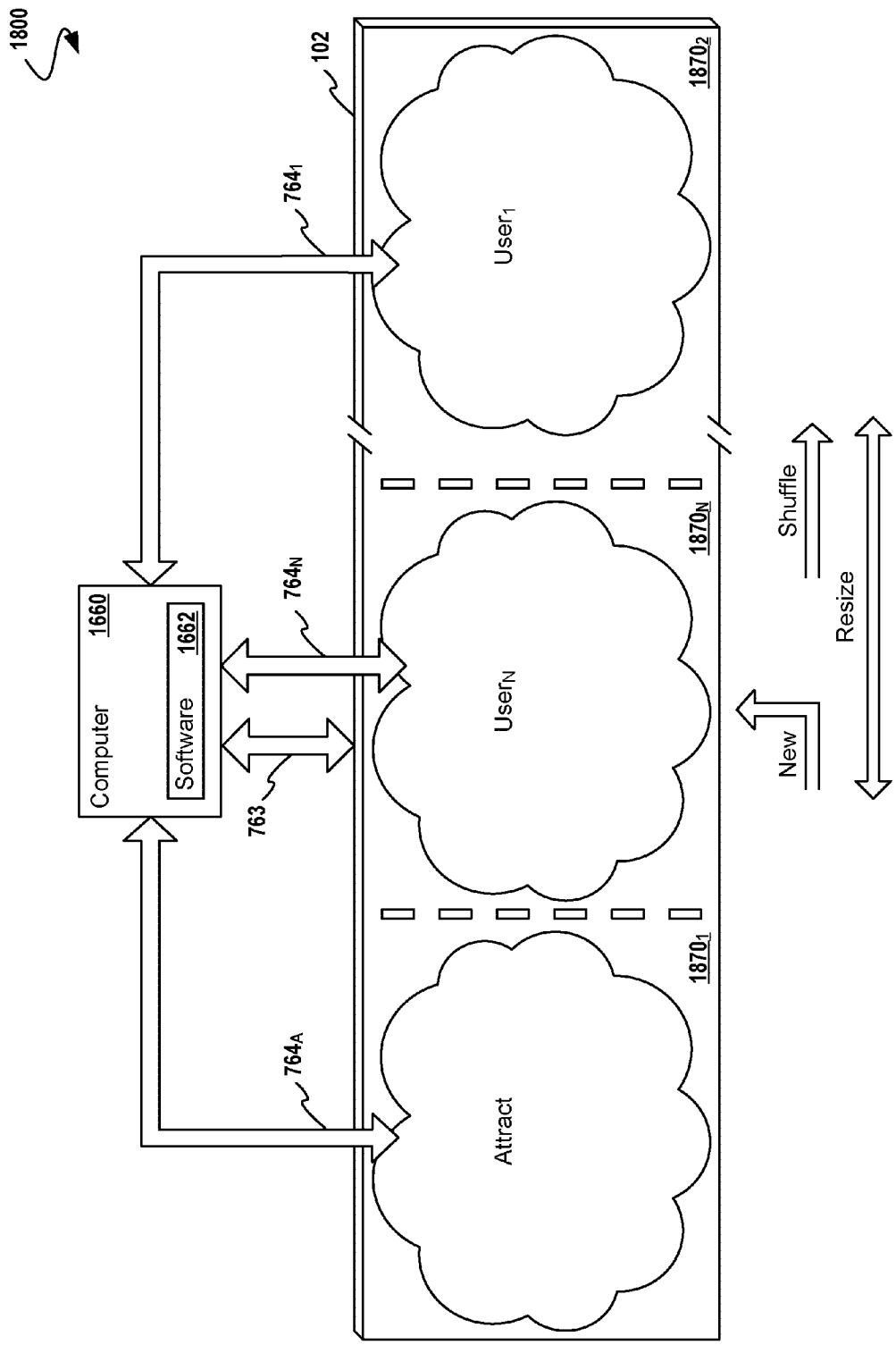
FIG. 18 is a depiction of an apparatus in a configuration with an attract mode for dynamically managing interactivity among multiple users, according to one embodiment.

FIG. 18 is a depiction of an apparatus in a configuration with an attract mode for dynamically managing interactivity among multiple users, according to one embodiment. As an option, the apparatus in a configuration with an attract mode for dynamically managing interactivity among multiple users 1800 may be implemented in the context of the architecture and functionality of FIG. 1 through FIG. 17, or the apparatus in a configuration with an attract mode for dynamically managing interactivity among multiple users 1800 may be implemented in other configurations. As shown, a multi-touch display component 102 is divided into a plurality of regions (e.g. $1870_1$, $1870_2$, and $1870_N$), which regions substantially fill the width and height of the multi-touch display component 102, and which regions (e.g. silos) are assigned respectively to particular users 101 (i.e. $User_N$, $User_1$).

Using multi-touch display component 102, the functions of software 1662 for interfacing a plurality of users 101 may allocate and configure regions (e.g. zones, silos) over the surface of a multi-touch display component 102 by any of several possible and envisioned methods. In some embodiments involving silos, a new user silo is allocated based on touch activity within the non-dedicated attract mode physical space (e.g. when a user touches at least one object from within the attract mode physical space $1870_1$. In some of these embodiments, the new user silo is created with an instance of the touched object being centered within it. Also, in some of these embodiments, allocation of a new user physical space results in reducing (resizing) the allocated size of one or more physical spaces already allocated to other users (that is, reducing the size of at least one physical space other than the newly-allocated physical space). Allocation of a new user physical space may also result in shifting of the center locations of one or more previously allocated user physical spaces, for example, away from the center of the newly allocated user physical space. Embodiments of the invention use a set of pre-defined rules to govern resizing and shifting of previously allocated user physical spaces in order to make room for a new user physical space. For example, in one embodiment, an allocation rule may state that, if possible, each new user physical space should have a prescribed minimum size and should be centered at the location of the first touch of an object in a non-dedicated user space. A dependent rule may then state that if insufficient space exists at that user touch location, due to adjacent previously allocated user physical spaces, previously allocated user physical spaces are reduced in size, without moving their center locations, until the minimum size for a new user physical space can be achieved at the new user touch location. Another dependent rule may also state that a minimum amount of non-dedicated physical space is to be preserved, until a prescribed maximum number of users is reached, at which point the multi-touch display component 102 may be entirely allocated to user physical spaces without any non-dedicated space. Another rule may automatically shift the center of a newly allocated user physical space to a minimum distance away from the outer edge of multi-touch display component 102 if the initial user touch of an object in a non-dedicated space is less than that minimum distance from the outer edge. In another example embodiment, a user physical space allocation rule may attempt to maintain all allocated user physical spaces at equal size with each other and with all center locations separated by the same amount from centers of adjacent allocated user physical spaces, while maintaining some minimum percentage of non-dedicated user space until a maximum number of prescribed users is reached. As a result, when a user touches an object in a non-dedicated space of multi-touch display component 102, a new user physical space is inserted near the touch point, and calculations are performed to compute new user physical space sizes and center locations, for all user physical spaces, such that the constraints of the rule are obeyed. Previously allocated user physical spaces are then adjusted to the new center locations and sizes, thus shifting center locations of one or more user physical spaces. In still other embodiments of the invention, rules for new user physical space allocation attempt to preserve a non-dedicated user space (e.g., attract mode physical space $1870_1$) at a constant location on multi-touch display component 102, such that touching of an object within this space causes a new user physical space to be allocated elsewhere. For example, in some of these embodiments, the new user physical space may be allocated in the nearest available non-dedicated space to the user touch, provided that the new location is outside of a reserved portion of non-dedicated space that new users can continue to interact with to obtain newly allocated physical spaces. The new user physical space may be allocated adjacent to the reserved non-dedicated portion if possible, or on the opposite side of one or more previously allocated user physical spaces, as close as possible to the reserved portion. Other rules for physical space allocation and management are possible and envisioned in various embodiments of the invention.

Newly allocated user physical spaces may have different contents in various embodiments of the invention. In some embodiments, after the user touches an object in a non-dedicated portion of multi-touch display component 102, a copy of the touched object may be placed with the newly allocated user physical space, and optionally centered within it. In related embodiments, objects related to the touched object may be automatically inserted into the newly allocated physical space. In still other embodiments, all user physical spaces are allocated with the same pre-defined template of appearance and objects, for example a "clean desktop" appearance on which the user can begin working. Other schemes for initialization of contents of newly allocated user physical spaces are possible in various embodiments of the invention.

In embodiments of the invention, users may initiate allocation of a new user physical space by actions other than touching of an object displayed in a non-dedicated portion of multi-touch display component 102. In one embodiment, the user may use a trace gesture for defining a new user physical space. For example a user might trace out the size and shape of a new user physical space by dragging his finger within a non-dedicated portion of the surface of multi-touch display component 102. In some of these embodiments, the path being traced is displayed on multi-touch display component 102 as a trail behind the moving finger, so the user may more easily assess the size and shape of the space to be allocated. Also, some embodiments automatically detect closure of a traced path, and only allocate a new user physical space when tracing of a closed shape is detected. Closure of a traced figure may be detected, for example, upon the release of a dragged touch within a prescribed minimum distance of the initial touch point of the drag, provided that the area of the closed figure is also above a prescribed minimum size, to prevent allocation of very small physical spaces. After a user traces the boundary of a new physical space to be allocated, some embodiments of the invention fit a rectangle that best approximates the traced shape, optionally with the sides of the rectangle oriented so as to be aligned with those of multi-touch display component 102, and allocate a new user physical space with the boundary of the approximating rectangle.

Other embodiments of the invention allow users to initiate allocation of a new user physical space via a pre-defined gesture. For example, in one embodiment, a new user physical space is allocated when a user touches a point in a non-dedicated portion of multi-touch display component 102, and then drags the finger in a roughly circular path above a prescribed size before releasing the touch. In another embodiment, a new user physical space is allocated when two touches are made at nearly the same place and time (within some small location and time differences) within a non-dedicated portion of multi-touch display component 102, and the two touch points are dragged along paths approximately defining opposing halves of a rectangle before being released at nearly the same new location and time. For each of these example embodiments, the size of the newly allocated space may or may not be related to the size of the area covered by the prescribed gesture. Other gestures for initiating user physical space allocation are possible and envisioned. Also, other methods for user-initiated allocation of user physical spaces aside from those discussed above are possible and envisioned.

Embodiments of the invention also allow users to dynamically resize their allocated user physical spaces. For example, in one embodiment, border segments of an allocated user physical space contains an element that may be touched and dragged in order to adjust the location of that border segment, and thus adjust the size of the allocated space. In other embodiments, specific touch gestures, such as touching with two or more fingers, are interpreted as requests for resizing of an allocated user physical space when the gesture occurs near the border of the allocated user physical space. Some embodiments of the invention also allow users to move the location of their allocated user physical spaces. For example, in one embodiment, the border of an allocated user physical space contains an element, such as a title bar or an icon, that may be touched and dragged in order to adjust the location of the allocated user physical space. In other embodiments, specific touch gestures, such as touching with two or more fingers, are interpreted as requests for resizing of an allocated user physical space when the gesture occurs near a specific portion of the allocated user physical space, such as along its top. For both resizing and moving of user physical spaces, various operations for user control, including use of other types of gestures and border elements, are possible and envisioned.

As earlier indicated, at least some of the functions of software 1662 may include user interface software for interfacing a plurality of users 101. In various embodiments, interfacing a plurality of users includes not only interfacing a particular user with the computer 1660, but also interfacing one user with another user in an interactive manner. In various embodiments users may interact with the computer 1660 and with one another through various techniques, some of which include visual and audio cues. For example, visual cues might include visual barriers and/or visual icon objects, and/or a user operation (e.g. a touch point input, a touch movement input) or an operation under computer 1660 control might include audio signals (e.g. sounds, music, voices, sound effects, etc), which audio signals are reproduced in coordination with the corresponding operation.

Figure 19:
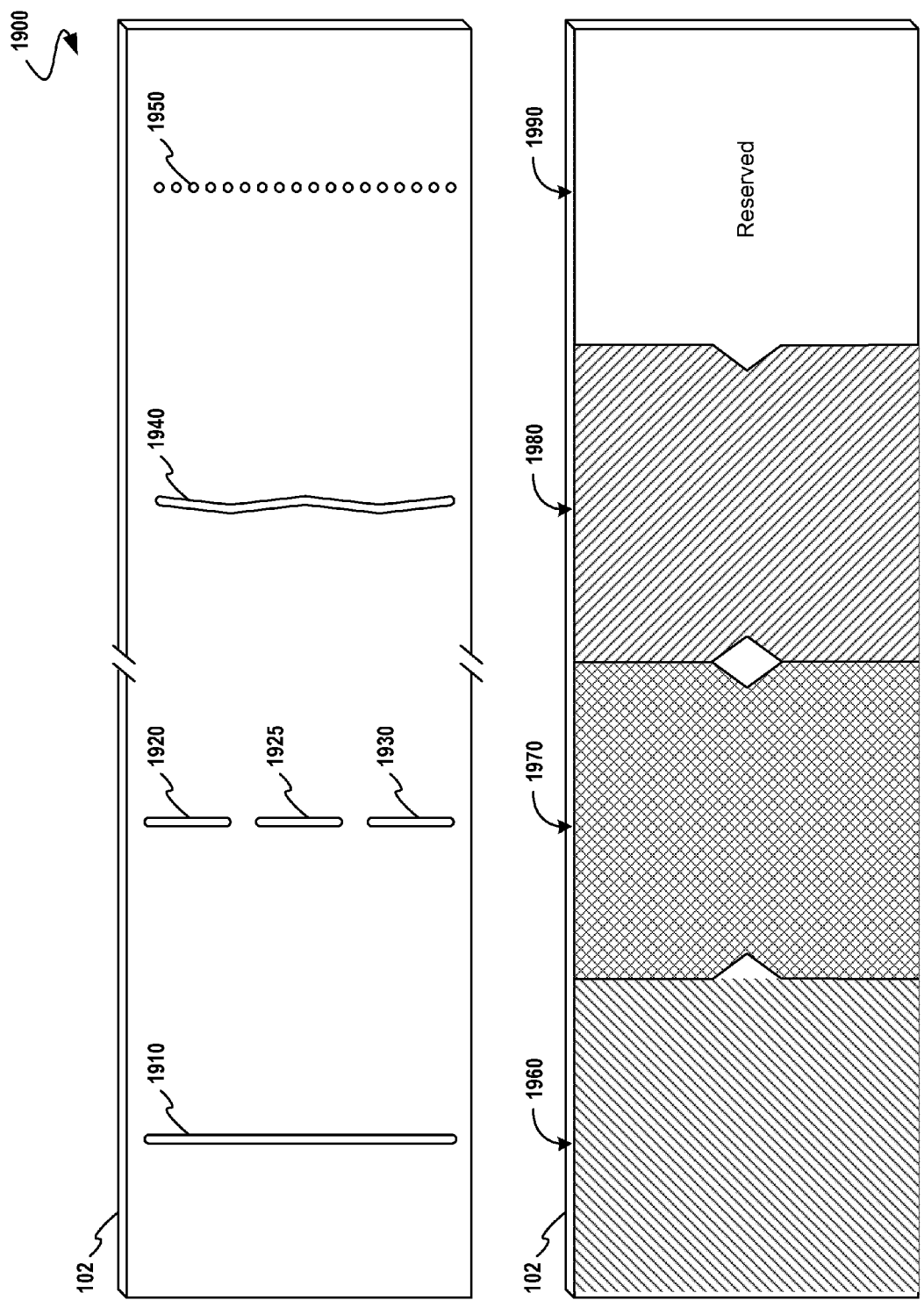
FIG. 19 is a depiction of an apparatus in a configuration showing border clue icon objects for dynamically managing interactivity among multiple users, according to one embodiment.

FIG. 19 is a depiction of an apparatus in a configuration showing border clue icon objects for dynamically managing interactivity among multiple users, according to one embodiment. As an option, the apparatus in a configuration showing border clue icon objects for dynamically managing interactivity among multiple users 1900 may be implemented in the context of the architecture and functionality of FIG. 1 through FIG. 18. As shown, any one or more border clue icon objects may be displayed (e.g. projected) into any physical space within the bounds of a multi-touch display component 102. In particular, a user is provided visual border clues as to the bounds of the user's silo by appearance of zone demarcation marks on or near the border of the user's silo. In various embodiments, zone demarcation marks come in various forms including a single rectangular border clue icon object 1910, a multiple segment border clue icon object 1920, 1925, 1930, a curve-linear border clue icon object 1940, and a multiple segment border clue icon object 1950. Other forms border clue icon objects are envisioned, including those incorporating realistic or natural imagery of familiar objects, such as rope, wood, metal bars, and so forth. Border clue icon objects may also include dynamic imagery, such as representation of a stream of water, lightning, or floating bubbles. Demarcation marks may be used as visual border cues, for example, for demarking a left physical boundary of user silo 1960, for demarking a boundary of attract silo 1970, for demarking a user silo at a boundary with another user silo 1980, and for demarking a reserved silo 1990 at a boundary with a user silo.

Figure 20:
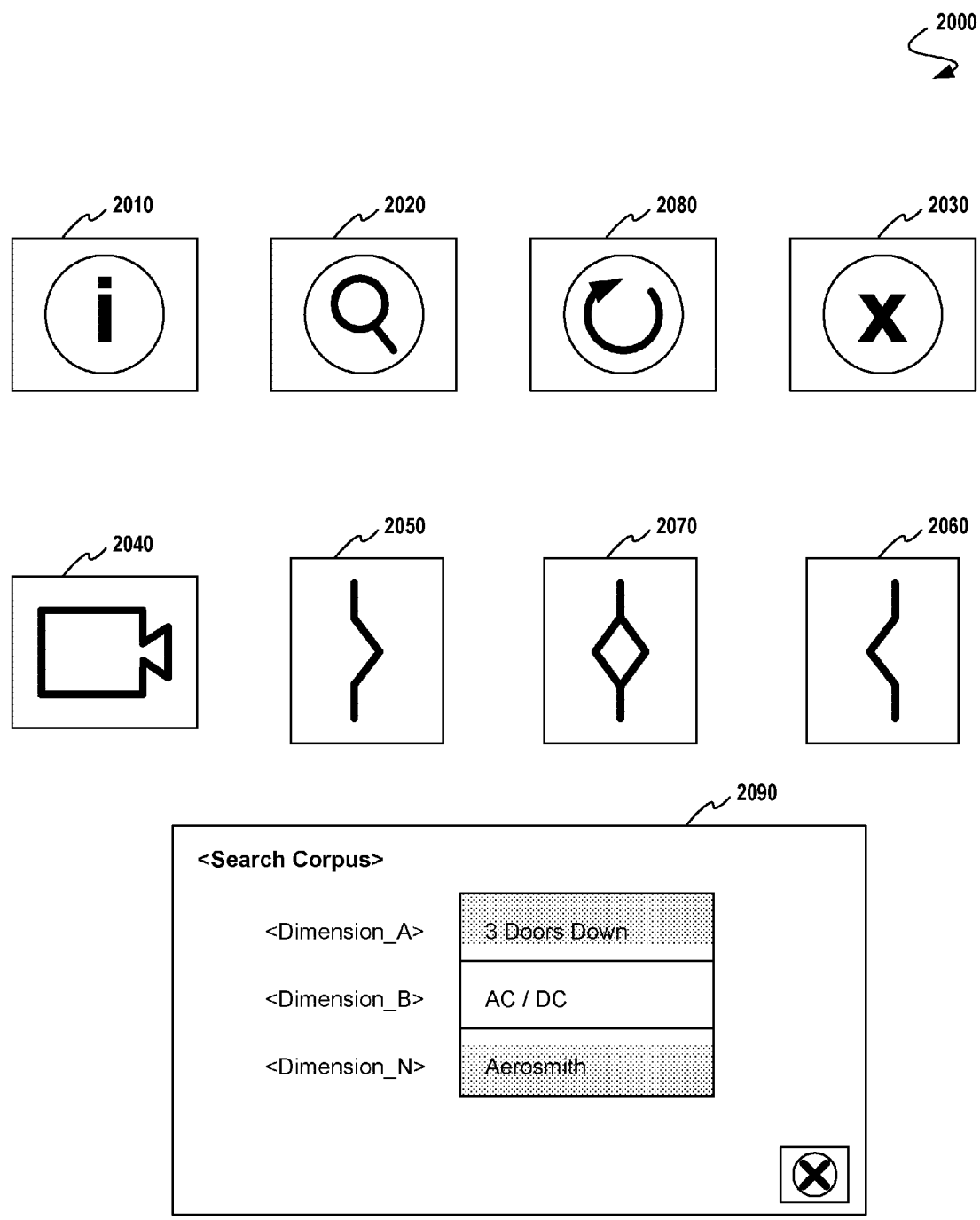
FIG. 20 is a depiction of icon objects for managing interactivity among multiple users, according to one embodiment.

FIG. 20 is a depiction of icon objects for managing interactivity among multiple users, according to one embodiment. As an option, the icon objects for managing interactivity among multiple users 2000 may be implemented in the context of the architecture and functionality of FIG. 1 through FIG. 19. As shown, any one or more icon objects may be displayed (e.g. projected) into any physical space within the bounds of a multi-touch display component 102. In some cases, the icon object is defined primarily for providing visual cues (e.g. right border icon object 2050, left border icon object 2060, double border icon object 2070, etc). Other icon objects are defined primarily for providing user input corresponding to some action (e.g. cancel icon object 2030, movie clip icon object 2040, and refresh icon object 2080). Other objects include a spinning search wheel 2090. Still other icon objects are active to user touch and expand under user touch into one or more additional forms (e.g. info icon object 2010, and search icon object 2020).

Figure 21:
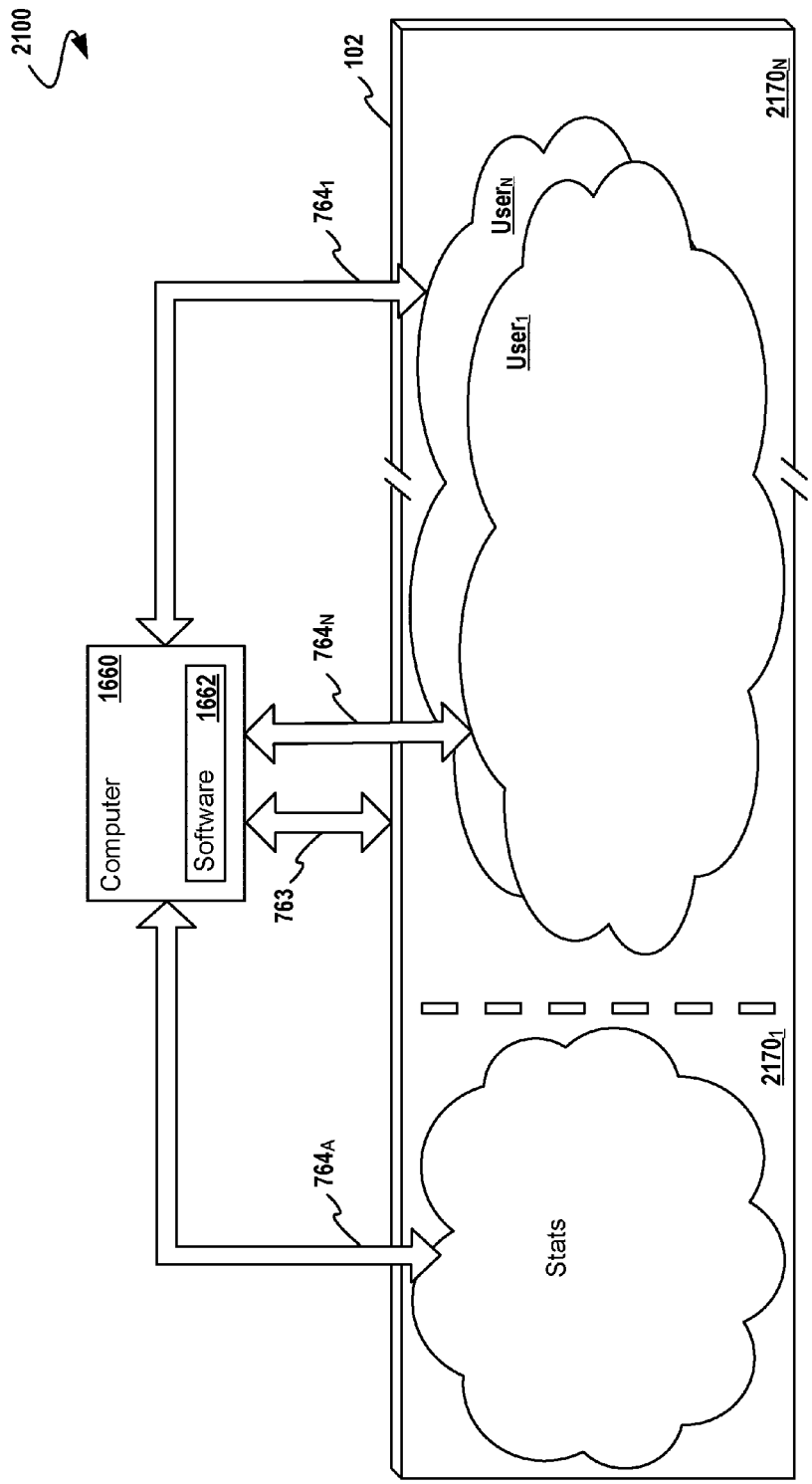
FIG. 21 is a depiction of an apparatus in a configuration with overlapping user zones, according to one embodiment.

FIG. 21 is a depiction of an apparatus in a configuration with overlapping user zones, according to one embodiment.

As an option, the overlapping user zones for multiple users 2100 may be implemented in the context of the architecture and functionality of FIG. 1 through FIG. 20. As shown, a first user zone $User_1$ substantially overlaps another different user zone $User_N$, both located within a multi-user region $2170_N$. Adjacent to the multi-user region $2170_N$ is a stats region $2170_1$. In some embodiments, a plurality of users $User_1$-$User_N$ share one or more physical spaces, namely the multi-user region $2170_N$ and the stats region $2170_1$. In this and other embodiments, display objects may be assigned to a particular user, and might be controlled by that particular user, even to the extent that such an assigned object might occupy a physical space or physical spaces allocated to other users.

In this and other embodiments, various user interface operations might be performed by a user on a display object using a touch gesture, and the object will appear to respond to the gesture as corresponds to the characteristics and rules for the object and operation. For example, a user might wish to zoom (enlarge) a particular object. And that object might have a sufficient resolution so as to be enlarged. Thus a user might perform a spread touch gesture on the object. Within the limits of the object and rules, the user operation (e.g. zoom/enlarge/expand, shrink/minimize/compress, spin, etc) is performed by computer 1660 and the results of the user-requested operation are displayed. Some example objects and associated touch gestures and rules are listed in Table 1 below.

TABLE 1

| Object | Touch Gesture (Example Operation) | Operation/Limit/Rule |
|---|---|---|
| Photo object | Pinch: Touch two fingers near each other, then move them toward each other before releasing (compress to make smaller) | Compress to icon default size |
| Photo icon object | Reverse pinch: Touch two fingers near each other, then move them away from each other before releasing (expand to larger photo object size) | Expand initially to default size |
| Photo object | Reverse pinch: Touch | Enlarge to maximum resolution or clip at |

TABLE 1-continued

| Object | Touch Gesture (Example Operation) | Operation/Limit/Rule |
|---|---|---|
| | two fingers near each other, then move them away from each other before releasing (make larger) | limits of personal space within the user's silo |
| Search spinning wheel | Spin: Touch, move downward, and release while still in motion | Spin through available search results |
| Photo object | Drag: Touch, move, stop, and release (pass to adjacent silo) | Move displayed location of photo object. |
| Photo object | Flick: Touch, move, and release while still in motion (toss to other location in user's silo or adjacent silo) | Cause object to accelerate and move on display with modeled physical momentum, as if it were an object with mass within a physical system. |
| Close icon | Tap: Touch and release quickly, without moving location (remove or iconify object from display) | Compress associated object to icon size and move to bottom of screen. |

As indicated in Table 1, finger touch-points might be recognized as a touch gesture, and the specific location of the finger touch-points forming the touch gesture might be used to impart physical momentum properties to a touched object. For example, a flick touch gesture (e.g. a toss gesture) might be formed by a quick, accelerated gesture, and a large value of momentum might be imparted to the flicked object. Alternatively, a touch gesture formed by a slower, smoother finger motion might impart relatively less momentum to the object.

Now, returning to FIG. 18, and combining the elements and descriptions shown and described in FIG. 18, FIG. 19, FIG. 20, and FIG. 21, a method for managing multiple users using the same multi-touch display component 102 may be generally described as:

Allocating an attract mode physical space $1870_1$ for attracting users,

Allocating a first user's physical space within the physical boundary of the user interface apparatus for use by a first user, Allocating a second user's physical space within the physical boundary of the user interface apparatus for use by a second user, and Coordinating movement of objects within and between any of the allocated physical spaces.

Of course, the management of objects within and between physical spaces (e.g. zones, silos) may be subject to various rules, which rules might be observed by the computer 1660 and/or enforced by the computer 1660. Examples of rules include:

A silo includes a personal user zone (e.g. the center of a silo), the objects within which are accessible only to the user associated with the silo A silo includes a shared user zone (e.g. the periphery of a silo), the objects within which may be accessible to users associated with other silos An adjacent space may be a physically adjacent space, or may be a logically adjacent space A logically adjacent space may be formed when two users have searched on items resulting in the same selection(s)

Objects may be moved by a user within the user's personal space by a drag gesture Objects may be passed from one physical space to an adjacent physical space by a drag gesture Objects may be passed from one logical space to an adjacent logical space by a drag gesture A passed object may be accepted by the receiving user via a tap gesture, for example touching the object as it passes through the receiving user's allocated space Objects may be tossed from one physical space to an adjacent physical space via a flick gesture Objects may be tossed from one logical space to an adjacent logical space via a flick gesture A tossed object may be accepted into an adjacent logical or physical space by the receiving user via a tap gesture, for example touching the object as it passes through the receiving user's allocated space Accepted, tossed objects are automatically placed in the shared user zone of the recipient Accepted, tossed objects are automatically placed at the location within the personal space of the recipient at which the recipient first touched it Accepted, tossed objects are automatically placed at the center of the personal space of the recipient Objects can be increased in size via a reverse pinch gesture within the limits of the user's personal space zone Objects can be decreased in size via a pinch gesture within the limits associated with the object being resized Of course, any selection of rules might be active at any moment in time. For example, in embodiments wherein user spaces are allocated to be intentionally overlapping (e.g. within the context of a multi-player video game sharing the same display scene), a set of rules might be defined, and coordinated by computer 1660, and such set of rules may use some, all or none of the above-listed rules.

Many more rules and definitions are possible and envisioned. At least the computer 1660 serves for (1) coordinating movement of at least one object between physical spaces based on receiving at least one touch gesture, (2) coordinating movement of at least one object between physical spaces based on a user passing the object from the first physical space into the region of the second physical space, (3) coordinating movement of at least one object between physical spaces comprises tossing the object from a first physical space into the region of a second physical space, wherein the periphery of the first physical space and the periphery of the second physical space does not abut, and (4) coordinating movement of at least one object between physical spaces while emitting a sound from the user interface apparatus.

In an embodiment involving allocation of user spaces, the computer 1660 displays, in physical space not allocated to any user, an attraction mode of imagery to generate user interest and curiosity, for example by displaying a plurality of objects. When a first user touches the non-allocated space, a first physical space is allocated for use by the user, by allocating a portion of the non-allocated space that was being used to attract users. The remainder of the non-allocated space continues to operate in an attraction mode. When a second user touches the non-allocated space, a second physical space is allocated by computer 1660 for use by the second user. If sufficient space remains, a portion of the screen remains dedicated to attracting users. This process of attracting users and allocating physical spaces for their exclusive use may continue until all of the physical space of multi-touch display component 102 is occupied by user-dedicated spaces. In some embodiments, allocation of space to user occurs only when a touch is sensed on a displayed object in the non-dedicated physical space, while in other embodiments the allocation occurs for a touch at any point in the non-dedicated physical space.

In another embodiment involving initial allocation of user spaces, the computer 1660 serves for allocating a first physical space for use by a first user, generating user interest and curiosity within the user by displaying a plurality of objects outside the first user's space, receiving input from a user to select one of said objects, and allocating a second physical space (for use by a second user) which second physical space is centered around the object selected.

In an embodiment involving creating a logical adjacency between two users, the computer 1660 serves for monitoring the search results, and more particularly the computer 1660 serves for monitoring the user selections of search results and identifying intersections of selected search result elements. Such intersections need not be intersections (a match) on precisely identical selections. An intersection might be defined as a match (for example) on one or more key phrases, or a match on one or more keywords, or even a match on just some words found in the metadata corresponding to selected search result elements. An intersection might also be defined as a match on the category of searched keywords or selected objects, on dates associated with searched keywords or selected objects, on authorship of selected objects, on other types of similarities between selected objects, or on the result items returned by different searches.

Configurations of Multi-Touch Interactivity Among Multiple Users

Figure 22:
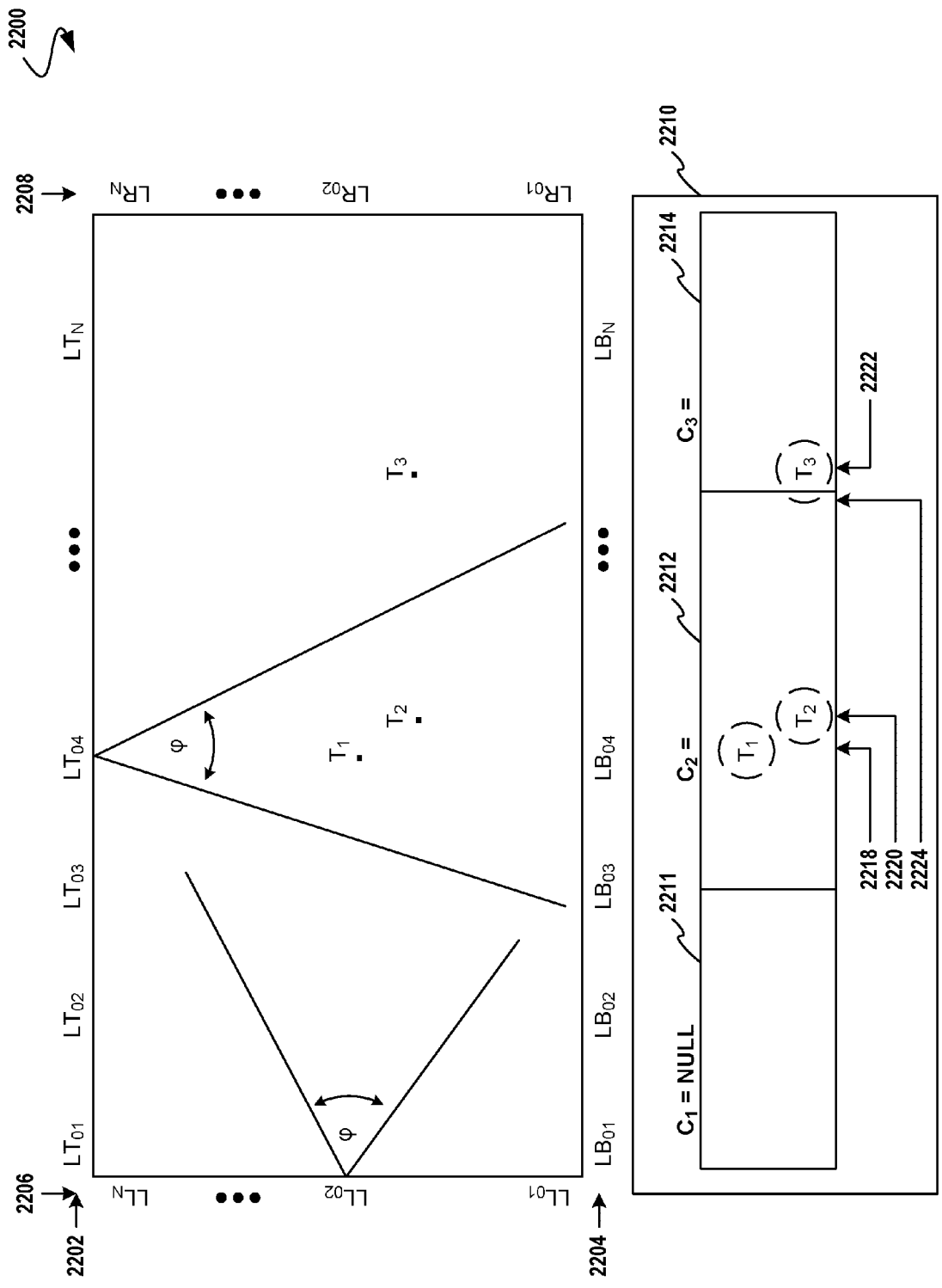
FIG. 22 is a depiction of an apparatus for formation of illumination planes for touch detection, according to one embodiment.

FIG. 22 is a depiction of an apparatus for formation of illumination planes for touch detection, according to one embodiment. As an option, the apparatus for formation of illumination planes for touch detection 2200 may be implemented in the context of the architecture and functionality of FIG. 1 through FIG. 21, or the apparatus for formation of illumination planes for touch detection may be implemented in other configurations. As shown, a multi-touch display component 102 is bordered around the periphery by illumination sources $LT_{01}$, $LT_{02}$, $LT_{03}$, through $LT_N$, illumination sources $LB_{01}$, $LB_{02}$, $LB_{03}$, through $LB_N$, illumination sources, $LL_{01}$, $LL_{02}$, $LL_{03}$, through $LL_N$, and, illumination sources $LR_{01}$, $LR_{02}$, $LR_{03}$, . . . through $LR_N$. As shown the lasers are arranged in an illumination source array top row 2202, an illumination source array bottom row 2204, an illumination source array left row 2206, and an illumination source array right row 2208. In some embodiments, lasers are used as illumination sources for creating illumination planes. In these embodiments, each illumination source is fitted with a beam spreader (not shown) such that the illumination source emanates substantially within a plane having a field of projection characterized by a field of projection angle. For example, the illumination source $LL_{02}$ emanates from $LL_{02}$ with a field of projection angle of $\phi$ degrees.

In other embodiments, illumination planes are created with illumination sources other than lasers. In some of these embodiments, LEDs provide illumination that is aimed in a direction substantially planar to multi-touch display component 102 via use of baffles and reflectors that block escape of light in undesired directions and focus it along the plane of multi-touch display component 102. Other techniques for focusing light from LEDs, including lenses, may be used. Other light sources, such as lamps, may be used in place of LEDs, together with baffles, reflectors, lenses, or other techniques for aiming the light to form illumination planes parallel multi-touch display component 102.

Although FIG. 22 shows the planar illumination fields of only illumination sources $LL_{02}$ and $LT_{04}$, this is but an example selected so as to not obscure the characteristics of the embodiment with prolix. In operation, all of the aforementioned illumination sources are turned on. As earlier shown and described, a touch illumination region 340 is a substantially planar zone oriented just in front of the front surface of a multi-touch display component 102. A finger (e.g. left index finger 120, left middle finger 119, left ring finger 118, left little finger 117, left thumb 121, right index finger 123, right middle finger 124, right ring finger 125, right little finger 126 or right thumb 122) or a hand (e.g. left hand 115, right hand 116), if used to touch the front surface of a multi-touch display component 102, causes scattering of the illumination. Provided that the illumination sources are of sufficient power, the scattering can be detected by one or more system cameras $C_1$-$C_N$. Since in this embodiment there are illumination sources along the top, bottom, left and right sides, scattering of a touch (i.e. scattering from the touch of a finger) occurs in substantially all directions normal to the finger or hand.

The scattering will be within the field of view of at least one of cameras $C_1$-$C_N$. FIG. 22 shows three touch points $T_1$, $T_2$, and $T_3$. In symbolic representation, touch $T_1$, touch $T_2$, and touch $T_3$ appears on the front surface of multi-touch display component 102. Also, touch $T_1$, touch $T_2$, and touch $T_3$ appear in the symbolic representation of the mosaicked field of view created by combining the cameras $C_1$-$C_3$ through the calibration process described above. More specifically, the mosaicked field of view of cameras $C_1$-$C_3$ is shown as mosaicked camera field of view 2210, which has three portions corresponding to contributions from individual cameras C1, C2, and C3, where a portion contributed by camera C1 is shown as camera $C_1$ portion 2211, a portion contributed by camera $C_2$ is shown as camera $C_2$ portion 2212, and a portion contributed by camera $C_3$ is shown as camera $C_3$ portion 2214. The touch points identified as touch $T_1$ and touch $T_2$ both appear fully within camera $C_2$ portion 2212 at area 2218 and area 2220, respectively. The touch point identified as touch $T_3$ appears substantially within camera $C_3$ portion 2214 at area 2222, and a small part of the scatter pattern from touch $T_3$ appears within camera $C_2$ portion 2212 at area 2224.

Disambiguation of touch scatter patterns in a system employing multiple cameras is thus understood from the foregoing. However in embodiments, touches (e.g. touch scatter patterns) are detected by performing a sequence of image processing operations on the camera images. In one such embodiment, image processing operations comprise convolving with a center-surround filter, convolving with a smoothing filter, converting to a binary (i.e. pure black and pure white) image, performing identification of connected components, and performing shape and size analysis on such identified connected components. In further detail, the camera image is first convolved with a two-dimensional filter designed to highlight touches. This filter may be a 5×5 center-surround filter with high values toward the middle and negative values around the edges. The convolution image result is then smoothed by a second convolution, with a two-dimensional blurring filter (e.g. a Gaussian function or a constant top-hat filter). This second convolution step helps to diminish the significance of isolated high values output by the first, center-surround filtering operation. Converting to a binary (black and white) image is accomplished by thresholding, assigning pixels with pixel luminance values below a threshold a value of zero and assigning pixels with pixel luminance equal to or greater than the threshold a value of one. The resulting binary image is subjected to connected components analysis, which analysis identifies and characterizes clusters of pixels that all have a value of one and that are connected (i.e. adjacent) in the image. Characterization measurements performed on each connected component include an area determination (e.g. the number of pixels in the cluster). Connected components that have too small an area (e.g. too few pixels) or too large an area (e.g. too many pixels) may be rejected as not being touches. In some embodiments, a shape analysis of each connected component may be performed, and components with irregular shapes may be rejected as not being touches. In some embodiments, a trained classifier such as a support vector machine (SVM) may be applied to each connected component to discriminate those connected components corresponding to touches from those corresponding to other phenomena (e.g. ambient light, transients such as sunlight glints or flashbulbs, arms pressed against a multi-touch display component 102, other objects placed against a multi-touch display component 102, etc).

In some embodiments, a background removal step may be performed. This helps to eliminate problematic image regions that consistently cause strong responses from the center-surround touch filter, but do not correspond to touches. These image regions typically correspond to bright spots or edges of light on the touch screen, sometimes due to other light sources in the environment near the touch screen. A wide variety of computer vision background removal methods may be employed. In one embodiment, the background removal step consists of subtracting a background image from the camera image. Pixels for which the subtraction result is negative are set to zero. In one embodiment, a background image may be constructed by capturing images from each camera when the system is calibrated (e.g. at system initialization time when it is known that no users are touching the screen). The background image may also be constructed by averaging many frames captured over a period of time. In some embodiments, the background image is updated gradually over time to help compensate for slow changes in the environment. Many methods for adaptive updating of background models are possible and envisioned. In one embodiment, the background image is modified once every "N" frames (e.g. where N=60 would result in an update of once per second in a system running at 60 fps), by comparing the adaptive candidate camera image with the then current background image. Background image pixels with values less than the then current camera image may have their values increased by a small amount, while those with values greater than the current camera image may have their values decreased by a small amount. This adaptation process allows the background image to gradually adjust to reflect changes in the environment around the large scale multi-user, multi-touch user interface apparatus 100. The amount of change allowed per update, and the frame interval "N" at which intervals the updates occur, together comprise a learning rate for the background image, and this learning rate may be adjusted as desired to speed up or slow down adaptation of the background image over time. A slow learning rate allows transient environmental changes, such as shadows cast by users of the system, to be ignored, while still accounting for more persistent environmental changes such as a light source being activated and left on.

As is readily understood from the foregoing, a touch within the mosaicked field of view of the cameras (e.g. $C_1$, $C_2$, $C_3$) can be identified using any of the foregoing digital image processing techniques, and then mapped to a screen coordinate in physical display space 940, and from that physical display coordinate system, computer 1660 is able to map a screen coordinate to a particular silo within a multi-touch display component 102. Thus, given (for example) the screen coordinate of the centroid of a touch point, the touch point can be correctly ascribed to the zone of the user who created the touch point. As should be emphasized, there are a plurality of illumination sources around the periphery of a multi-touch display component 102, thus, even if a second touch point were juxtaposed directly in line with a particular illumination source, scattering occurs as a result of light from other illumination sources. Thus the apparatus for formation of illumination planes for single touch detection serves as well as an apparatus for formation of illumination planes for multiple, concurrent touch detections.

Figure 23:
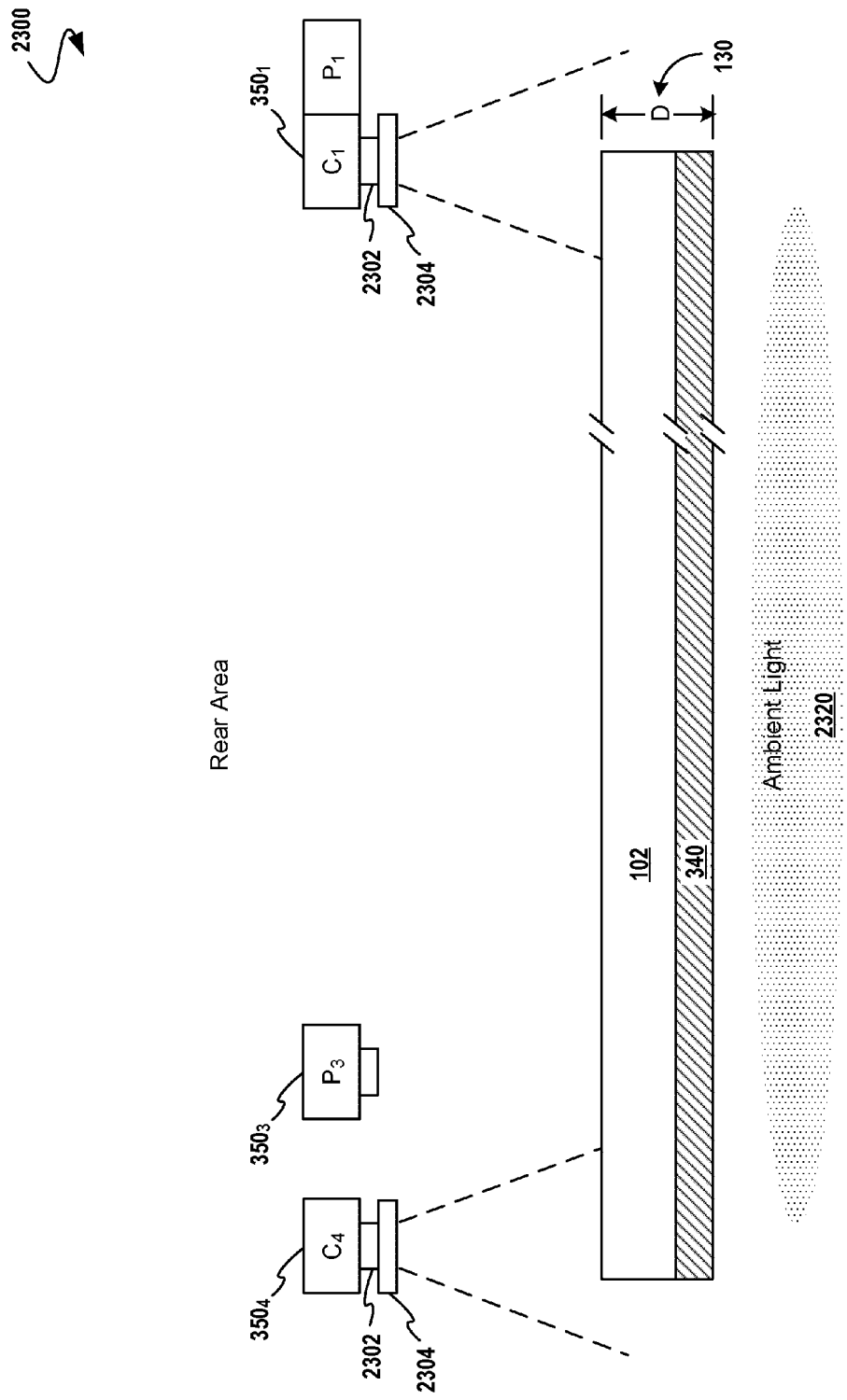
FIG. 23 is a depiction of an apparatus for touch detection using multiple cameras with narrow band-pass filters, according to one embodiment.

FIG. 23 is a depiction of an apparatus for touch detection using multiple cameras with narrow band-pass filters, according to one embodiment. As an option, the apparatus for touch detection using multiple cameras with narrow band-pass filters 2300 may be implemented in the context of the architecture and functionality of FIG. 1 through FIG. 22. As shown, ambient light emanating from any sources 2320 may be detected by any of the system cameras $C_1$-$C_N$, including cameras $C_1$ and $C_4$ as shown. Light emitted by projectors, including projectors $P_1$ and $P_3$, toward a multi-touch display component 102 might also be detected by system cameras $C_1$-$C_N$. Such detection might cause interference with the scattering patterns detected by system cameras $C_1$-$C_N$. In some embodiments, these problems are mitigated by fitting the lenses of cameras $C_1$-$C_N$ each with a narrow band-pass filter 2302. For example, inasmuch as the illumination sources shown and described in FIG. 22 may be selected on the basis of wavelength, an appropriate infrared wavelength might be selected and a corresponding low-pass optical filter 2304 might be selected to substantially pass the infrared illumination scattering, but not pass ambient, visible light.

Figure 24:
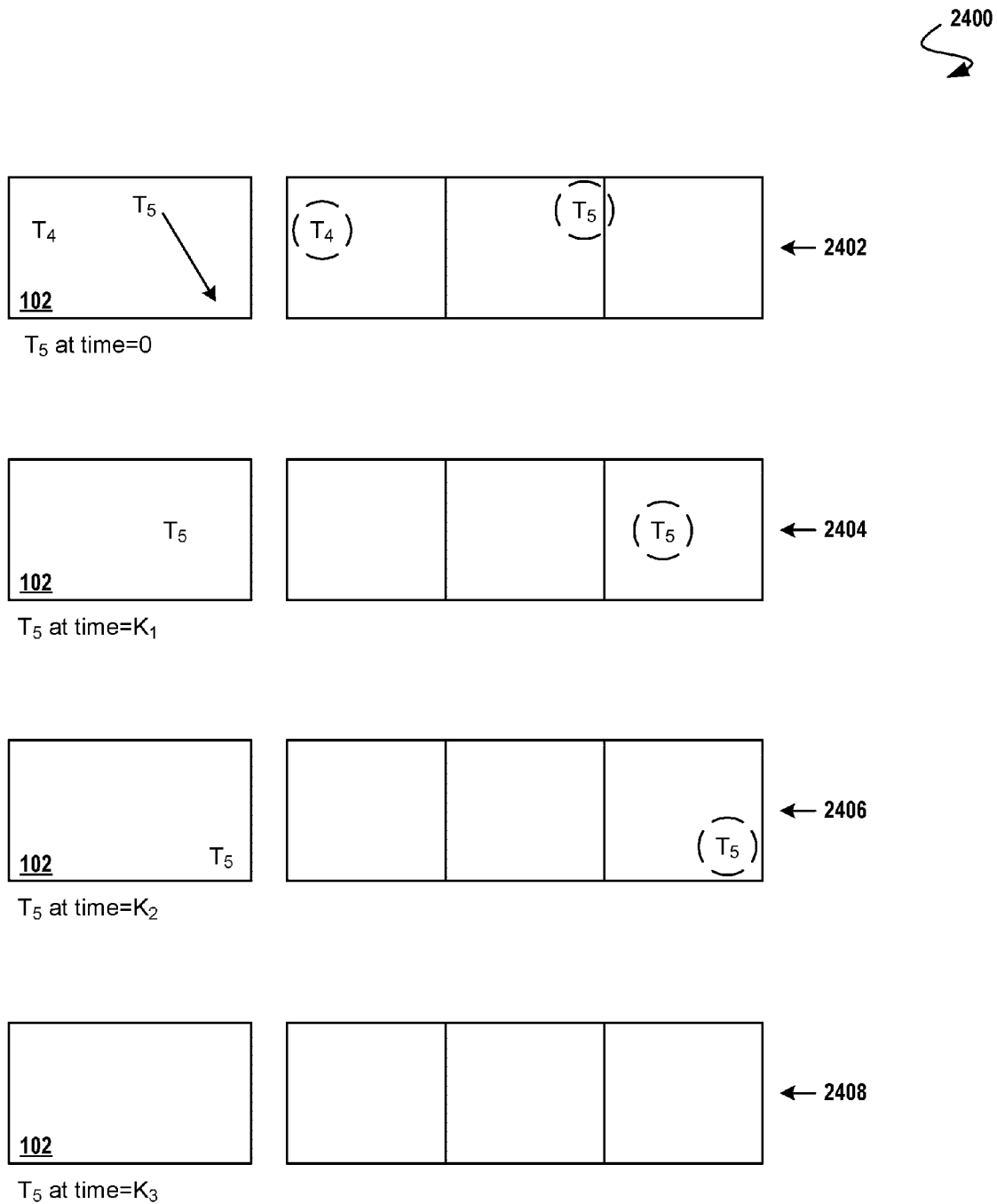
FIG. 24 is a depiction of touch scattering shown in a mosaic formed by multiple cameras, according to one embodiment.

FIG. 24 is a depiction of touch scattering shown in a mosaicked image formed by multiple cameras, according to one embodiment. The figure shows several instances of touch gestures; specifically, a tap gesture $T_4$ and a drag gesture $T_5$, for which portions of the touch scattering patterns appear in portions of the mosaicked view of multi-touch display component 102 contributed by four different cameras (e.g. row 2402); a time-wise second portion of a drag gesture $T_5$ at a time=$K_1$ (e.g. row 2404); a time-wise third portion of a drag gesture $T_5$ at a time=$K_2$, (e.g. row 2406); and the time-wise terminus (e.g. removal) of a drag gesture $T_5$ at time=$K_3$ (e.g. row 2408). As shown, the beginning of the touch $T_5$ is detected at time=0 and is tracked (as discussed infra) until the touch reaches a terminus and/or the touch is removed. In some cases a touch is mapped to an object within a user silo, and aspects of the touch (e.g. drag, as in the present example), including changes of the touch over time, are used to apply a physical parameter to the mapped object.

Figure 25:
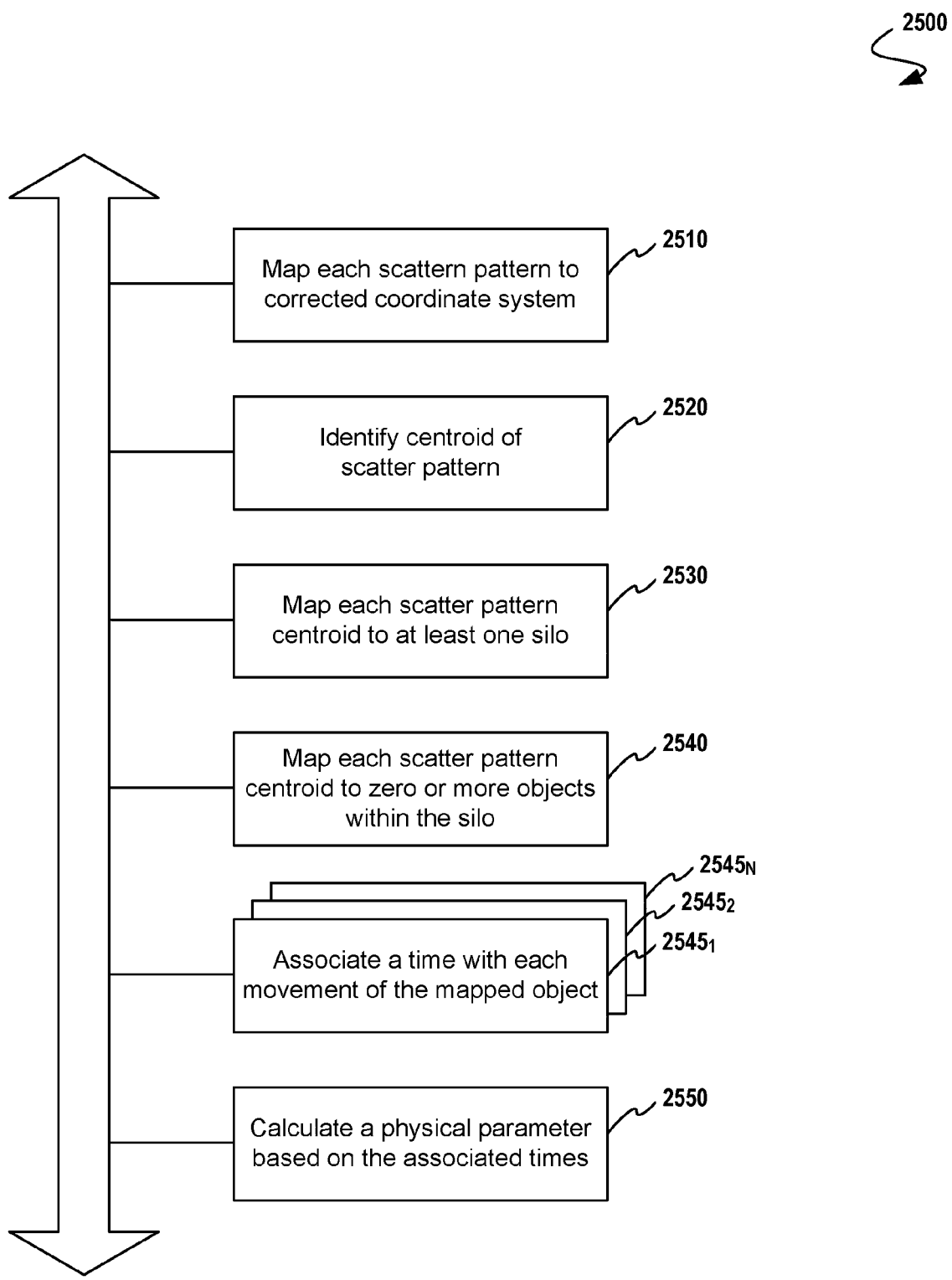
FIG. 25 is a flowchart of a method for imparting a physical parameter to a display object, according to one embodiment.

FIG. 25 is a flowchart of a method for imparting a physical parameter to a display object, according to one embodiment. As an option, the method for imparting a physical parameter to a display object 2500 may be implemented in the context of the architecture and functionality of FIG. 1 through FIG. 24, or the method for imparting a physical parameter to a display object may be implemented in any other contexts. As shown, the method begins when one or more scatter patterns are detected. For each scatter pattern, the method maps the scatter pattern into a physical display coordinate system 940 (at 2510). The operation at 2520 serves to identify the centroid of the aforementioned scatter pattern. Of course the scatter pattern might comprise portions of the scatter pattern as sensed by more than one camera; however, when multiple cameras are mapped (and clipped) into a mosaicked view corresponding to physical display coordinate system 940 using any of the techniques described above, the scatter pattern appears as a single connected scatter pattern, and any one or more techniques in the art might be used for finding the centroid. Given the physical display coordinate of the centroid, the corresponding touch may then be mapped (at operation 2530) to a particular user silo, whose coordinates on the display are also known by the software that draws and manages the silos. In some cases, the centroid might be precisely on the border of two silos, or for other reasons might be sufficiently ambiguous so as to warrant the use of a second technique for mapping to a single silo. In such a case, one technique might consider if the centroid is directly over a display object and, if so, the technique might bias assignment of the silo toward the silo in which the object's centroid exists.

Continuing, the method maps the scatter pattern centroid to zero or more objects in the silo (at operation 2540). In some cases, a single touch might exhibit a scatter pattern centroid that is calculated to be within the bounds of a single display object, and that single object is selected. In other cases, a single touch might exhibit a scatter pattern centroid that is calculated to be within the bounds of multiple display objects (i.e. overlapping objects), in which case either a single object is selected (e.g. the object appearing to lie top-most among the overlapping objects), or multiple objects are selected, based on a rule set regime. Based on the time-based characteristics captured in operations $2545_1$-$2545_N$, when at least one scatter pattern centroid is mapped (in operation 2540), the method is then armed to impart a physical parameter to the mapped object (at 2550). For example, if the mapped object is accelerated, the imparted force might be calculated (based on a default value for the mass of the object) using the equation F=mA, where a simulated mass m is assigned to the object. Given a force then, physical parameters, e.g. momentum, might be imparted to the object, and movement of the object (i.e. even after the touch has been removed) might be calculated using classical mechanics (e.g. Newtonian physics, including drag coefficients on a simulated physical surface corresponding to the multi-touch display component 102).

Returning to the example of FIG. 24, if the movement of gesture $T_5$ across the multi-touch display component 102 is deemed to be a constant velocity motion over time, then the mapped object might merely be moved from its initial position at time=0 to a position close to the touch location of $T_5$ at time=$K_2$. As another example, however, if the movement of gesture $T_5$ from time=0 through time=$K_3$ is deemed to be an acceleration, then the mapped object might be imparted an acceleration and move as if 'flicked' or 'tossed'. Alternatively, if the release of contact with the surface of multi-touch display component 102 of gesture $T_5$ is deemed to occur after the touch gesture motion has stopped, the mapped object may be left at a position near the release point, whereas if the release is deemed to occur before motion has stopped, then the mapped object might be imparted an acceleration and move as if 'flicked' or 'tossed'.

Figure 26:
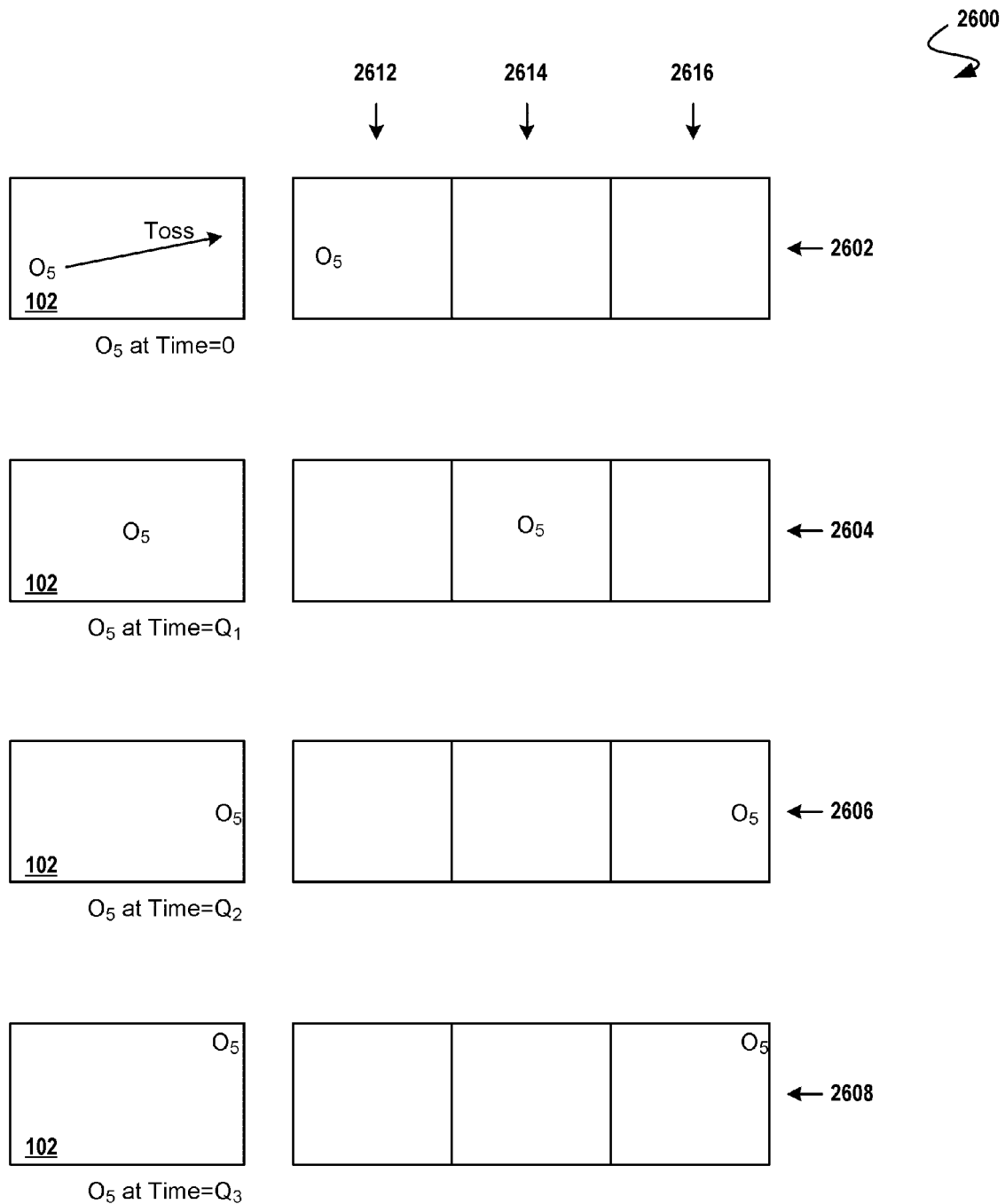
FIG. 26 is a depiction of a method for passing a display object, according to one embodiment.

FIG. 26 is a depiction of a method for passing a display object, according to one embodiment. As an option, the method for imparting for passing a display object 2600 may be implemented in the context of the architecture and functionality of FIG. 1 through FIG. 25, or the method for passing a display object may be implemented in any other contexts. As shown, at Time=0, a tossable object $O_5$ is oriented near the lower-left corner of multi-touch display component 102. Upon a toss (or other) gesture, and possibly including imparting a physical parameter as described supra, the object $O_5$ moves to the right. At time Time=$Q_1$, (see row 2604) the object $O_5$ has moved from a left silo 2612 to a center silo 2614. At a later time, the object $O_5$ moves farther to the right, such that at time Time=$Q_2$, (see row 2606) the object $O_5$ has moved from a center silo 2614 to a right silo 2616.

Thus, embodiments of the invention allow for passing of objects between silos allocated to different users. The passed objects may correspond to computer files, such as written documents, photos, storage archives, or any other electronic file that may be stored on the computer. The passed objects may also correspond to graphical renderings (e.g., images, animations, videos) contained within a single graphical application whose display occurs on multi-touch display component 102. Passing of objects from one user zone to another is envisioned via a variety of methods. In one such method, a first user using a first user zone selects a displayed object via a touch gesture (e.g., by touching the displayed object on multi-touch display component 102 and not releasing the touch), and then performs a 'flick' gesture, as described above, that causes the displayed object to move toward a second user zone. After the object leaves the first user zone and enters the second user zone, possibly after traversing zones allocated to other users or possibly after crossing physical display regions not dedicated to any user, a second user may touch the displayed object to stop its movement in the second user zone. Such a passing operation is depicted by the movement of object O5 over time period Time=0 through Time=Q1, in this case using silos. The second user touch gesture causes the displayed object to be 'received' into the second user silo, at which point the second user may operate on it with the full privileges granted to owners of objects within a dedicated user silo. The second user's operations on the displayed object are independent of touch inputs by the first user using the first user silo.

In other embodiments of the invention, displayed objects may be passed between user silos via myriad techniques and touch gestures. For example, a first user may touch the displayed object within a first user silo, and then drag it across silo boundaries into a second user silo, where release of touch contact with multi-touch display component 102 causes the displayed object to be incorporated into the workspace of the second user silo. The displayed object may now be manipulated by touches within the second user silo, but not by touches within the first user silo. In related embodiments, after a first user has dragged a displayed object from a first user silo into a second user silo, a second new touch on the displayed object within the second user silo is required to occur before the first touch is released in order receive the displayed object into the second user silo. In still other embodiments, a first user passes a displayed object between user silos by placing the object, initially displayed within the first user's silo, into a 'shared' sub-region of the first user silo. Representations of this shared sub-region may appear in all other user silos, such that a representation of the displayed object appears in the shared sub-regions of all other user silos. When a second user selects the representation of the display object within the shared sub-region of his respective second user silo, he can drag it out of the shared sub-region and into the main portion of his silo, where manipulation of the displayed object may proceed independently of touch input from the first user. In related embodiments, selection by the second user of the representation of the displayed object in the shared sub-region may be done via a special gesture (e.g. a double-finger touch, or a double tap touch) to indicate that input from all previous users manipulating the shared displayed object are still to be accepted while the second user is also manipulating the displayed object.

In other embodiments of the invention, passing of objects between user silos depends on the ability of users to move their silos into overlapping positions. Specifically, using any of the methods described above, or other methods, for allowing users to use touch input to move the location of their silo (e.g., via touching and dragging a title bar of the silo to a new location), a first user may position his silo so that it partially overlaps with the silo belonging to a second user. The user interface software of multi-user, multi-touch may render the two overlapping silos semi-transparently, such that objects belonging to either silo remain visible even if they are present in the silo overlap region. In some of these embodiments, all objects within the overlap region become automatically shared between the two users of the respective overlapping silos. In other of these embodiments, either of the respective silo users may use a drag gesture to move the displayed object from the overlap region into a non-overlap region within his silo, which causes the object to be accessible solely to the user owning that silo. In still other of these embodiments, objects within a silo overlap region must be addressed by a special gesture (e.g., a double tap, or a two-finger touch) to initiate sharing, or ownership transfer, between the user of the original silo in which the object existed and the user of the new silo overlapping it. Embodiments of the invention allow more than two silos to overlap in this manner, with sharing permitted via similar mechanisms as described above, such as gestures or automatic sharing, for more than two users.

Configurations for Managing Aural Interactivity Among Multiple Users

Figure 27:
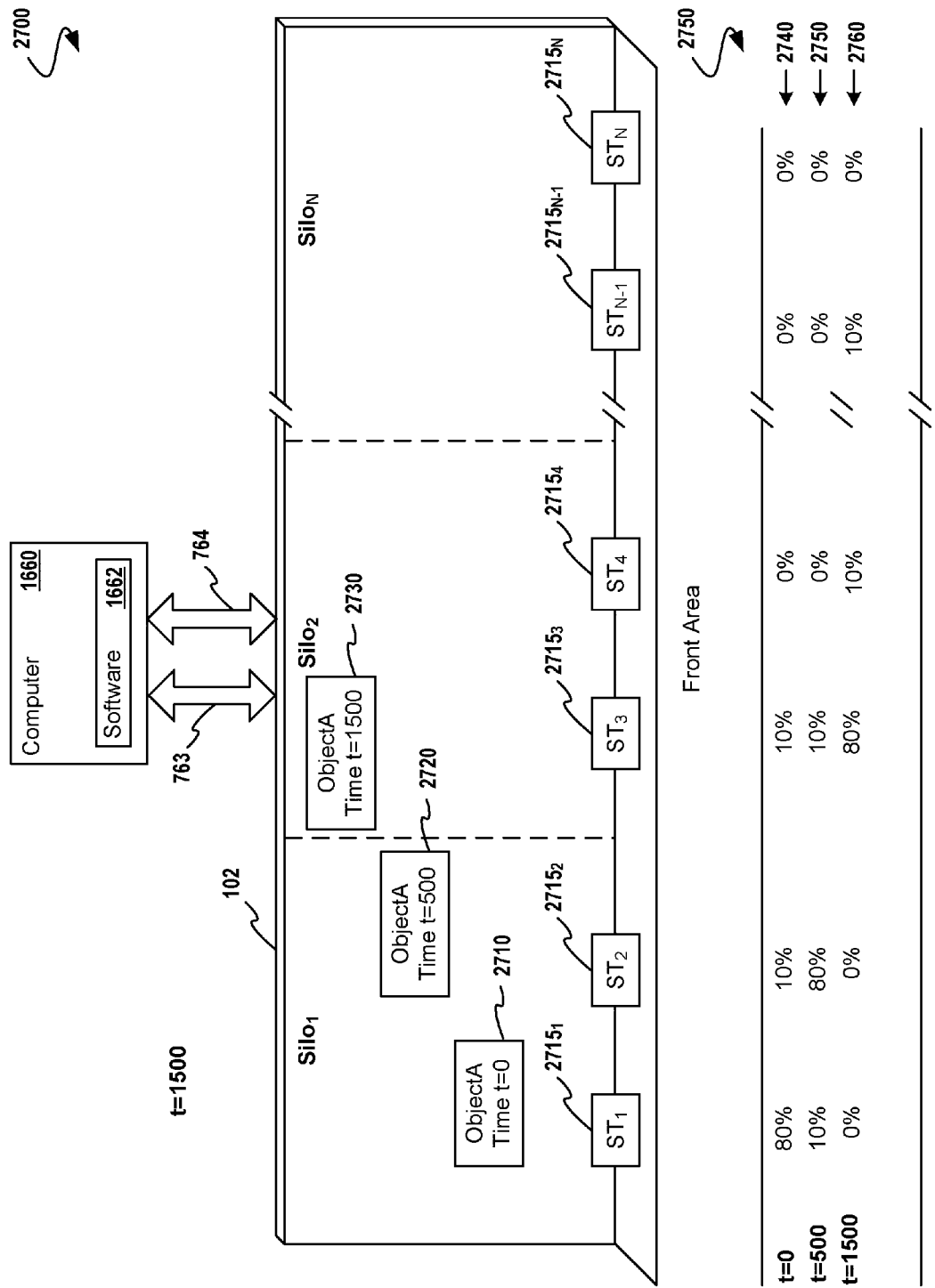
FIG. 27 is a depiction of an apparatus for managing multiple users using the same user interface apparatus having a plurality of audio transducers, according to one embodiment.

FIG. 27 is a depiction of an apparatus for managing multiple users using the same user interface apparatus 100 having a plurality of audio transducers, according to one embodiment. As an option, an apparatus for managing multiple users using the same user interface apparatus having a plurality of audio transducers 2700 may be implemented in the context of the architecture and functionality of FIG. 1 through FIG. 26, or the apparatus for managing multiple users using the same user interface apparatus having a plurality of audio transducers may be implemented in other contexts. As shown, a multi-touch display component 102 has nearby a plurality of sound transducers (e.g. speakers, microphones) $ST_1$, $ST_2$, $ST_3$, $ST_4$, $ST_{N-1}$, $ST_N$. The sound transducers might be disposed substantially equidistantly across the width W 132 of a multi-touch display component 102, or they might be disposed somewhat non-linearly, depending on the acoustics of the environment. Strictly as an example, FIG. 27 shows three silos, $Silo_1$, $Silo_2$, and $Silo_N$, and within the physical space of $Silo_1$ and $Silo_2$ are shown three positions 2710, 2720, and 2730 of an object ObjectA corresponding to three different times time=0, time=500, and time=1500 at which ObjectA was displayed at those positions. The apparatus of FIG. 27 also shows a computer 1660 and software 1662.

Using the apparatus for managing multiple users using the same user interface apparatus having a plurality of audio transducers 2700, the system might operate by allocating a first physical space (e.g. $Silo_1$) within the physical boundary of the multi-touch display component 102 for use by a first user. At some point in time a second user might arrive, and the system might respond by allocating a second physical space within the physical boundary of the multi-touch display component 102 for use by a second user. Now, there are two users in general proximity, though each user might interact independently from one another. Accordingly, the system, possibly under control of computer 1660, aids in separating the aural experiences of the two users by performing audio spatialization using the plurality of audio transducers corresponding to the first physical space (i.e. the first user's space) and corresponding to the second physical space (i.e. the second user's space). In somewhat more general terms, the aural experience of the two users are separated by virtue of reproduction of two sound streams, one that is substantially centered by and between speakers near the first user ($ST_1$ and $ST_2$ in the case of the first user in FIG. 27) and a second sound stream that is substantially centered by and between speakers near the second user ($ST_3$ and $ST_4$ in the case of the second user in FIG. 27). While this example uses different sound transducers to provide sound for different user spaces, other example placements of users of this embodiment may result in the sharing of one or more transducers in producing sound for the respective users when they are in even closer physical proximity. However, the sound streams are still apportioned among transducers such that they are perceived by each user to be substantially centered near the locations of the respective silo centers of the corresponding user.

In some situations, a sound might be reproduced in association with a user operation. For example, the object ObjectA might be 'tossed' within a multi-touch display component 102 via a flicking gesture by a first user from a silo (for example, $Silo_1$) into an adjacent silo (for example, $Silo_2$). One technique for apportioning volume of sound is termed linear spatialization. During the traversal of ObjectA from its initial position at 2710 through position 2720 and to its final position in $Silo_2$ at position 2730, a sound might be linearly spatialized by varying the amplitude of the sound as shown in the relative volume settings as indicated by the listed percentages in rows 2740, 2750, and 2760. In somewhat more detail, a representative sound, for example a "whoosh", might begin with relative amplitude settings as shown in row 2740. At these settings, the source of the sound would be perceived by the user situated near $Silo_1$ to be emanating from the left side of the silo—roughly approximating the location of ObjectA at time=0. As time progresses, ObjectA moves to the right, and so does the apparent location of the source of the sound, with amplitude settings as shown in row 2750, such that at time=500, the sound might be perceived by the user situated near $Silo_1$ to be emanating from the right side of the silo—roughly approximating the location of ObjectA at time=500. In this example, the operation of tossing ObjectA results in the object coming to rest in $Silo_2$. Accordingly, at time=1500, ObjectA comes to rest on the left side of $Silo_2$, and so does the apparent location of the source of the sound, with amplitude settings as shown in row 2760, such that at time=1500, the sounds as perceived by a user situated near $Silo_2$ might be perceived by the user situated near $Silo_2$ to be emanating from the left side of $Silo_2$—roughly approximating the location of ObjectA at time=1500.

In some situations, a non-linear apportioning of sound amplitudes to the sound transducers might be convenient and/or result in more realistic, more aesthetic, and/or more desired sound reproduction. Accordingly, an array of values as in row 2750 might be implemented as a look-up table, such that the apportioned amplitude of every transducer in the system might be obtained via a look-up function that returns a set of amplitudes to be applied to the transducers given a coordinate of some point (e.g. a coordinate of an object) within the area of the multi-touch display component 102. Using such a look-up table, not only linear but also non-linear behavior can be modeled. Moreover, a look-up table might return a set of amplitude values, one for each transducer in the system. In some embodiments, the lookup table is designed to cause the total power of sound output by the transducers to be the constant for any input coordinate of a point on multi-touch display component 102. This has the benefit, for example, of causing the sound associated with a moving object to not be perceived as changing in amplitude as it moves around the multi-touch display component 102, from the perspective of a user whose movements follow the object such that the user's ears remain approximately constant distance from the moving displayed object. One suitable design of lookup table is illustrated in the following tables labeled Table 2-Table 4, which indicates individual relative amplitude values for each of six transducers associated with six linearly distributed corresponding locations across the horizontal width W 132 of multi-touch display component 102. The lookup table for a given transducer is constructed by centering a triangle function at the corresponding display coordinate (e.g. X=0) for the sound transducer, with higher amplitude of this transducer occurring when the displayed object is nearest this transducer on multi-touch display component 102. Examination of these lookup tables shows that their sum at any display location is equal to 100%. Alternative functions for the individual sound transducer lookup tables may be substituted for the triangle shape, such as cosinusoidal functions, inverse functions, etc., while still preserving the property that the sum of all lookup table values at a particular display location sum to 100%.

TABLE 2

Horizontal Lookup For X Coordinate at Left

| Item | $ST_1$ | $ST_2$ | $ST_3$ | $ST_4$ | $ST_5$ | $ST_6$ |
|---|---|---|---|---|---|---|
| Amplitude | 80% | 15% | 5% | 0% | 0% | 0% |

TABLE 3

Horizontal Lookup For X Coordinate at Middle

| Item | $ST_1$ | $ST_2$ | $ST_3$ | $ST_4$ | $ST_5$ | $ST_6$ |
|---|---|---|---|---|---|---|
| Amplitude | 0% | 10% | 40% | 40% | 10% | 0% |

TABLE 4

Horizontal Lookup For X Coordinate at Right

| Item | $ST_1$ | $ST_2$ | $ST_3$ | $ST_4$ | $ST_5$ | $ST_6$ |
|---|---|---|---|---|---|---|
| Amplitude | 0% | 0% | 0% | 5% | 15% | 80% |

Of course, the tables above depict spatialization values for locations that vary in the X coordinate dimension (e.g. horizontal dimension, length dimension, width dimension). In other embodiments, additional lookup table are provided for apportioning sound amplitude in the Y coordinate dimension (e.g. vertical dimension, height dimension), and/or the Z coordinate dimension (e.g. depth dimension). Furthermore, the table lookup technique might include multiple lookup operations for handling stereo sound sources, or quadraphonic sound sources. In this manner sound sources may be reproduced with effects for a binaural listener (i.e. a human with left ear and a right ear).

Still further, some embodiments implement centering spatialization (i.e. within a zone) using synthesized reverberation to simulate a physical barrier co-located with the left and right boundaries of a given silo (as further described below).

Of course the foregoing are but examples, and many other experiences including coordinating movement of at least one object between physical spaces while emitting a sound from the user interface apparatus are envisioned. More formally, a technique for managing multiple users using the same multi-touch display component 102 having a plurality of audio transducers $ST_1$, $ST_2$, $ST_3$, $ST_4$, $ST_{N-1}$, $ST_N$, might include: providing a plurality of audio transducers arranged horizontally across a user interface area, displaying a plurality of objects on the user interface area, associating at least one sound with at least one of said plurality of objects, and apportioning said at least one sound to at least two audio transducers based on proximal separation (e.g. a function of distance) of the object on said user interface relative to locations of said audio transducers.

Using the above techniques, a sound can be managed across a multi-touch display component 102 so as to spatialize the sound in relation to movement of an object. In some embodiments involving silos, an aural workspace might be created by assigning a spatial center of the aural workspace to be coincident with the center of the silo. In such a case, sounds corresponding to objects within a particular silo are spatialized to emanate from locations within that same silo. In alternative embodiments, sound spatialization might be performed by apportioning substantially all of the amplitude of a sound associated with a particular object to the audio transducer closest to the particular object. In still other embodiments, apportioning sound may include techniques (e.g. time division multiplexing, blending, etc) to avoid placing more than one sound on the same audio transducer.

In another embodiment an aural workspace might be created by synthesizing reverberation for a user juxtaposed before a silo. More specifically, reverberation as would be heard within a silo physical space may be synthesized as if there were a reverberating wall on the left and right of the silo. Thus, any given sound produced for $Silo_2$ might be spatially centered by the effect of amplitudes, and also might be produced with artificial reverberation, simulating a physical wall on either side of the silo.

Of course, as described above, an additional user physical space might be allocated at any moment in time, and the center of the physical space of the silo corresponding to the new user might not be directly coincident with the center of the closest two sound transducers. In this situation, the sound corresponding to the new user's interactions might be reproduced using amplitude settings across the plurality of speakers so as to simulate aural centrality. More formally, the computer 1660 might operate for performing audio spatialization corresponding to the first physical space and the second physical space by centering the audio signals within the first physical space and centering the audio signals within the second physical space. Of course in the foregoing example, the first physical space is a rectangle and the second physical space is a rectangle and the second physical space does not overlap the first physical space, however other spatial partitioning is possible and envisioned.

Figure 28:
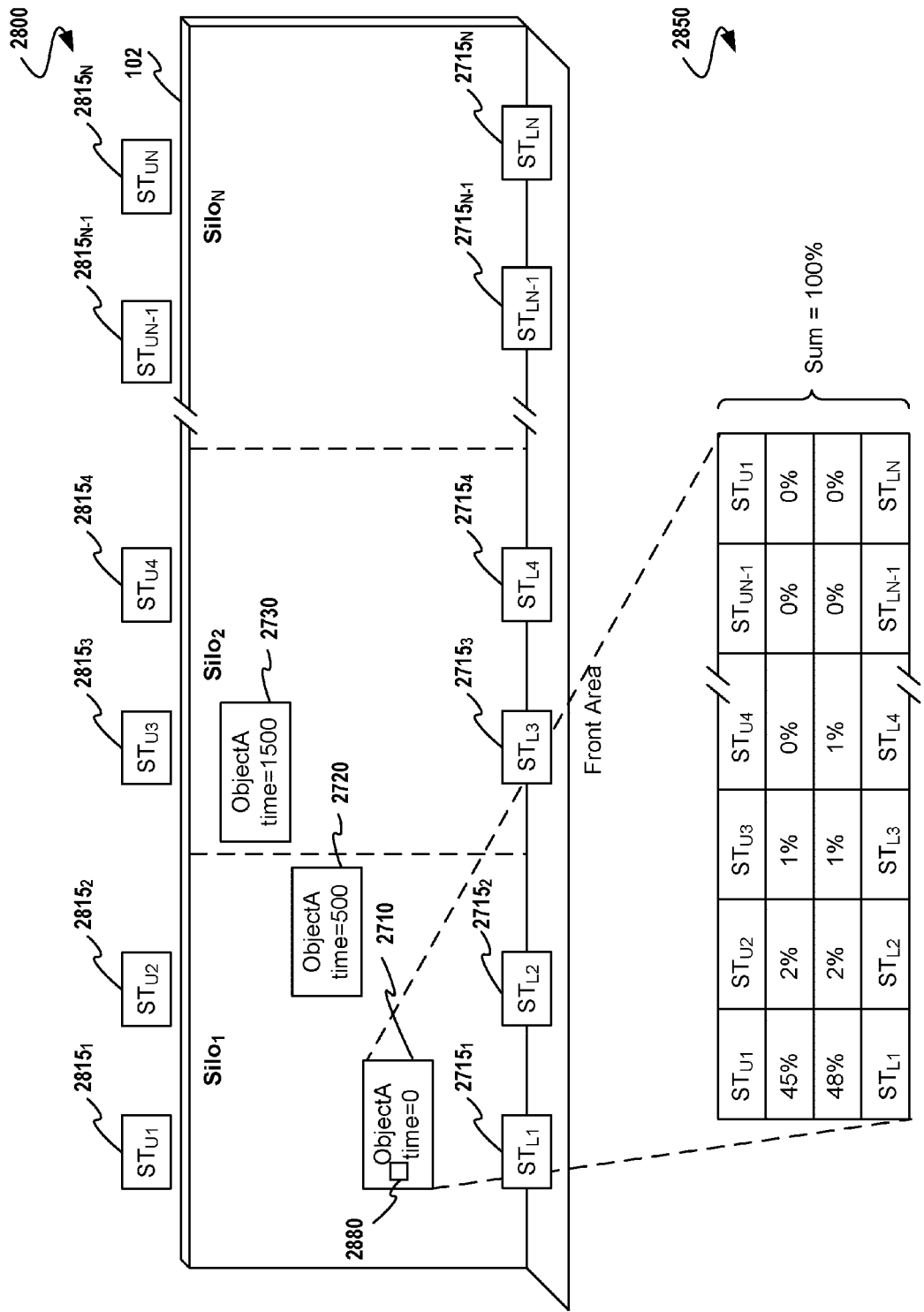
FIG. 28 is a depiction of an alternative apparatus for managing multiple users using the same user interface apparatus having a plurality of audio transducers, according to one embodiment.

FIG. 28 is a depiction of an alternative apparatus for managing multiple users using the same user interface apparatus having a plurality of audio transducers, according to one embodiment, in which sounds are spatialized across two dimensions of a multi-touch display component. As an option, the alternative apparatus for managing multiple users using the same user interface apparatus having a plurality of audio transducers 2800 may be implemented in the context of the architecture and functionality of FIG. 1 through FIG. 27, or the alternative apparatus for managing multiple users using the same user interface apparatus having a plurality of audio transducers may be implemented in other contexts. As shown, a multi-touch display component 102 has disposed near it, a plurality of sound transducers (e.g. speakers, microphones) including an upper bank $ST_{U1}$, $ST_{U2}$, $ST_{U3}$, $ST_{U4}$, $STU_{N4}$, $ST_{UN}$, and a lower bank $ST_{L1}$, $ST_{L2}$, $ST_{L3}$, $ST_{L4}$, $STL_{N-1}$, $STL_N$. The sound transducers $ST_{U1}$, $ST_{U2}$, $ST_{U3}$, $ST_{U4}$, $STU_{N-1}$, $ST_{UN}$ and $ST_{U1}$, $ST_{U2}$, $ST_{U3}$, $ST_{U4}$, $STU_{N-1}$, $ST_{UN}$ might be disposed substantially equidistantly across the width W 132 of a multi-touch display component 102, or they might be disposed somewhat non-linearly, depending on the acoustics of the environment. Strictly as an example, FIG. 28 shows three silos, $Silo_1$, $Silo_2$, and $Silo_N$, and within the physical space of $Silo_1$ and $Silo_2$ are shown three positions 2710, 2720, 2730 of an object ObjectA corresponding to three different times time=0, time=500, and time=1500. In a manner similar to the aforementioned, audio spatialization techniques may be applied across the dimension of height. That is, during the traversal of ObjectA from its initial position at 2710 through position 2720 and to its final position in $Silo_2$ at position 2730, a sound might be apportioned by varying the amplitude of the sound as shown in the relative volume settings. A possible apportioning for a defined area 2880 within the area of a multi-touch display component 102 might include a relative apportioning, including a percentage value for each and every transducer in the system. In the embodiment shown, the sum of all values in the array 2850 comes to 100%. Of course such a look-up table might be populated for any location within the area of a multi-touch display component 102. In fact the size of a defined area 2880 might be defined to be larger than the area of the defined area 2880, or it might be defined to be smaller than the area of the defined area 2880. As shown, the area 2880 depicts the aural source (e.g. a performer's mouth, the bell of a trumpet, etc) of the object 2710. Of course the perceived smoothness of sound motion improves as the defined area becomes smaller. The lookup tables for the horizontal and vertical dimensions may also be populated independently, with the lookup result for a particular transducer being composed of the vector outer product of a horizontal lookup table (constructed for example by methods as described above using tables similar to Tables 2 through Table 4 in conjunction with one or more vertical lookup tables (constructed by analogous methods in the vertical dimension).

More formally, a technique for managing multiple users using the same multi-touch display component 102 having a plurality of audio transducers might include: providing a plurality of audio transducers arranged horizontally across a user interface area, displaying at least one object on said user interface area located at a first position, apportioning volume of sound to at least one audio transducer based on proximity of said audio transducer to said first position, displaying said object on said user interface area across a plurality of continuous locations on said user interface area starting from said first position and continuing to a second position, and apportioning volume of sound to said audio transducers based on a function of proximal separation (e.g. a function of distance) of said audio transducers to said object moving as it moves from said first position to said second position.

Configurations Using Computers

Figure 29:
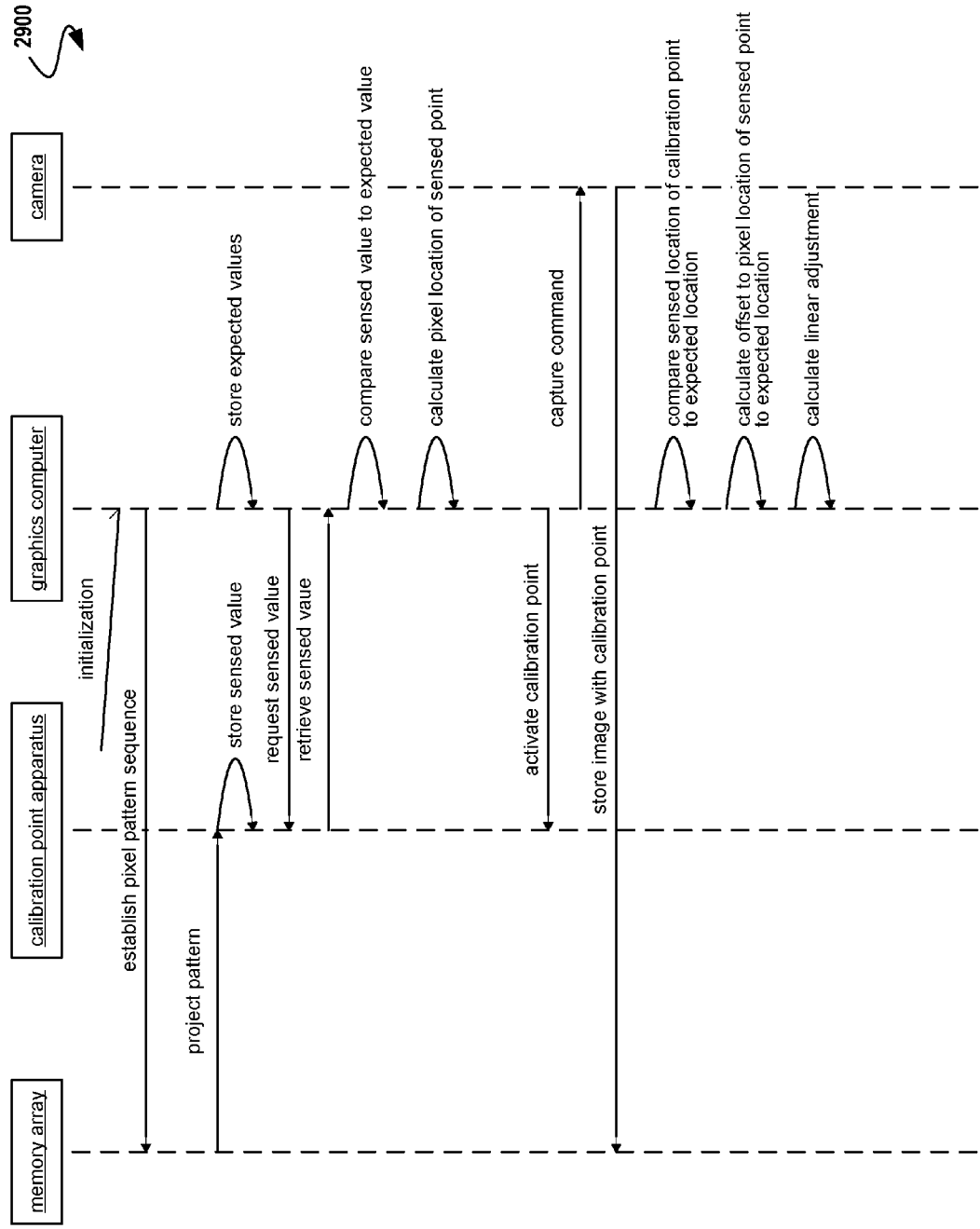
FIG. 29 is a sequence chart showing a protocol for calibration for mapping into a corrected coordinate system, according to one embodiment.

FIG. 29 is a sequence chart showing a protocol for calibration for mapping at least one projector into a physical display coordinate system, according to one embodiment. As shown, operations are performed on one or more computers, and may include communication with peripherals, which themselves may contain one or more computers.

Figure 30:
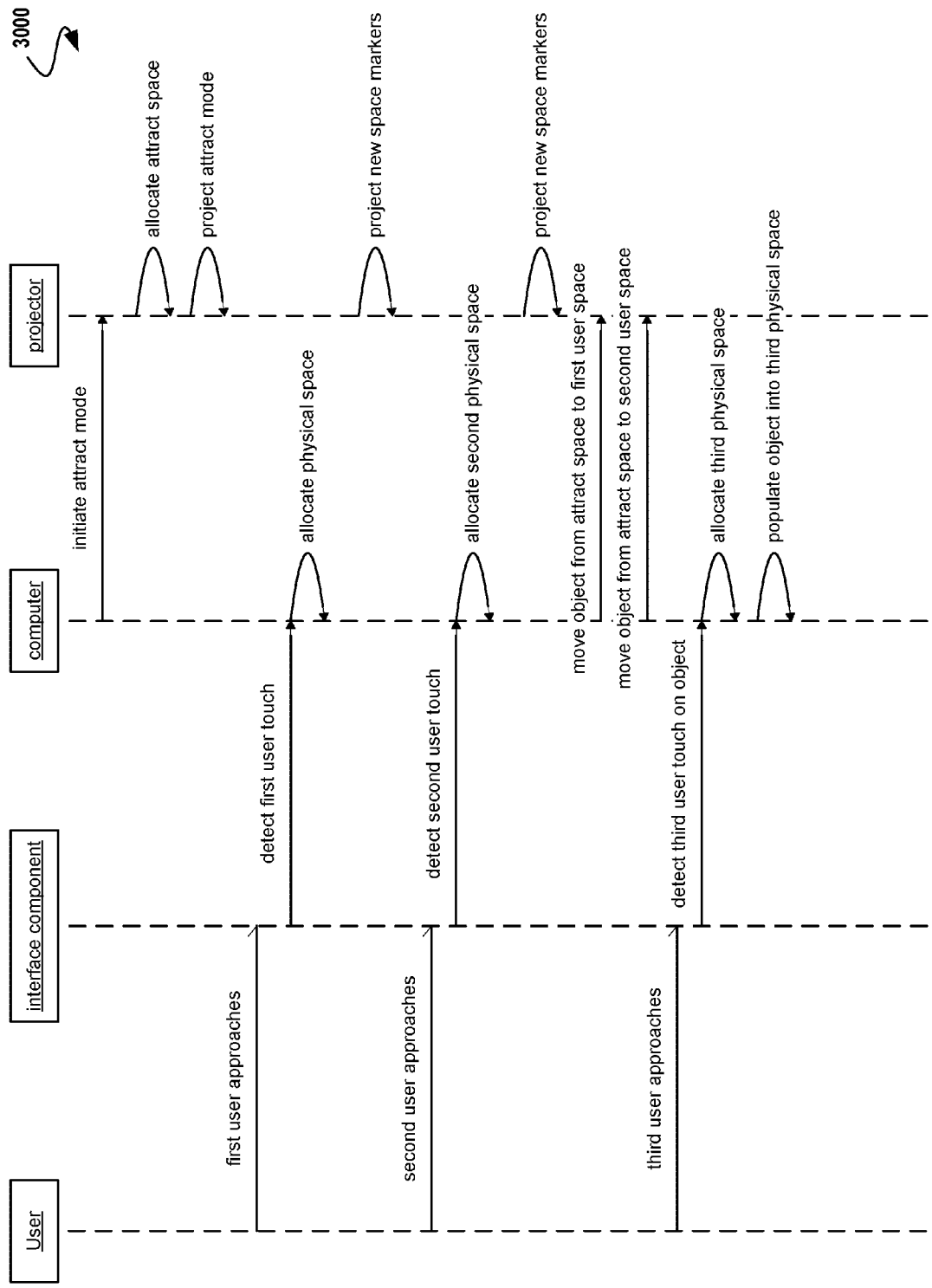
FIG. 30 is a sequence chart showing a protocol for managing interactivity among multiple users, according to one embodiment.

FIG. 30 is a sequence chart showing a protocol for managing interactivity among multiple users, according to one embodiment. As shown, operations are performed on one or more computers, and may include communication with peripherals, which themselves may contain one or more computers.

Figure 31:
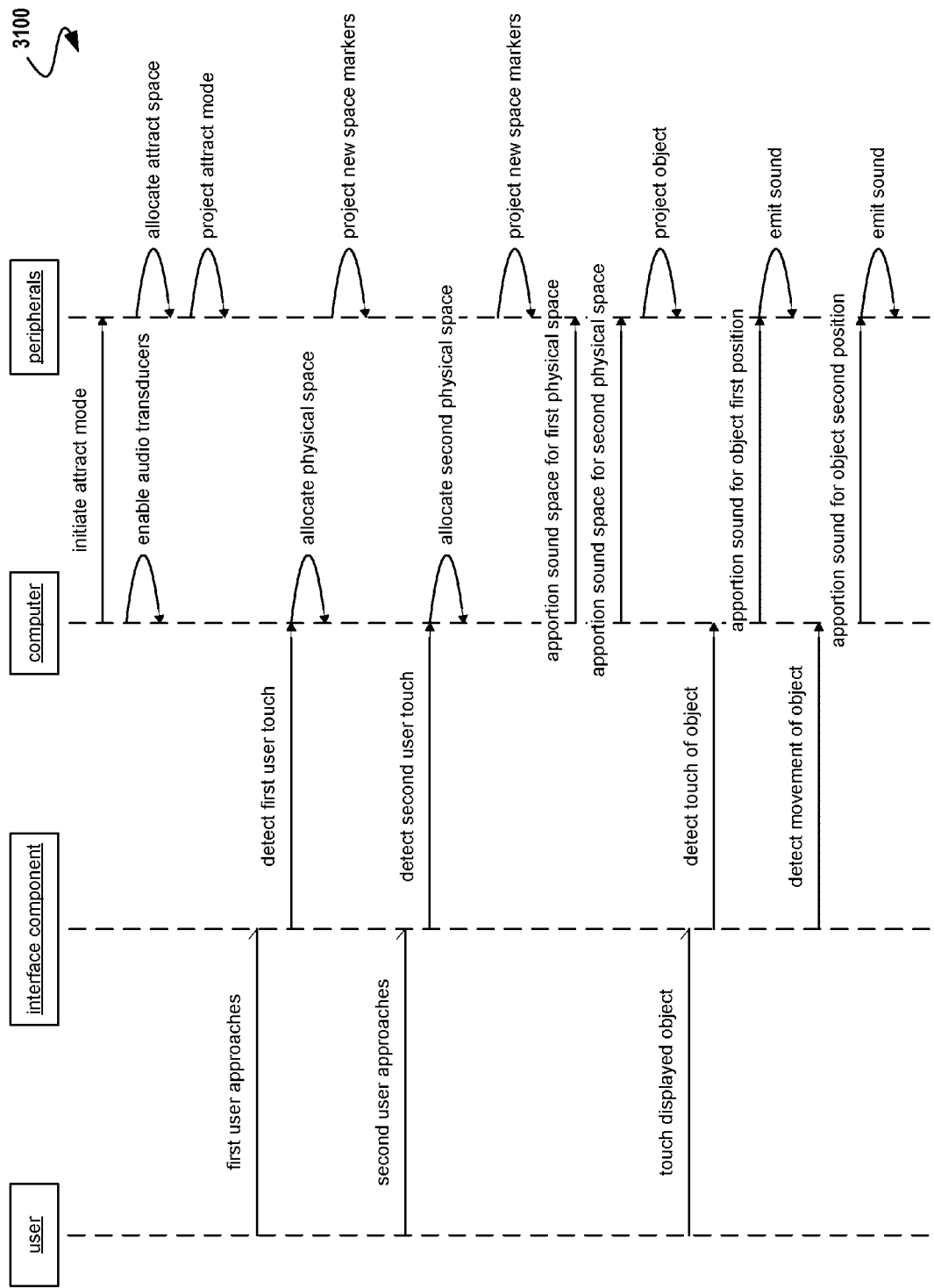
FIG. 31 is a sequence chart showing a protocol for managing multiple users using the same user interface apparatus having a plurality of audio transducers, according to one embodiment.

FIG. 31 is a sequence chart showing a protocol for managing multiple users using the same user interface apparatus having a plurality of audio transducers, according to one embodiment. As shown, operations are performed on one or more computers, and may include communication with peripherals, which themselves may contain one or more computers.

Figure 32:
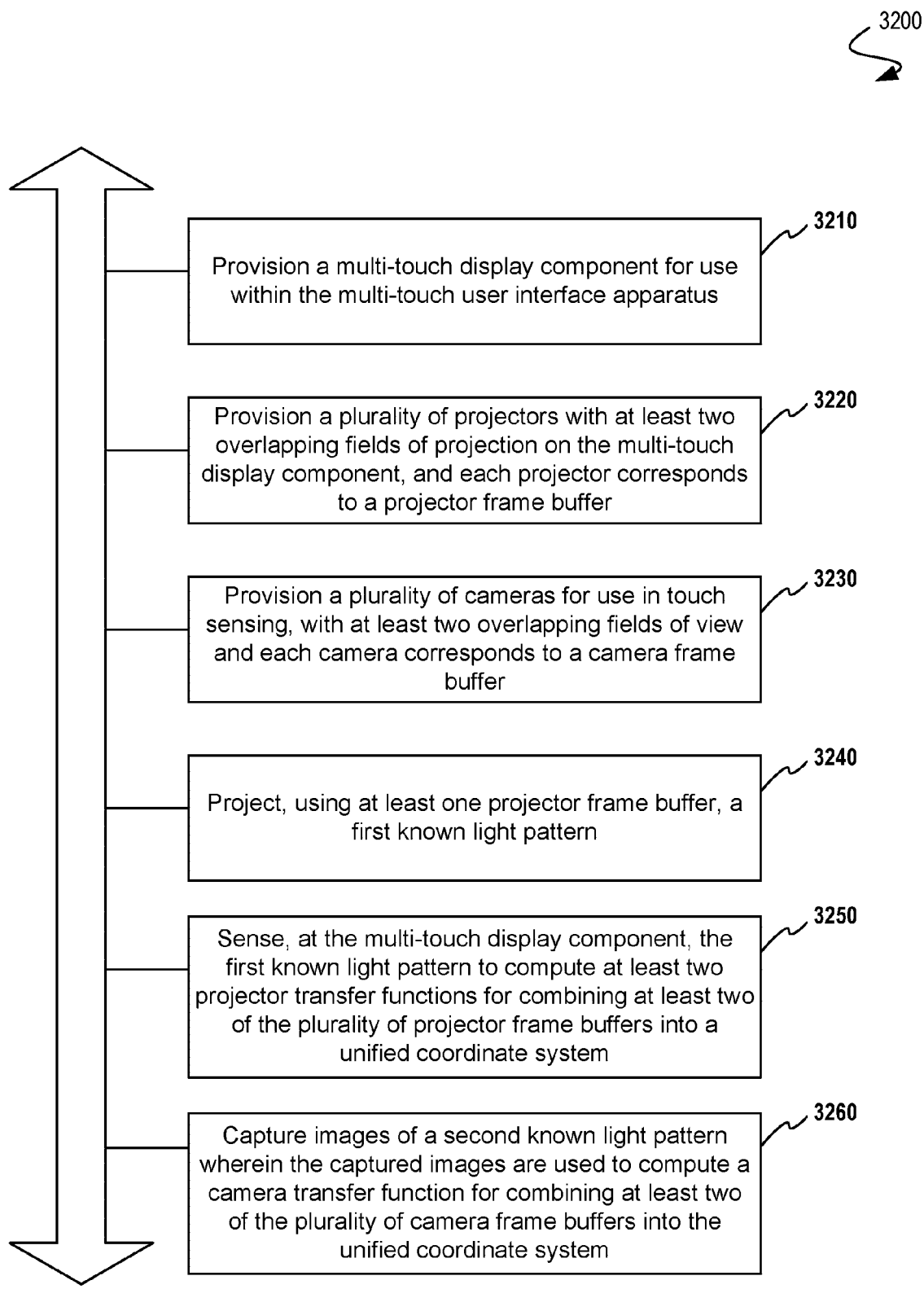
FIG. 32 is a flowchart for a method for calibrating a user interface apparatus, according to one embodiment.

FIG. 32 is a flowchart for a method for calibrating a user interface apparatus, according to one embodiment. As an option, the method 3200 may be implemented in the context of the architecture and functionality of FIG. 1 through FIG. 31, or method 3200 may be implemented in any environment. As shown, the method 3200 comprises operations for provisioning a multi-touch display component for use within the multi-touch user interface apparatus (see operation 3210), provisioning a plurality of projectors with at least two overlapping fields of projection on the multi-touch display component, with each projector corresponding to a projector frame buffer (see operation 3220), and provisioning a plurality of cameras for use in touch sensing, with at least two overlapping fields of view and each camera corresponding to a camera frame buffer (see operation 3230). Also, method 3200 comprises operations projecting, using at least one projector frame buffer, a first known light pattern (see operation 3240), sensing, at the multi-touch display component the first known light pattern to compute at least two projector transfer functions for combining at least two of the plurality of projector frame buffers into a unified coordinate system (see operation 3250); and capturing images of a second known light pattern wherein the captured images are used to compute a camera transfer function for combining at least two of the plurality of cameras frame buffers into the unified coordinate system.

Figure 33:
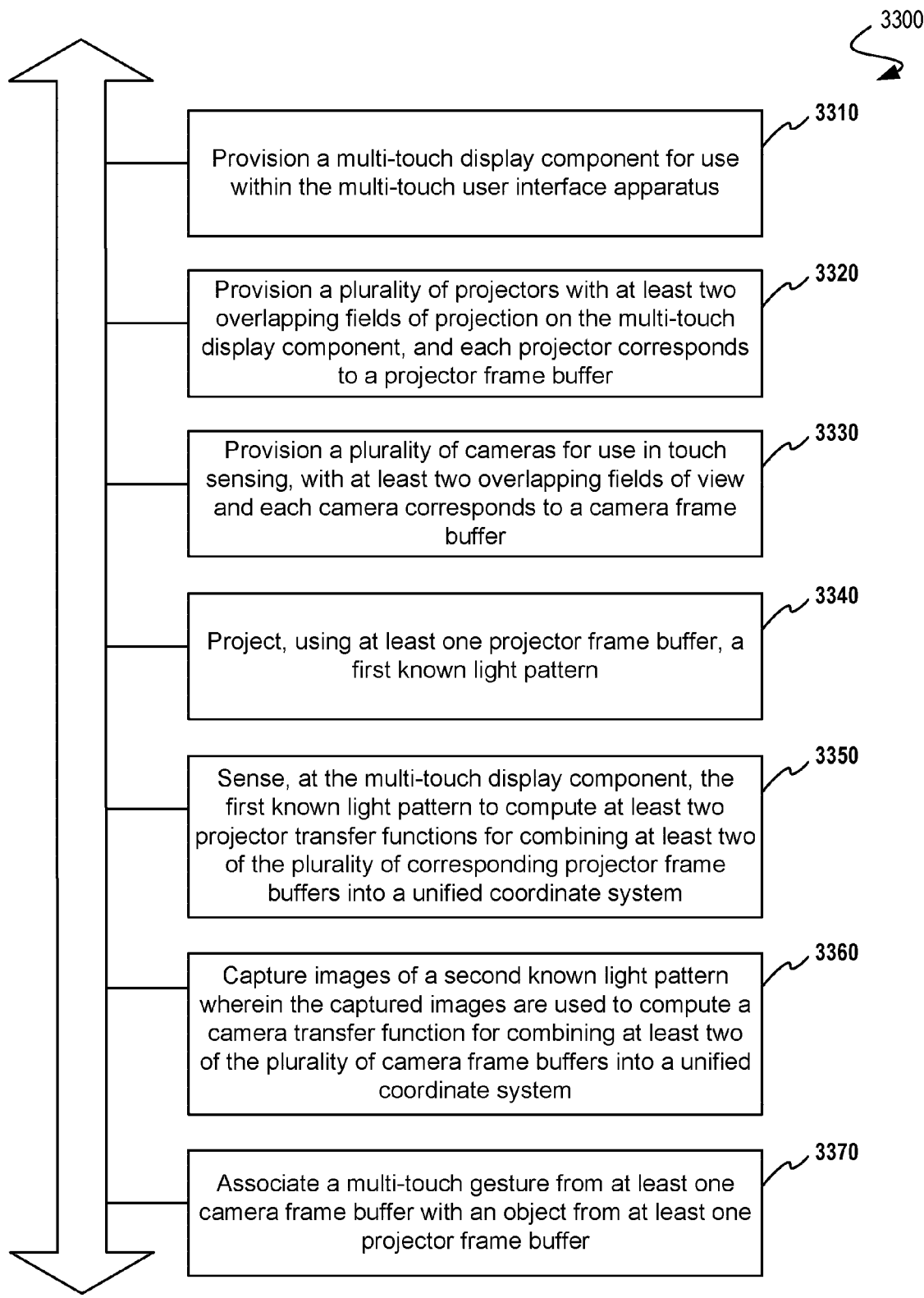
FIG. 33 is a flowchart for a method for calibrating a user interface apparatus, according to one embodiment.

FIG. 33 is a flowchart for a method for calibrating a user interface apparatus, according to one embodiment. As an option, the method 3300 may be implemented in the context of the architecture and functionality of FIG. 1 through FIG. 32, or method 3300 may be implemented in any environment. As shown, the method 3300 comprises provisioning a multi-touch display component for use within the multi-touch user interface apparatus (see operation 3310), provisioning a plurality of projectors with at least two overlapping fields of projection on the multi-touch display component, each projector corresponding to a projector frame buffer (see operation 3320), provisioning a plurality of cameras for use in touch sensing, with at least two overlapping fields of view and each camera corresponding to a camera frame buffer (see operation 3330), and projecting, using at least one projector frame buffer, a first known light pattern (see operation 3340). The method continues by sensing, at the multi-touch display component the first known light pattern to compute at least two projector transfer functions for combining at least two of the plurality of corresponding projector frame buffers into a unified coordinate system (see operation 3350), capturing images of a second known light pattern wherein the captured images are used to compute a camera transfer function for combining at least two of the plurality of camera frame buffers into a unified coordinate system (see operation 3360), and associating a multi-touch gesture from at least one camera frame buffer with an object from at least one projector frame buffer (see operation 3370).

Figure 34:
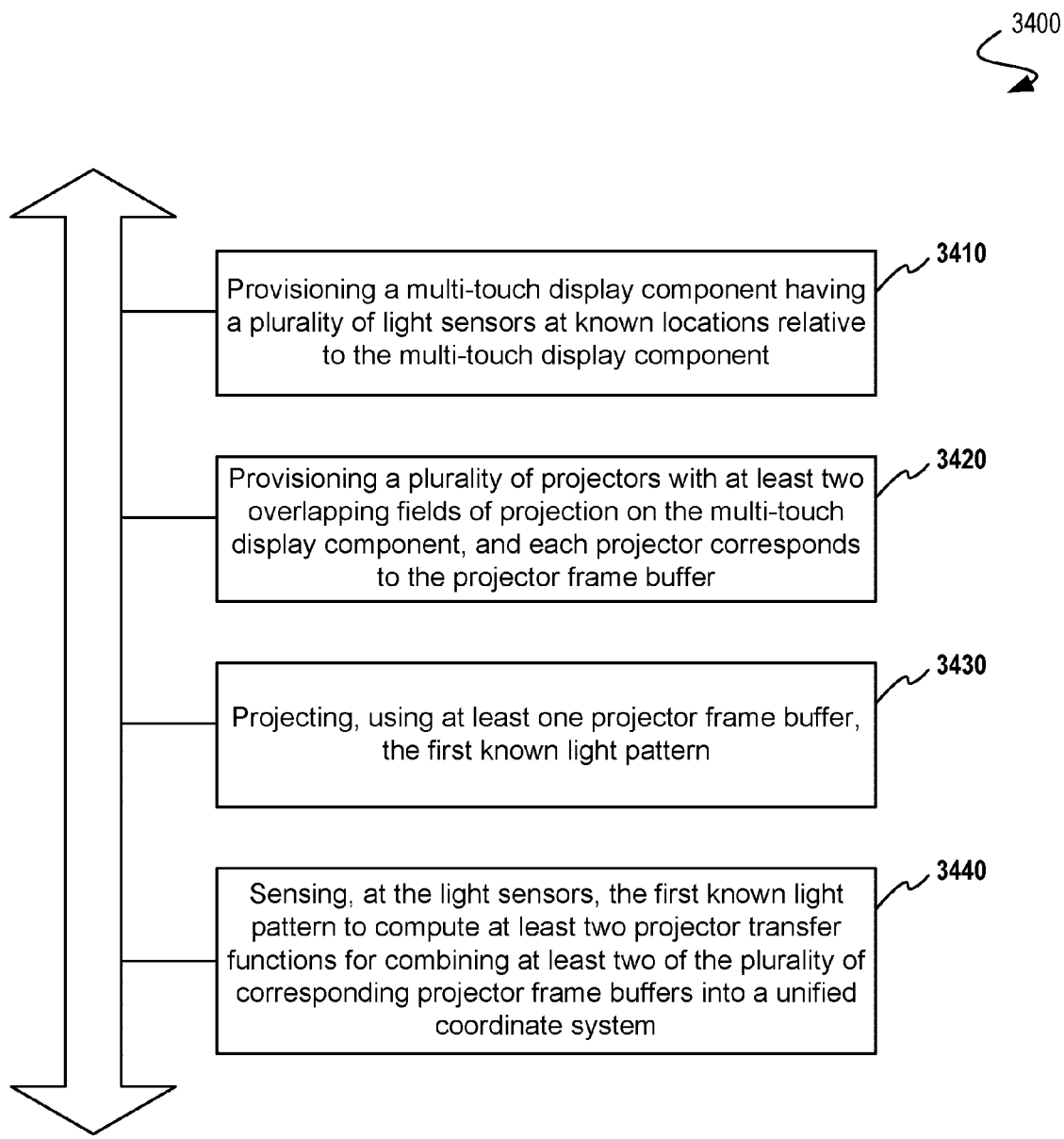
FIG. 34 is a flowchart for a method for calibrating a user interface apparatus, according to one embodiment.

FIG. 34 is a flowchart for a method for calibrating a multi-touch user interface apparatus, according to one embodiment. As an option, the method 3400 may be implemented in the context of the architecture and functionality of FIG. 1 through FIG. 33, or method 3400 may be implemented in any environment. As shown, the method 3400 comprises operations for provisioning a multi-touch display component having a plurality of light sensors at known locations relative to the multi-touch display component (see operation 3410), provisioning a plurality of projectors with at least two overlapping fields of projection on the multi-touch display component, with each projector corresponding to a projector frame buffer (see operation 3420), projecting, using at least one projector frame buffer, a first known light pattern (see operation 3430), and sensing, at the light sensors, the first known light pattern to compute at least two projector transfer functions for combining at least two of the plurality of corresponding projector frame buffers into a unified coordinate system (see operation 3440).

Figure 35:
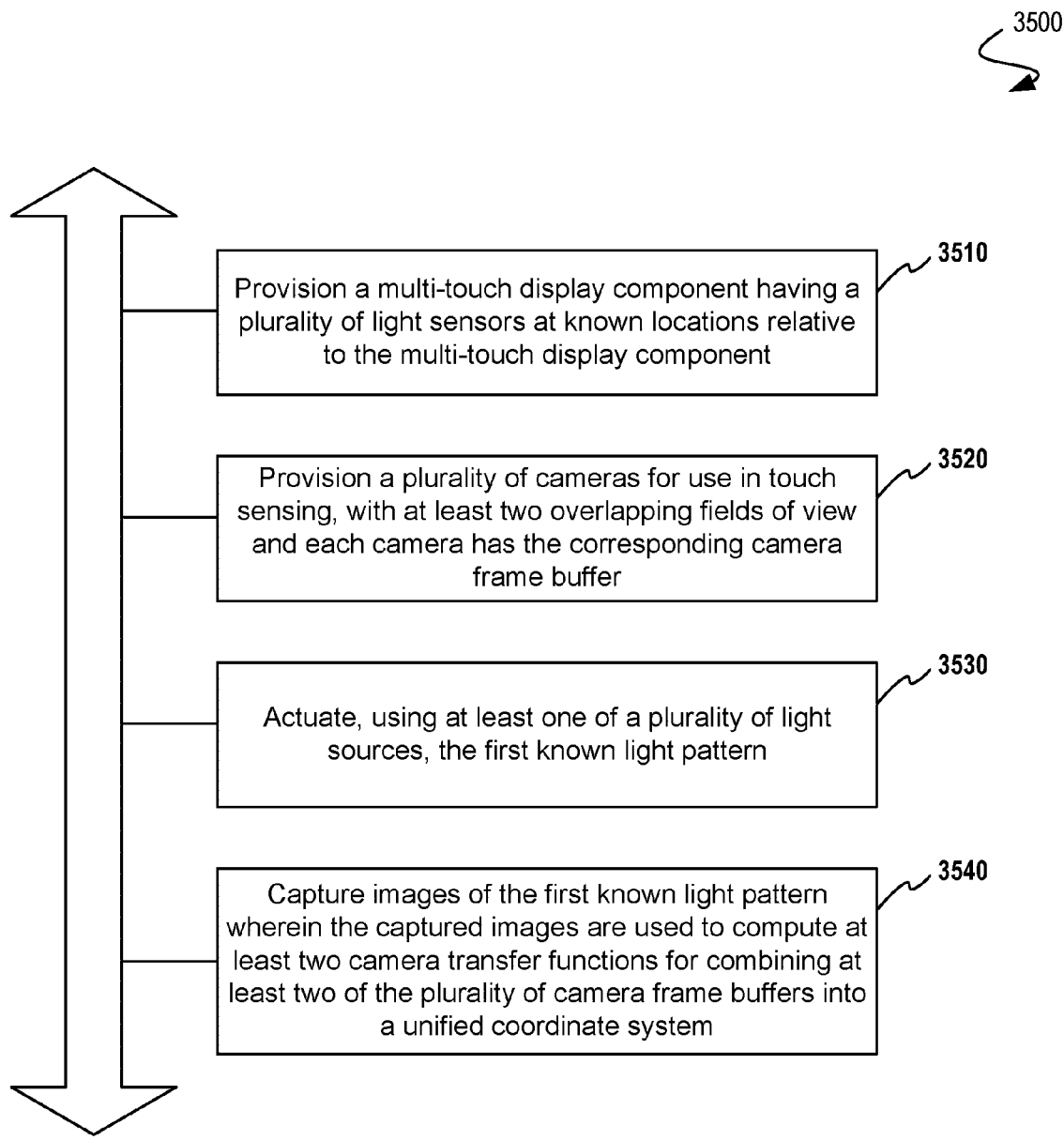
FIG. 35 is a flowchart for a method for calibrating a user interface apparatus, according to one embodiment.

FIG. 35 is a flowchart of a method for calibrating a multi-touch user interface apparatus, according to one embodiment. As an option, the method 3500 may be implemented in the context of the architecture and functionality of FIG. 1 through FIG. 34, or method 3500 may be implemented in any environment. As shown, the method 3500 comprises operations for provisioning a multi-touch display component having a plurality of light sensors at known locations relative to the multi-touch display component (see operation 3510), provisioning a plurality of cameras for use in touch sensing, with at least two overlapping fields of view the and each camera having a corresponding camera frame buffer (see operation 3520), actuating, using at least one of a plurality of light sources, a first known light pattern (see operation 3530), and capturing images of a first known light pattern wherein the captured images are used to compute at least two camera transfer functions for combining at least two of the plurality of cameras frame buffers into a unified coordinate system (see operation 3540).

Figure 36:
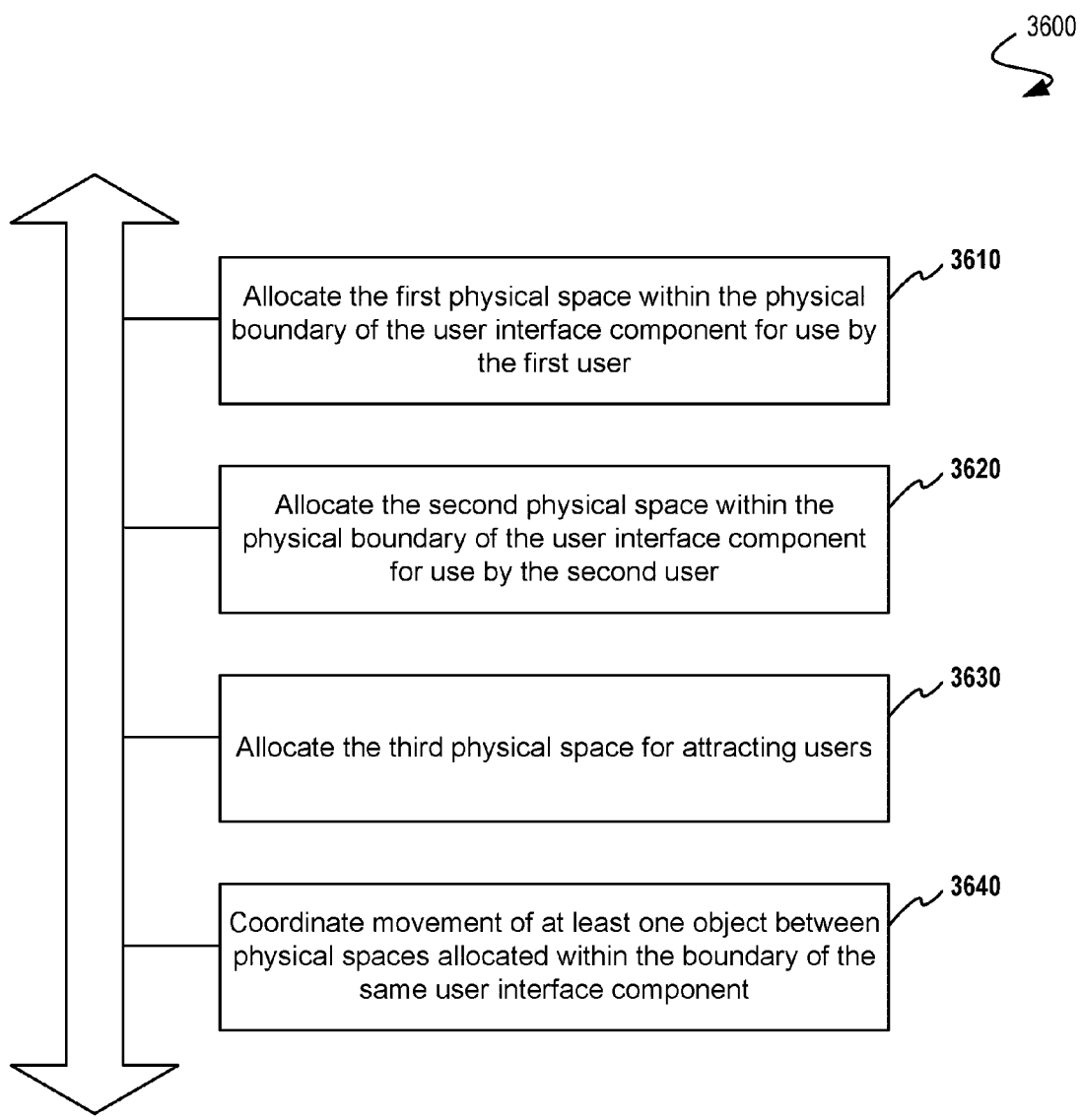
FIG. 36 is a flowchart for a method for managing multiple users using the same user interface component, according to one embodiment.

FIG. 36 is a flowchart for a method for managing multiple users using the same user interface component, according to one embodiment. As an option, the method 3600 may be implemented in the context of the architecture and functionality of FIG. 1 through FIG. 35, or method 3600 may be implemented in any environment. As shown, method 3600 comprises an operation for allocating a first physical space within the physical boundary of the user interface component for use by a first user (see operation 3610); an operation for allocating a second physical space within the physical boundary of the user interface component for use by a second user (see operation 3620); an operation for allocating a third physical space for attracting users (see operation 3630); and an operation for coordinating movement of at least one object between physical spaces allocated within the boundary of the same user interface component (see operation 3380).

Figure 37:
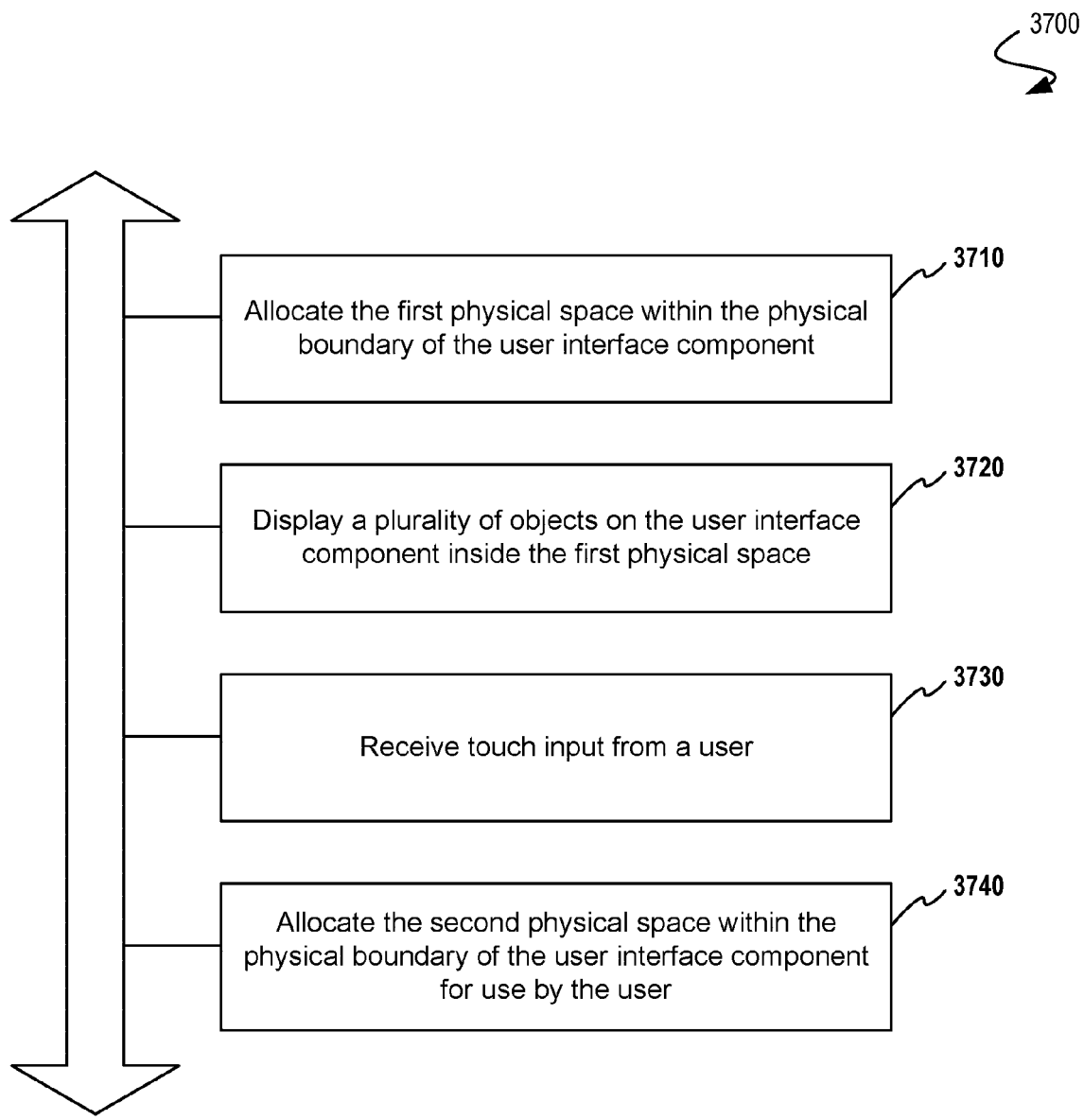
FIG. 37 is a flowchart for a method for managing multiple users using the same user interface component, according to one embodiment.

FIG. 37 is a flowchart for a method for managing multiple users using the same user interface component, according to one embodiment. As an option, the method 3700 may be implemented in the context of the architecture and functionality of FIG. 1 through FIG. 36, or method 3700 may be implemented in any environment. As shown, method 3700 comprises operations for allocating a first physical space within the physical boundary of the user interface component (see operation 3710), displaying a plurality of objects on said user interface component inside said first physical space (see operation 3720), receiving touch input from a user (see operation 3730), and allocating a second physical space within the physical boundary of the user interface component for use by said user (see operation 3740).

Figure 38:
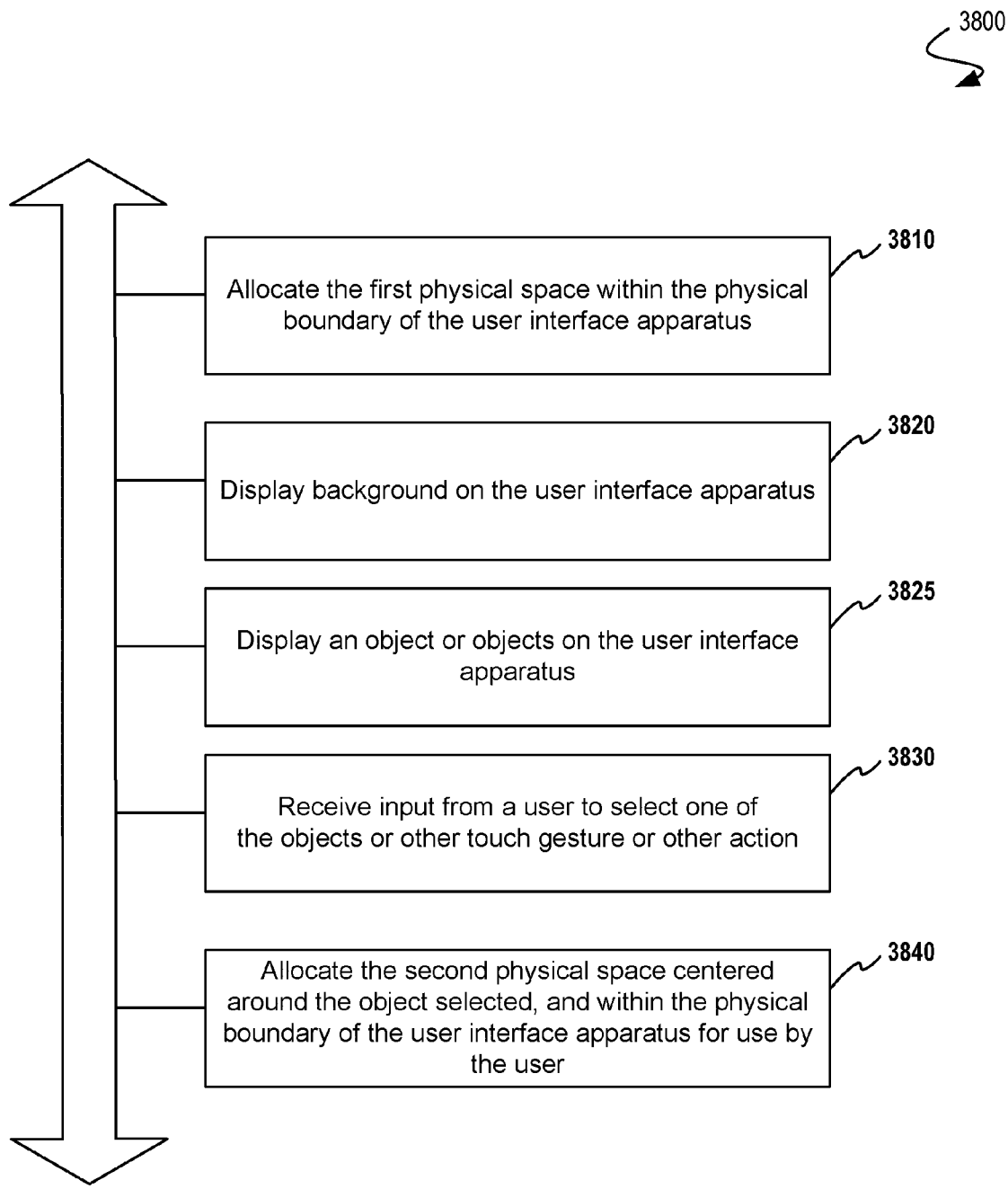
FIG. 38 is a flowchart for a method managing multiple users using the same user interface component, according to one embodiment.

FIG. 38 is a flowchart for a method managing multiple users using the same user interface component, according to one embodiment. As an option, the method 3800 may be implemented in the context of the architecture and functionality of FIG. 1 through FIG. 37, or method 3800 may be implemented in any environment. As shown, method 3800 comprises an operation for allocating a first physical space within the physical boundary of the user interface component for use by a first user (see operation 3810); an operation for displaying a plurality of objects on said user interface component outside said first physical space (see operation 3820); an operation for receiving input from a user to select one of said objects (see operation 3830); and an operation for allocating a second physical space centered around said object selected, and within the physical boundary of the user interface component for use by a second user (see operation 3840).

Figure 39:
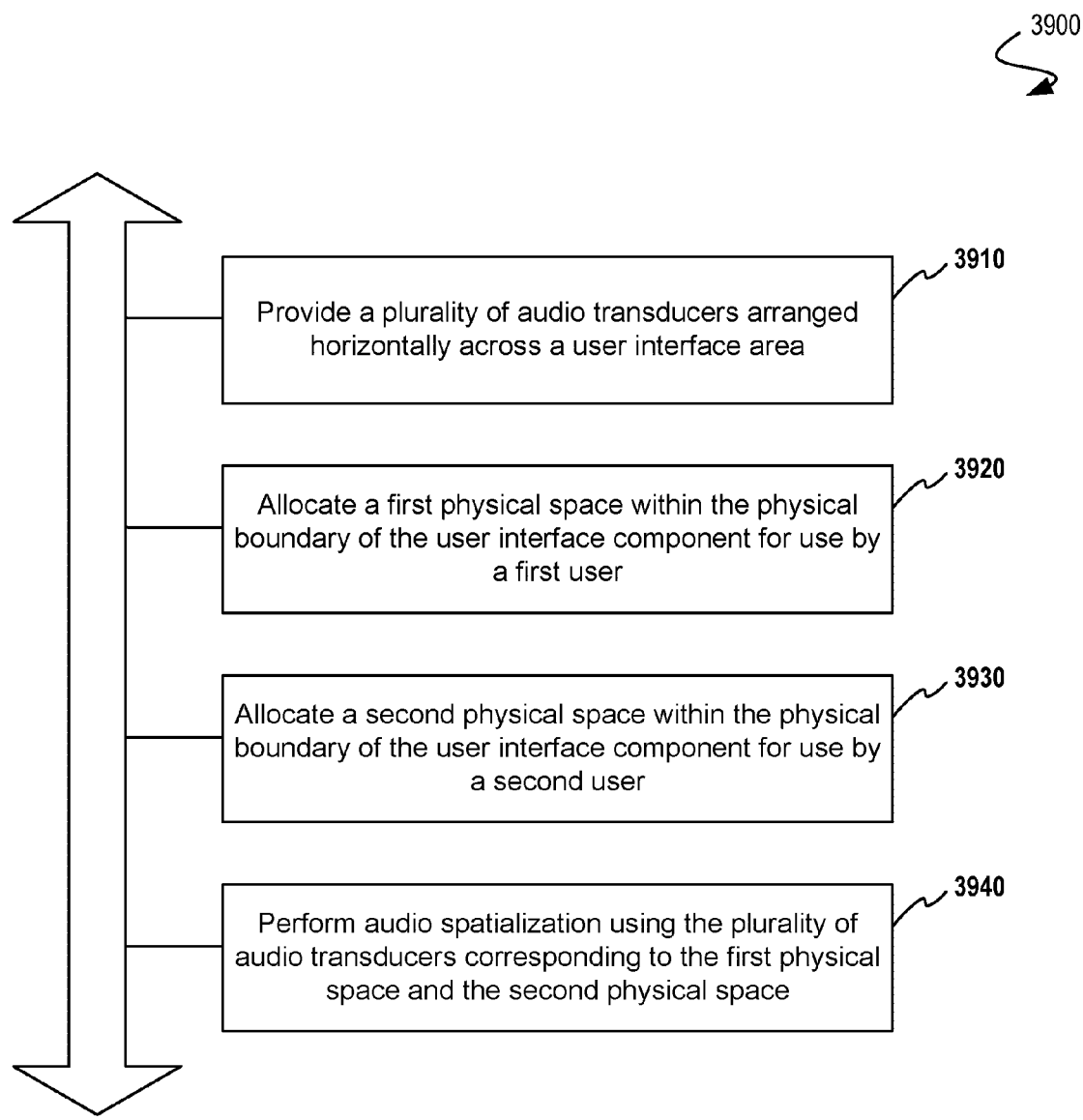
FIG. 39 is a flowchart for a method for managing multiple users using the same user interface component having a plurality of audio transducers, according to one embodiment.

FIG. 39 is a flowchart for a method for managing multiple users using the same user interface component having a plurality of audio transducers, according to one embodiment. As an option, the method 3900 may be implemented in the context of the architecture and functionality of FIG. 1 through FIG. 38, or method 3900 may be implemented in any environment. As shown, method 3900 comprises an operation for providing a plurality of audio transducers arranged horizontally across a user interface area (see operation 3910), an operation for allocating a first physical space within the physical boundary of the user interface component for use by a first user (see operation 3920); an operation for allocating a second physical space within the physical boundary of the user interface component for use by a second user (see operation 3930); and an operation for performing audio spatialization using the plurality of audio transducers corresponding to the first physical space and the second physical space allocated within the boundary of the same user interface component (see operation 3940).

Figure 40:
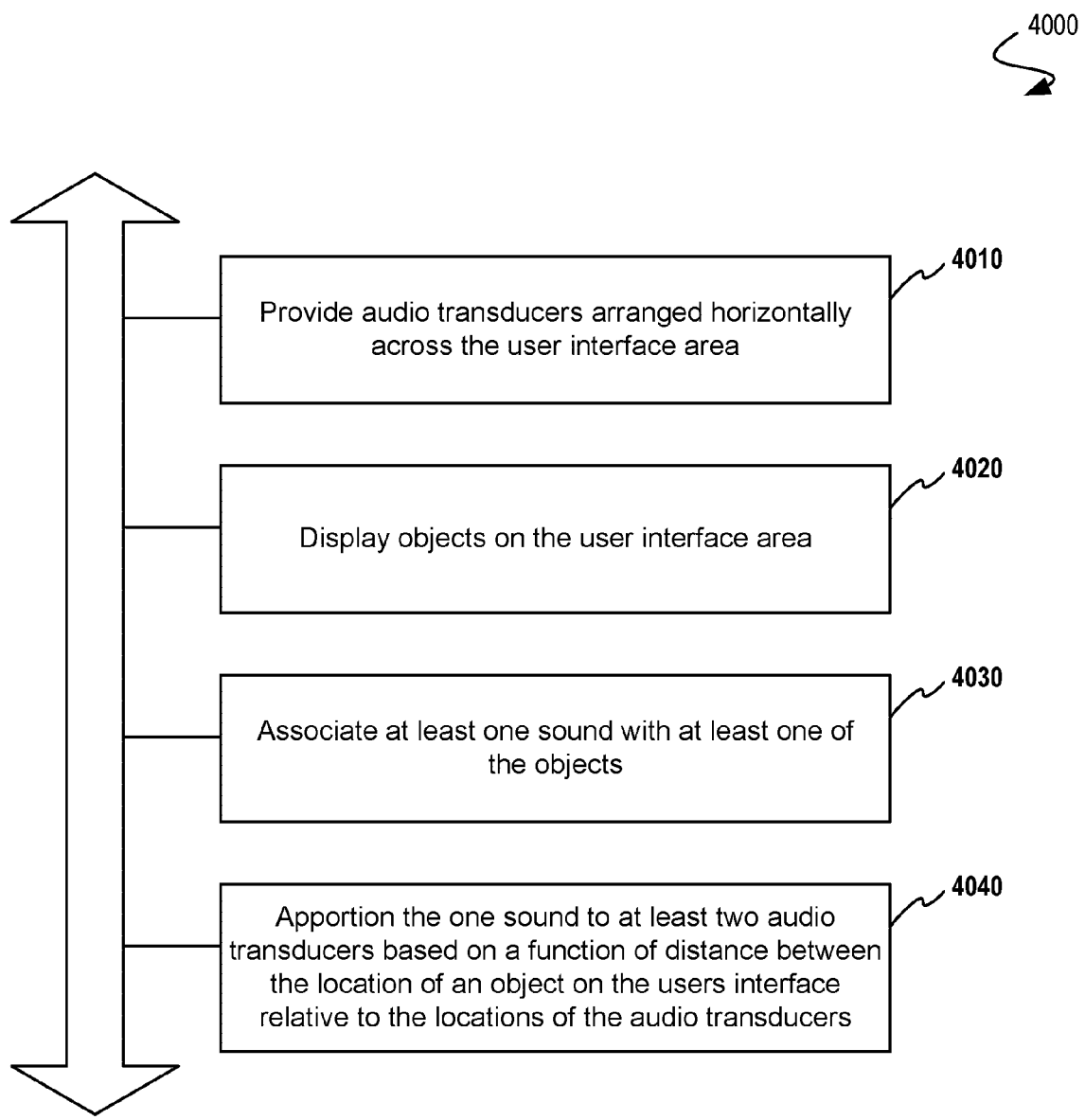
FIG. 40 is a flowchart for a method for managing multiple users using the same user interface component having a plurality of audio transducers, according to one embodiment.

FIG. 40 is a flowchart for a method for managing multiple users using the same user interface component having a plurality of audio transducers, according to one embodiment. As an option, the method 4000 may be implemented in the context of the architecture and functionality of FIG. 1 through FIG. 39, or method 4000 may be implemented in any environment. As shown, method 4000 comprises an operation for providing a plurality of audio transducers arranged horizontally across a user interface area (see operation 4010); an operation for displaying a plurality of objects on said user interface area (see operation 4020); an operation for associating at least one sound with at least one of said plurality of objects (see operation 4030); and an operation for apportioning said at least one sound to at least two audio transducers based on a function of distance between a location of an object on said user's interface relative to locations of said audio transducers (see operation 4040).

Figure 41:
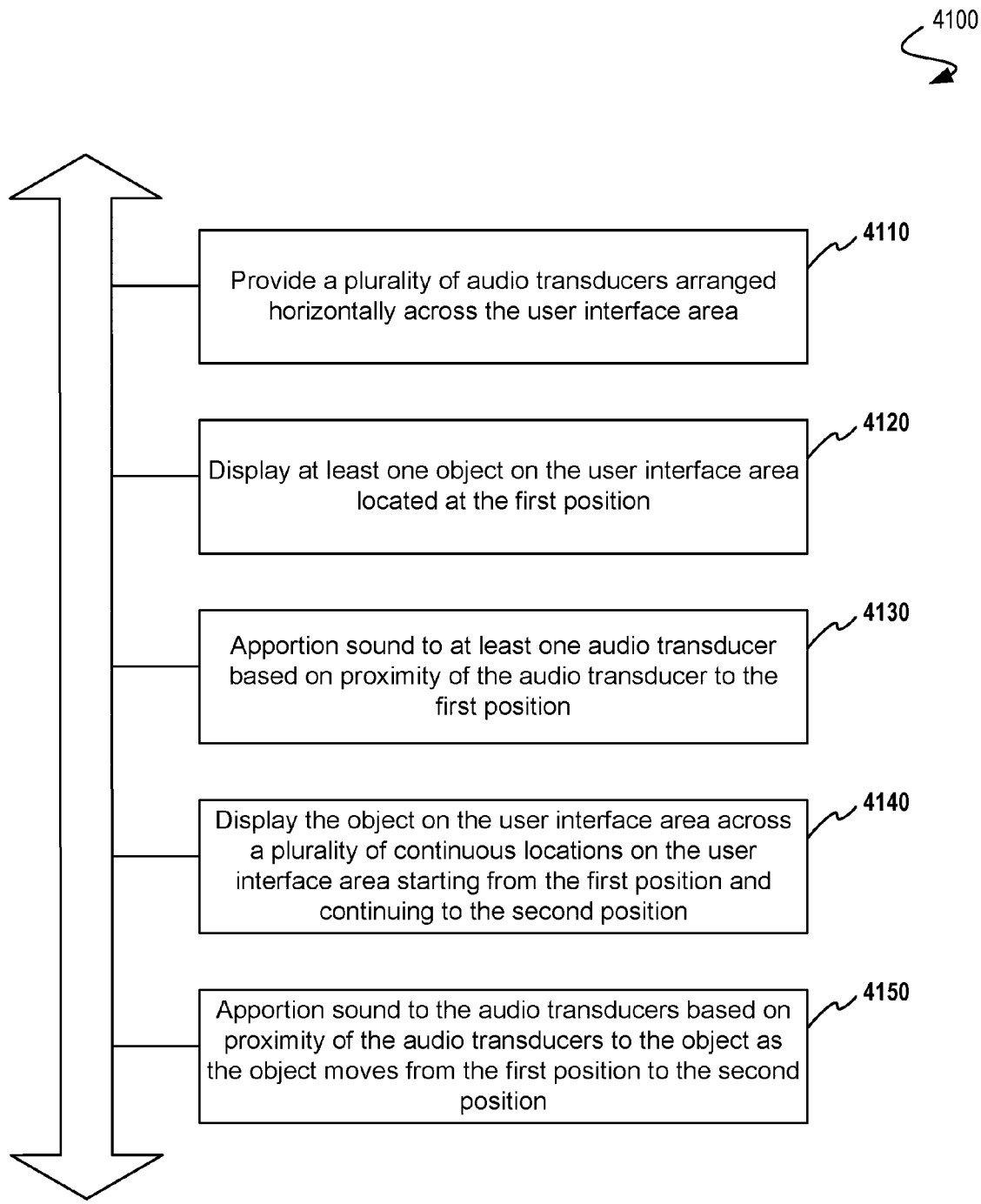
FIG. 41 is a flowchart for a method for managing multiple users using the same user interface component having a plurality of audio transducers, according to one embodiment.

FIG. 41 is a flowchart for a method for managing multiple users using the same user interface component having a plurality of audio transducers, according to one embodiment. As an option, the method 4100 may be implemented in the context of the architecture and functionality of FIG. 1 through FIG. 40, or method 4100 may be implemented in any environment. As shown, method 4100 comprises an operation for providing a plurality of audio transducers arranged horizontally across a user interface area (see operation 4110); an operation for displaying at least one object on said user interface area located at a first position (see operation 4120); an operation for apportioning volume of sound to at least one audio transducer based on proximity of said audio transducer to said first position (see operation 4130); an operation for displaying said object on said user interface area across a plurality of continuous locations on said user interface area starting from said first position and continuing to a second position (see operation 4140); and an operation for apportioning volume of sound to said audio transducers based on a function of distance of said audio transducers to said object as it moves from said first position to said second position (see operation 4150).

Figure 42:
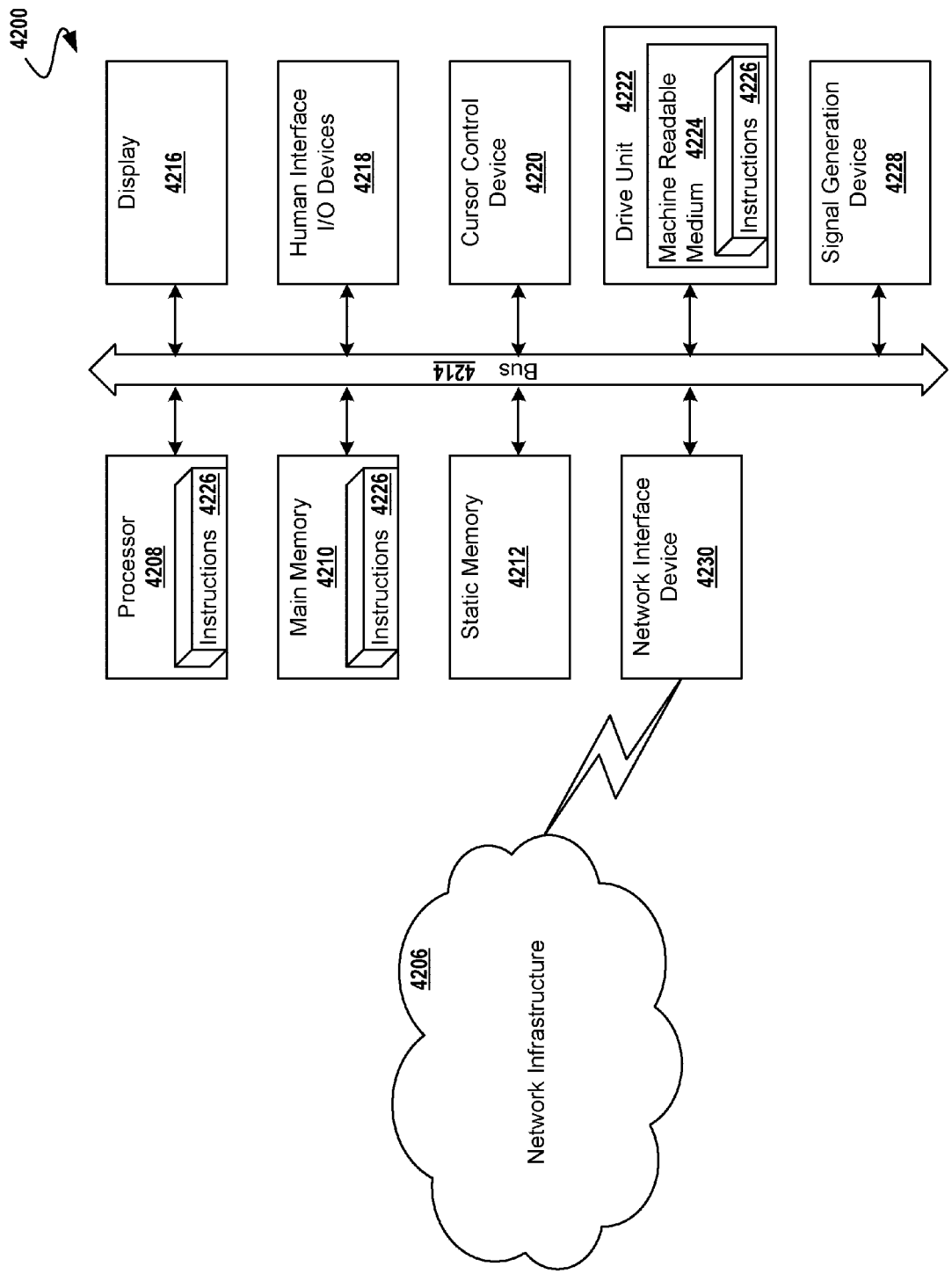
FIG. 42 is a diagrammatic representation of a machine in the exemplary form of a computer system, within which a set of instructions may be executed, according to one embodiment.

FIG. 42 is a diagrammatic representation of a network 4200, including network infrastructure 4206, and one or more computing nodes, any of which nodes may comprise a machine within which a set of instructions for causing the machine to perform any one of the techniques discussed above may be executed. The embodiment of a computing node shown is purely exemplary, and might be implemented in the context of one or more of the figures herein.

Any node of the network 4200 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer node includes a processor 4208 (e.g. a processor core, a microprocessor, a computing device, etc), a main memory 4210 and a static memory 4212, which communicate with each other via a bus 4214. The machine 4250 may further include a display unit 4216 that may comprise a touch-screen, or a liquid crystal display (LCD), or a light emitting diode (LED) display, or a cathode ray tube (CRT). As shown, the computer system 4250 also includes a human input/output (I/O) device 4218 (e.g. a keyboard, an alphanumeric keypad, etc), a pointing device 4220 (e.g. a mouse, a touch screen, etc), a drive unit 4222 (e.g. a disk drive unit, a CD/DVD drive, a tangible computer readable removable media drive, an SSD storage device, etc), a signal generation device 4228 (e.g. a speaker, an audio output, etc), and a network interface device 4230 (e.g. an Ethernet interface, a wired network interface, a wireless network interface, a propagated signal interface, etc).

The drive unit 4222 includes a machine-readable medium 4224 on which is stored a set of instructions (i.e. software, firmware, middleware, etc) 4226 embodying any one, or all, of the methodologies described above. The set of instructions 4226 is also shown to reside, completely or at least partially, within the main memory 4210 and/or within the processor 4208. The set of instructions 4226 may further be transmitted or received via the network interface device 4230 over the network bus 4214.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; electrical, optical, acoustical or other form of propagated signals (e.g. carrier waves, infrared signals, digital signals, etc); or any other type of media suitable for storing or transmitting information.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A method for managing multiple users using a user interface component comprising a visual display, the method comprising:

allocating, using at least one computer, a first physical space within the physical boundary of the visual display of the user interface component for a first user to use to interface with the at least one computer using a touch input on the visual display;

allocating, using the at least one computer, a second physical space within the physical boundary of the visual display of the user interface component for a second user to use to interface with the at least one computer using a touch input on the visual display, wherein the use of the second physical space is independent from the use of the first physical space such that the first user using the first physical space interfaces with the at least one computer independently from the second user using the second physical space;

allocating, using the at least one computer, a third physical space within the physical boundary of the visual display of the user interface component for attracting users; and coordinating, using the at least one computer, movement of at least one visual display object between the physical spaces allocated within the physical boundary of the visual display of the user interface component.

2. The method of claim 1, wherein the first physical space is a rectangle and the second physical space is a rectangle and the second physical space does not overlap the first physical space.

3. The method of claim 1, wherein allocating the third physical space within the physical boundary of the visual display of the user interface component consumes substantially all of the space of the visual display of the user interface component.

4. The method of claim 1, wherein allocating the first physical space commences when the first user touches at least one object from within the third physical space.

5. The method of claim 4, wherein allocating the first physical space includes reducing the allocated size of the third physical space.

6. The method of claim 4, wherein allocating the first physical space includes populating the first physical space with a plurality of objects including a copy of the least one object from within the third physical space.

7. The method of claim 4, wherein allocating the first physical space includes locating the first adjacent to the third physical space.

8. The method of claim 1, wherein allocating the second physical space commences when the second user touches at least one object from within the third physical space.

9. The method of claim 8, wherein allocating the second physical space includes reducing the allocated size of the first physical space.

10. The method of claim 8, wherein allocating the second physical space includes shuffling the first physical space away from the third physical space.

11. The method of claim 1, wherein coordinating movement of at least one object between physical spaces comprises receiving at least one multi-touch gesture.

12. The method of claim 1, wherein coordinating movement of at least one object between physical spaces comprises tossing the at least one object from the first physical space into the region of the second physical space.

13. The method of claim 1, wherein coordinating movement of at least one object between physical spaces comprises tossing the at least one object from the first physical space into the region of the second physical space, wherein the periphery of the first physical space and the periphery of the second physical space does not abut.

14. The method of claim 1, wherein coordinating movement of at least one object between physical spaces comprises emitting a sound during the movement.

15. A method for managing multiple users using the same user interface component comprising a visual display, the method comprising:
   allocating, using at least one computer, a first physical space within the physical boundary of the visual display of the user interface component for a first user to use to interface with the at least one computer;
   displaying, using the at least one computer, a plurality of objects on the visual display of the user interface component inside the first physical space;
   receiving, using the at least one computer, a touch input from the first user;
   allocating, using the at least one computer, a second physical space within the physical boundary of the visual display of the user interface component for use by a second user in response to the touch input on the visual display from the second user, wherein the use of the second physical space is independent from the use of the first physical space such that the first user using the first physical space interfaces with the at least one computer independently from the second user using the second physical space; and
   allocating, using the at least one computer, a third physical space within the physical boundary of the visual display of the user interface component for attracting users.

16. The method of claim 15, wherein receiving touch input from a user includes a trace gesture defining a new user physical space.

17. The method of claim 15, wherein allocating the second physical space includes reducing the size of at least one physical space.

18. The method of claim 15, wherein allocating the second physical space includes shifting center locations of one or more user physical spaces.

19. A method for managing multiple users using the same user interface component comprising a visual display, the method comprising:
   allocating, using at least one computer, a first physical space within the physical boundary of the visual display of the user interface component for a first user to use to interface with the at least one computer;
   displaying, using the at least one computer, a plurality of objects on the visual display of the user interface component outside the first physical space;
   receiving, using the at least one computer, input from a second user to select one of the objects;
   allocating, using the at least one computer, a second physical space centered around the selected object and within the physical boundary of the visual display of the user interface component for the second user to use to interface with the at least one computer in response to the second user selecting the object on the visual display, wherein the use of the second physical space is independent from the use of the first physical space such that the first user using the first physical space interfaces with the at least one computer independently from the second user using the second physical space; and
   allocating, using the at least one computer, a third physical space within the physical boundary of the visual display of the user interface component for attracting users.

20. The method of claim 19, wherein allocating the second physical space includes use of a set of pre-defined rules to govern resizing and shifting of previously allocated user physical spaces.

* * * * *